US011861539B2

(12) United States Patent
Garrity et al.

(10) Patent No.: US 11,861,539 B2
(45) Date of Patent: Jan. 2, 2024

(54) MULTI-DIMENSIONAL COMMAND CENTER

(71) Applicant: SPRINKLR, INC., New York, NY (US)

(72) Inventors: Justin Trevor Garrity, Portland, OR (US); Ryan Robert Parr, North Plains, OR (US); David James Stewart, New York, NY (US)

(73) Assignee: SPRINKLR, INC., New York, NY (US)

( * ) Notice: Subject to any disclaimer, the term of this patent is extended or adjusted under 35 U.S.C. 154(b) by 0 days.

(21) Appl. No.: 17/339,456

(22) Filed: Jun. 4, 2021

(65) Prior Publication Data

US 2021/0295233 A1   Sep. 23, 2021

Related U.S. Application Data

(60) Continuation-in-part of application No. 16/740,149, filed on Jan. 10, 2020, now Pat. No. 11,062,251, (Continued)

(51) Int. Cl.
*G06Q 10/06* (2023.01)
*G06Q 10/0639* (2023.01)
(Continued)

(52) U.S. Cl.
CPC ..... *G06Q 10/06393* (2013.01); *G06F 3/0482* (2013.01); *G06F 3/0485* (2013.01); (Continued)

(58) Field of Classification Search
CPC ........... G06Q 10/06393; G06Q 10/063; G06Q 50/01; G06F 3/0482; G06F 3/04842; (Continued)

(56) References Cited

U.S. PATENT DOCUMENTS 7,406,436 B1   7/2008   Reisman
8,655,938 B1   2/2014   Smith
(Continued)

FOREIGN PATENT DOCUMENTS

WO   WO 2016/118425 A1   7/2016

OTHER PUBLICATIONS

Spiegler, E.D., Hildebrand, C., Michahelles, F. Social Networks in Pervasive Advertising and Shopping. In: Müller, J., Alt, F., Michelis, D. (eds) Pervasive Advertising. Human-Computer Interaction Series. Springer, London. https://doi.org/10.1007/978-0-85729-352-7_10 (Year: 2011).*
(Continued)

*Primary Examiner* — Waseem Ashraf
*Assistant Examiner* — Christopher C Busch
(74) *Attorney, Agent, or Firm* — Schwabe Williamson & Wyatt

(57) ABSTRACT

A processing system uses a set of rules that identify a set of keywords and stores a set of creative images associated with the keywords. The processing system identifies metrics for the social media that includes the keywords and displays the creative images associated with the keywords with the largest social media metrics. The set of rules may include promotions to display with the creative content and filters that determine what social media to use to generate the metrics. No manual curation of content is necessary. The processing system saves time and effort as well as taps into real time consumer trends.

20 Claims, 35 Drawing Sheets

Related U.S. Application Data which is a continuation of application No. 14/997,013, filed on Jan. 15, 2016, now Pat. No. 10,535,029, application No. 17/339,456, filed on Jun. 4, 2021 is a continuation-in-part of application No. 16/122,544, filed on Sep. 5, 2018, now abandoned, which is a continuation-in-part of application No. 14/997,013, and a continuation-in-part of application No. 15/160,694, filed on May 20, 2016, now abandoned, application No. 17/339,456, filed on Jun. 4, 2021 is a continuation-in-part of application No. 16/834,924, filed on Mar. 30, 2020, now abandoned, which is a division of application No. 15/246,061, filed on Aug. 24, 2016, now abandoned.

(60) Provisional application No. 62/107,285, filed on Jan. 23, 2015, provisional application No. 62/165,479, filed on May 22, 2015, provisional application No. 62/211,196, filed on Aug. 28, 2015.

(51) Int. Cl.

| | |
|---|---|
| *G06F 16/951* | (2019.01) |
| *G06Q 10/063* | (2023.01) |
| *G06F 3/0482* | (2013.01) |
| *G06F 3/04842* | (2022.01) |
| *G06F 3/0485* | (2022.01) |
| *G06F 3/16* | (2006.01) |
| *G06Q 50/00* | (2012.01) |
| *G06T 11/20* | (2006.01) |

(52) U.S. Cl.
CPC .......... *G06F 3/04842* (2013.01); *G06F 3/167* (2013.01); *G06F 16/951* (2019.01); *G06Q 10/063* (2013.01); *G06Q 50/01* (2013.01); *G06T 11/206* (2013.01)

(58) Field of Classification Search
CPC ...... G06F 3/0485; G06F 3/167; G06F 16/951; G06T 11/206
See application file for complete search history.

(56) References Cited

U.S. PATENT DOCUMENTS

| | | | |
|---|---|---|---|
| 8,972,275 B2 | 3/2015 | Park et al. | |
| 9,201,955 B1 | 12/2015 | Quintao | |
| 9,218,610 B2 | 12/2015 | Kandregula | |
| 9,734,514 B2 | 8/2017 | Heffernan | |
| 9,741,080 B1* | 8/2017 | Byrne | G06Q 40/00 |
| 9,940,680 B2* | 4/2018 | Dandekar | G06Q 30/0242 |
| 10,467,630 B2 | 11/2019 | Iyer et al. | |
| 10,535,029 B2 | 1/2020 | Garrity | |
| 10,684,738 B1 | 6/2020 | Sicora | |
| 10,769,223 B1 | 9/2020 | Patel | |
| 11,182,121 B2* | 11/2021 | Barnes, Jr. | G06F 3/04842 |
| 2001/0028369 A1 | 10/2001 | Gallo | |
| 2003/0187956 A1 | 10/2003 | Belt | |
| 2003/0220835 A1 | 11/2003 | Barnes, Jr. | |
| 2004/0054819 A1 | 3/2004 | Daimoto et al. | |
| 2005/0050021 A1 | 3/2005 | Timmons | |
| 2005/0131909 A1 | 6/2005 | Cavagnaro et al. | |
| 2006/0184963 A1 | 8/2006 | Snijder | |
| 2007/0103583 A1 | 5/2007 | Burnett | |
| 2008/0147482 A1* | 6/2008 | Messing | H04L 51/52 |
| | | | 705/319 |
| 2008/0284910 A1 | 11/2008 | Erskine | |
| 2010/0030648 A1* | 2/2010 | Manolescu | G06Q 30/02 |
| | | | 705/14.66 |
| 2010/0119053 A1 | 5/2010 | Goeldi | |
| 2010/0153377 A1 | 6/2010 | Rajan et al. | |
| 2010/0185630 A1 | 7/2010 | Cheng et al. | |
| 2011/0004827 A1 | 1/2011 | Doerr | |
| 2011/0098108 A1 | 4/2011 | Kuper | |
| 2011/0122155 A1 | 5/2011 | Zechlin | |
| 2011/0255748 A1 | 10/2011 | Komoto | |
| 2011/0307312 A1 | 12/2011 | Goeldi | |
| 2011/0320948 A1 | 12/2011 | Choi | |
| 2012/0047024 A1* | 2/2012 | Urban | G06Q 30/02 |
| | | | 705/14.69 |
| 2012/0110427 A1 | 5/2012 | Krause | |
| 2012/0134536 A1 | 5/2012 | Myokan | |
| 2012/0291059 A1 | 11/2012 | Roberts | |
| 2013/0006760 A1* | 1/2013 | Brenner | G06Q 30/02 |
| | | | 705/14.49 |
| 2013/0014137 A1 | 1/2013 | Bhatia | |
| 2013/0124653 A1 | 5/2013 | Vick | |
| 2013/0166379 A1 | 6/2013 | Ehindero | |
| 2013/0297581 A1 | 11/2013 | Ghosh | |
| 2013/0297694 A1 | 11/2013 | Ghosh | |
| 2014/0040029 A1 | 2/2014 | Vhora | |
| 2014/0143333 A1 | 5/2014 | Dodge | |
| 2014/0156341 A1 | 6/2014 | Kruk | |
| 2014/0172744 A1 | 6/2014 | El-Hmayssi | |
| 2014/0180788 A1 | 6/2014 | George | |
| 2014/0214480 A1* | 7/2014 | Jamal | G06Q 30/0201 |
| | | | 705/7.29 |
| 2014/0214819 A1 | 7/2014 | Aitchison | |
| 2014/0222578 A1 | 8/2014 | Poornachandran | |
| 2014/0232616 A1 | 8/2014 | Drake | |
| 2014/0280052 A1 | 9/2014 | Alonzo et al. | |
| 2014/0358630 A1 | 12/2014 | Bhagat | |
| 2014/0361954 A1 | 12/2014 | Epstein | |
| 2015/0012353 A1 | 1/2015 | Ciancio-Bunch | |
| 2015/0019335 A1 | 1/2015 | Zhou | |
| 2015/0025977 A1* | 1/2015 | Doyle | G06Q 30/0269 |
| | | | 705/14.66 |
| 2015/0031389 A1 | 1/2015 | Liu | |
| 2015/0046269 A1 | 2/2015 | Liu | |
| 2015/0046781 A1 | 2/2015 | Baker | |
| 2015/0067075 A1 | 3/2015 | Sheppard et al. | |
| 2015/0088622 A1 | 3/2015 | Ganschow | |
| 2015/0089429 A1 | 3/2015 | Ghassabian | |
| 2015/0100377 A1 | 4/2015 | Penumaka | |
| 2015/0112814 A1 | 4/2015 | Stokes | |
| 2015/0113018 A1 | 4/2015 | Steed et al. | |
| 2015/0161633 A1 | 6/2015 | Adams | |
| 2015/0163311 A1 | 6/2015 | Heath | |
| 2015/0186929 A1 | 7/2015 | Thies | |
| 2015/0187333 A1 | 7/2015 | Loeffler | |
| 2015/0213119 A1 | 7/2015 | Agarwal | |
| 2015/0235239 A1 | 8/2015 | Chowdhary | |
| 2015/0235277 A1* | 8/2015 | Bagley | G06Q 30/0275 |
| | | | 705/14.71 |
| 2015/0279037 A1 | 10/2015 | Griffin | |
| 2016/0019397 A1 | 1/2016 | Peterson | |
| 2016/0088362 A1 | 3/2016 | Kaneko et al. | |
| 2016/0092499 A1 | 3/2016 | Leigh et al. | |
| 2016/0140627 A1 | 5/2016 | Moreau | |
| 2016/0155389 A1 | 6/2016 | Beon | |
| 2016/0188661 A1 | 6/2016 | Huang et al. | |
| 2016/0217408 A1 | 7/2016 | Garrity | |
| 2016/0225017 A1 | 8/2016 | Wong | |
| 2016/0321696 A1 | 11/2016 | Murthy | |
| 2016/0343040 A1 | 11/2016 | Garrity | |
| 2017/0010756 A1 | 1/2017 | Liensberger et al. | |
| 2017/0061469 A1 | 3/2017 | Garrity | |
| 2017/0084246 A1 | 3/2017 | Joshi | |
| 2017/0206557 A1 | 7/2017 | Abrol et al. | |
| 2017/0357217 A1 | 12/2017 | Raymann et al. | |
| 2017/0372429 A1 | 12/2017 | La Placa | |
| 2018/0024712 A1 | 1/2018 | Sievers | |
| 2018/0260185 A1 | 9/2018 | Garrity | |
| 2019/0026786 A1 | 1/2019 | Khoury | |
| 2019/0026788 A1 | 1/2019 | Garrity | |
| 2019/0065610 A1 | 2/2019 | Singh | |
| 2019/0087874 A1 | 3/2019 | DeLuca | |
| 2019/0094027 A1 | 3/2019 | Xu | |
| 2019/0102075 A1 | 4/2019 | Naidoo | |
| 2019/0173826 A1 | 6/2019 | DeLuca | |
| 2019/0205839 A1 | 7/2019 | Dotan-Cohen | |

(56) References Cited

U.S. PATENT DOCUMENTS

| | | | |
|---|---|---|---|
| 2019/0206231 A1 | 7/2019 | Armstrong |
| 2019/0230473 A1 | 7/2019 | Raji et al. |
| 2019/0265942 A1 | 8/2019 | Yoshimura |
| 2019/0333118 A1 | 10/2019 | Crimmons |
| 2020/0177722 A1 | 6/2020 | Janugani |
| 2020/0226526 A1 | 7/2020 | Garrity |
| 2020/0250395 A1 | 8/2020 | Ross |
| 2020/0273063 A1 | 8/2020 | Garrity et al. |
| 2020/0293258 A1 | 9/2020 | Lin |
| 2020/0387411 A1 | 12/2020 | Chu |
| 2020/0401640 A1 | 12/2020 | Garrity |

OTHER PUBLICATIONS

Gruhl, et al., "Multimodal social intelligence in a real-time dashboard system", VLDB Journal 19.6: 825-848; Springer New York; Jan. 1, 2010.

Guille et al. "SONDY: An open source platform for social dynamics mining and analysis" Proceedings of the ACM SIGMOD International Conference on Management of Data: 1005-1008. Association for Computing Machinery. (Jul. 30, 2013).

Henderson, Harry: "Encyclopedia of Computer Science and Technology" Nov. 1, 2008, Facts on File; 580 pages.

International Search Report and Written Opinion from the International Searching Authority for PCT/US2016/013680 dated Mar. 22, 2016; 12 pages.

Psaltis, Andrew G.; "Streaming Data Designing the Real-Time Pipeline" Jan. 16, 2015, Manning Publications; 12 pages.

Tanenbaum, Andrew S., et al.; "Distributed Systems: Principles and Paradigms (2nd Edition)" Prentice Hall; Oct. 12, 2006; 68 pages.

Trendsmap Announces First Real-Time Geographic Visualization for Twitter Trends Tracking Business Wire Sep. 22, 2009: NA.

Wikipedia: "Server (computing)", Internet Article Jan. 19, 2015; retrieved from the internet: <URL: https://en.wikipedia.org/w/index.php?title=Server_(computing)&oldid=643171056> retrieved on Mar. 14, 2016; 7 pages.

Krishnaprasad et al., JuxtaView, A Tool for Interactive Visualization of Large Imagery on Scalable Tiled Displays, IEEE 2004, pp. 411-420 (2004).

Yamaoka et al., Visualization of High-Resolution Image Collections on Large Tiled Display Wall, Elsevier 2011, pp. 498-505 (2011).

McIntyre et al., Support for Multitaking and Background Awareness Using Interactive Peripheral Displays, ACM 2001, pp. 41-50 (2001).

Paek et al., "A Multimethod Approach to Evaluating Social Media Campaign Effectiveness", pp. 1570-1579 (2013).

\* cited by examiner

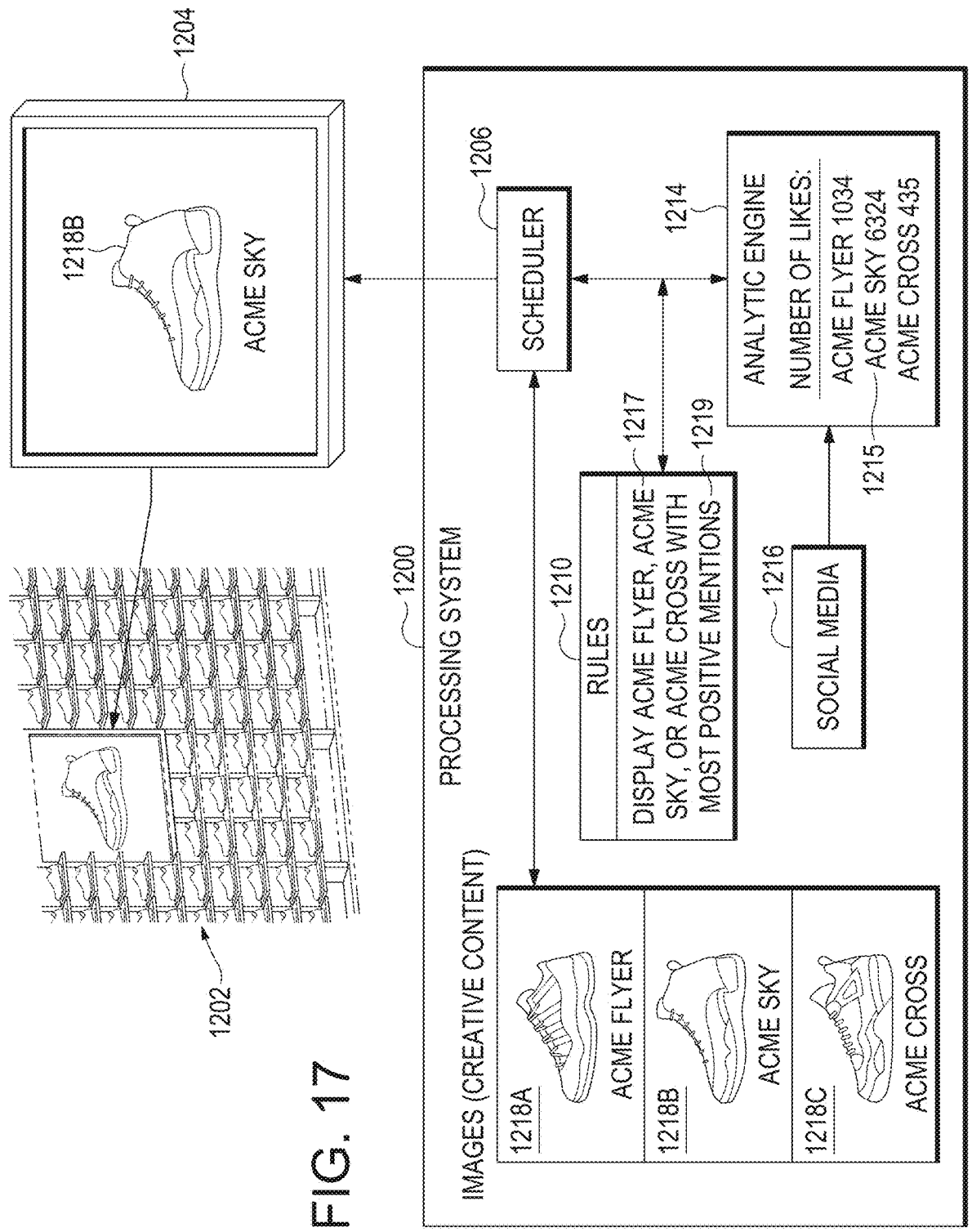

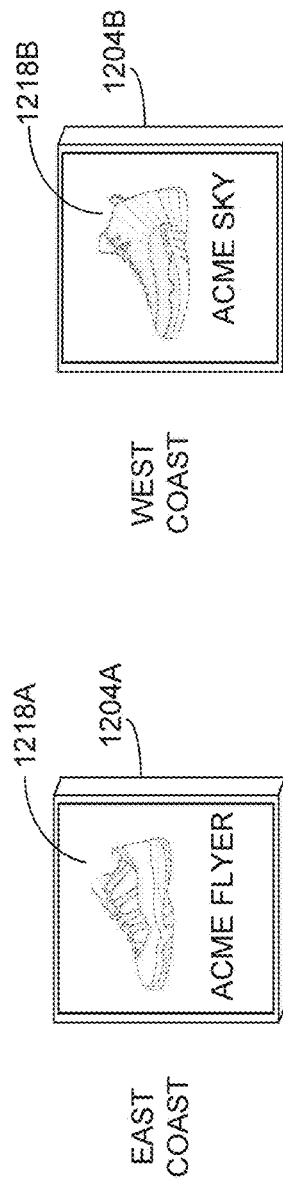
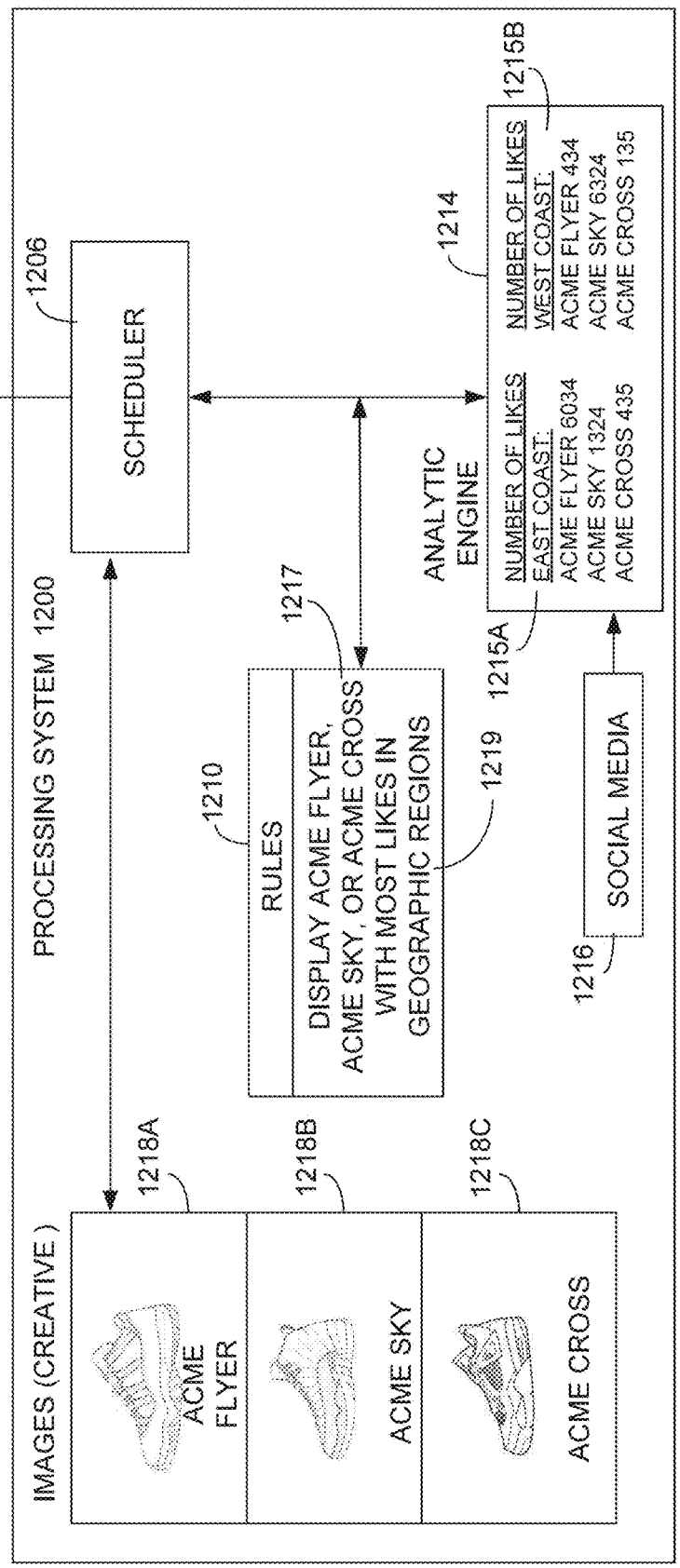
FIG. 18A

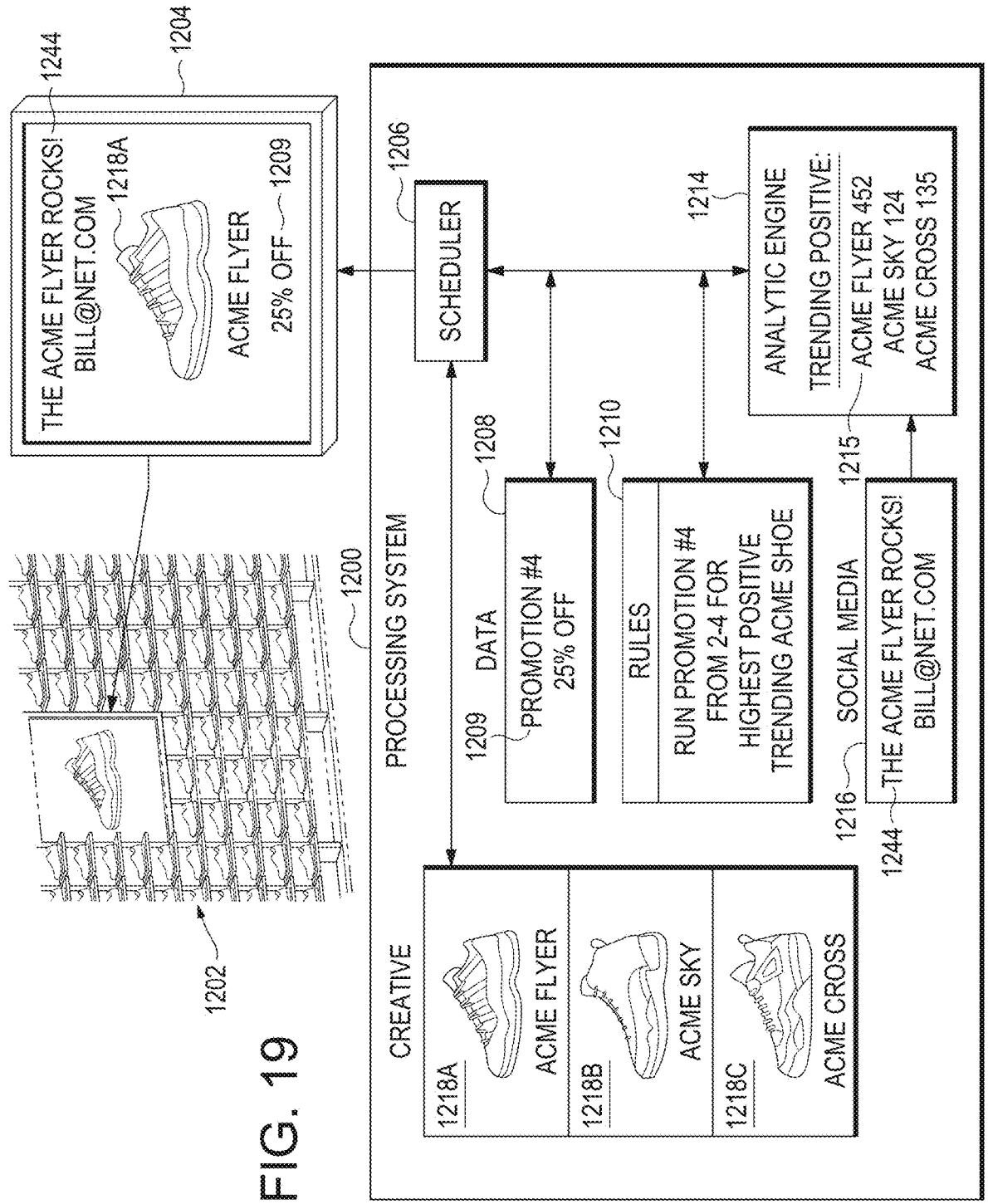

| DISPLAY IDENTIFIER | TOPICS | METRICS | FILTERS | DISPLAY TIME | CREATIVE IDENTIFIERS | DATA |
|---|---|---|---|---|---|---|
| URL 1, URL 3, URL 4 | ACME, SHOE, FLYER, SKY, CROSS | MENTIONS | GEOGRAPHIC | ALL DAY | IMAGE 1 = FLYER<br>IMAGE 2 = SKY<br>IMAGE 3 = CROSS | PROM 1 |
| URL 1 | ACME, SHOE, FLYER, SKY, CROSS | LIKES | AGE 21-35 | 6:00-10:00 | IMAGE 1 = FLYER<br>IMAGE 2 = SKY<br>IMAGE 3 = CROSS | PROM 2 |
| URL 2 | ACME, SHOE, FLYER, SKY, CROSS | MENTIONS | NA | ALL DAY | IMAGE 1 = FLYER<br>IMAGE 2 = SKY<br>IMAGE 3 = CROSS | NA |

RULES

FIG. 22

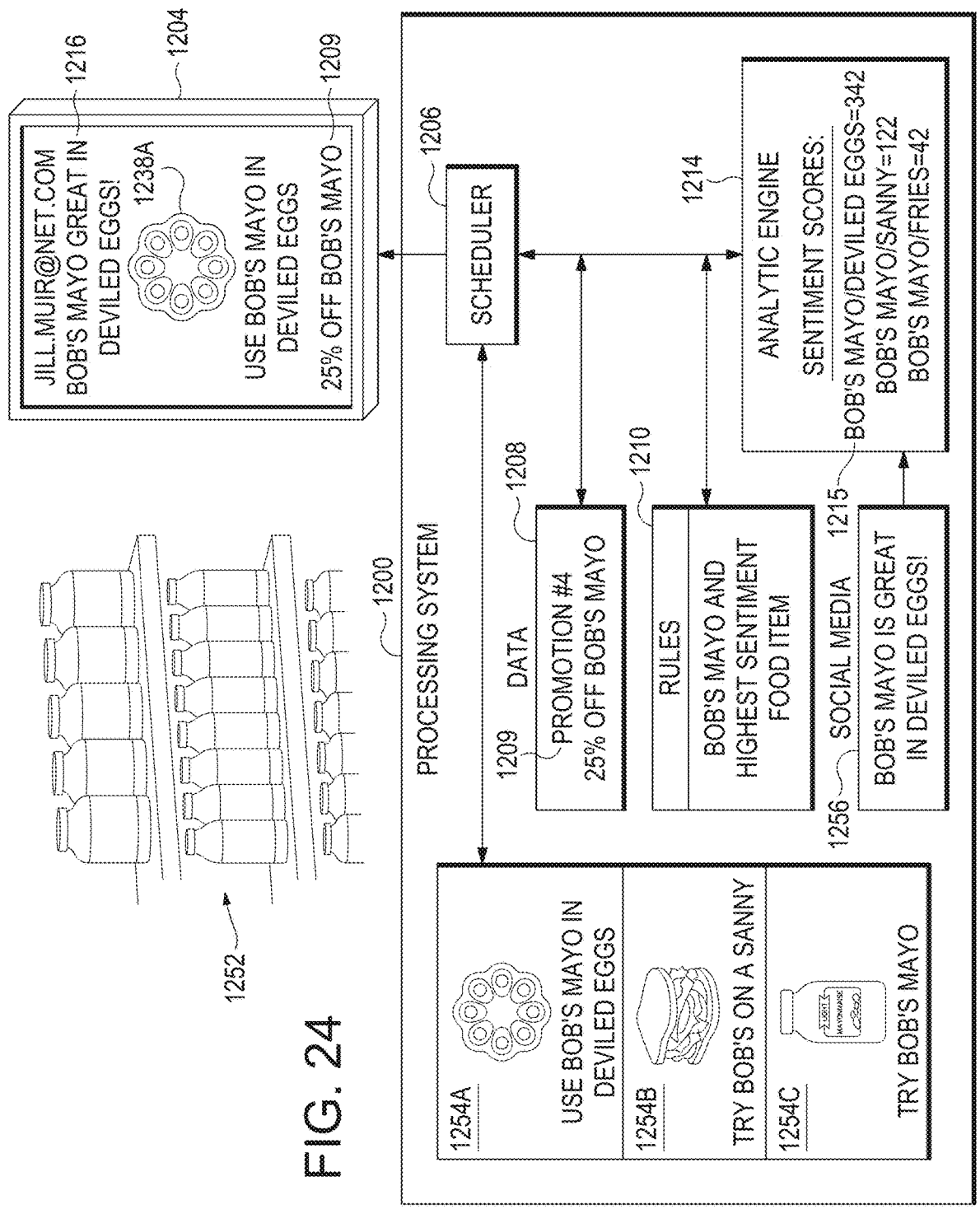

MULTI-DIMENSIONAL COMMAND CENTER

CROSS-REFERENCE TO RELATED APPLICATIONS

This application is a continuation-in-part of U.S. application Ser. No. 16/740,149, filed Jan. 10, 2020, which is a continuation of U.S. application Ser. No. 14/997,013, filed Jan. 15, 2016 (which claims priority to U.S. Provisional Application No. 62/107,285, filed Jan. 23, 2015), each of which is incorporat333333ed by reference in its entirety. This application is also a continuation-in-part of U.S. application Ser. No. 16/122,544, filed Sep. 5, 2018, which is a continuation-in-part of U.S. application Ser. No. 14/997,013, filed Jan. 15, 2016 (which claims priority to U.S. Provisional Application No. 62/107,285, filed Jan. 23, 2015) and is a continuation-in-part of U.S. application Ser. No. 15/160,694, filed May 20, 2016, (which claims priority to U.S. Provisional Application No. 62/165,479), each of which is incorporated by reference in its entirety. This application is also a continuation-in-part of U.S. application Ser. No. 16/834,924, filed Mar. 30, 2020, which is a divisional of U.S. application Ser. No. 15/246,061, filed Aug. 24, 2016, (which claims priority to U.S. Provisional Application No. 62/211,196), filed Aug. 28, 2015, each of which is incorporated herein by reference in its entirety. All of these aforementioned provisional and non-provisional patent applications are each hereby incorporated by reference herein as if completely and fully set forth herein.

BACKGROUND

Analytic data is generated for different brands, companies, websites, campaigns, and just about any other product, event, or service. For example, analytic services may identify how many people access websites on different days, how many people purchase specific products, how many people click on online ads for a product, and the demographics for the different people responding to an email campaign about these products.

Social networks also produce analytic data associated with those products. For example, social networks allow users to post messages about products and even engage with posts by other users by commenting, indicating that they like the post, or rebroadcasting the post to their friends and followers. These social networks generate analytics for the user accounts, such as identifying the engagement numbers for these posts, the influence that these users have on other users on social media, the demographics of the users that are posting and engaging, as well as the number of followers related to the brand that represents the product.

Analytic services on their own may not effectively display the different analytic data and social media. For example, a company may launch a campaign to sell a particular product. The company may monitor their corporate website and generate analytics regarding the number of purchases, number of web page visits, and the demographics of the customers making the purchases. The company also may monitor social media, such as comments and posts made on the company social media accounts.

However, current computer systems may not allow a user to easily search, display, or navigate through all of the different types of content and metrics associated with different products or services. Current computer systems also may not synchronize the different content and metrics associated with the different products or services. For example, the computer system may use separate display screens for displaying different content or metrics for different products. However, the information on the display screens is not synchronized. When a user selects a new product or topic for displaying information on one of the display screens, the computer system does not automatically change all of the information on the other display screens to correspond with the new product or topic.

BRIEF DESCRIPTION OF THE DRAWINGS

FIG. 17 depicts an example processing system that displays creative based on social media metrics.

FIG. 18A depicts another example processing system that displays creative for different products based on social media metrics in different geographical locations.

FIG. 19 depicts an example processing system that displays promotions based on social media metrics.

FIG. 22 depicts example rules used by the processing system to display creative.

FIG. 24 depicts another example of how the processing system may display creative for different combinations of items based on social media metrics.

DETAILED DESCRIPTION

A command center synchronizes real-time multi-dimensional data on one or more display devices. The data may include content of social media messages, metrics for the social media messages, and any other financial or business data. Displaying and synchronizing social media content together with other metrics provides insight into both the statistical performance of a campaign or event and the ground level customer response to the campaign or event.

The command center provides ad-hoc search and navigation through different dimensional topic levels that allow users to better analyze and correlate data. For example, the command center not only generates and displays content and metrics associated with an event, but can also generate and display in real-time content and metrics for other topics, products, and/or services related to a currently displayed topic. The command center enables a user to navigate through the different dimensional levels simply by selecting items displayed by a remote control application. The command center also automatically synchronizes the content and metrics for any selected dimension to a same corresponding time period.

Figure 1:
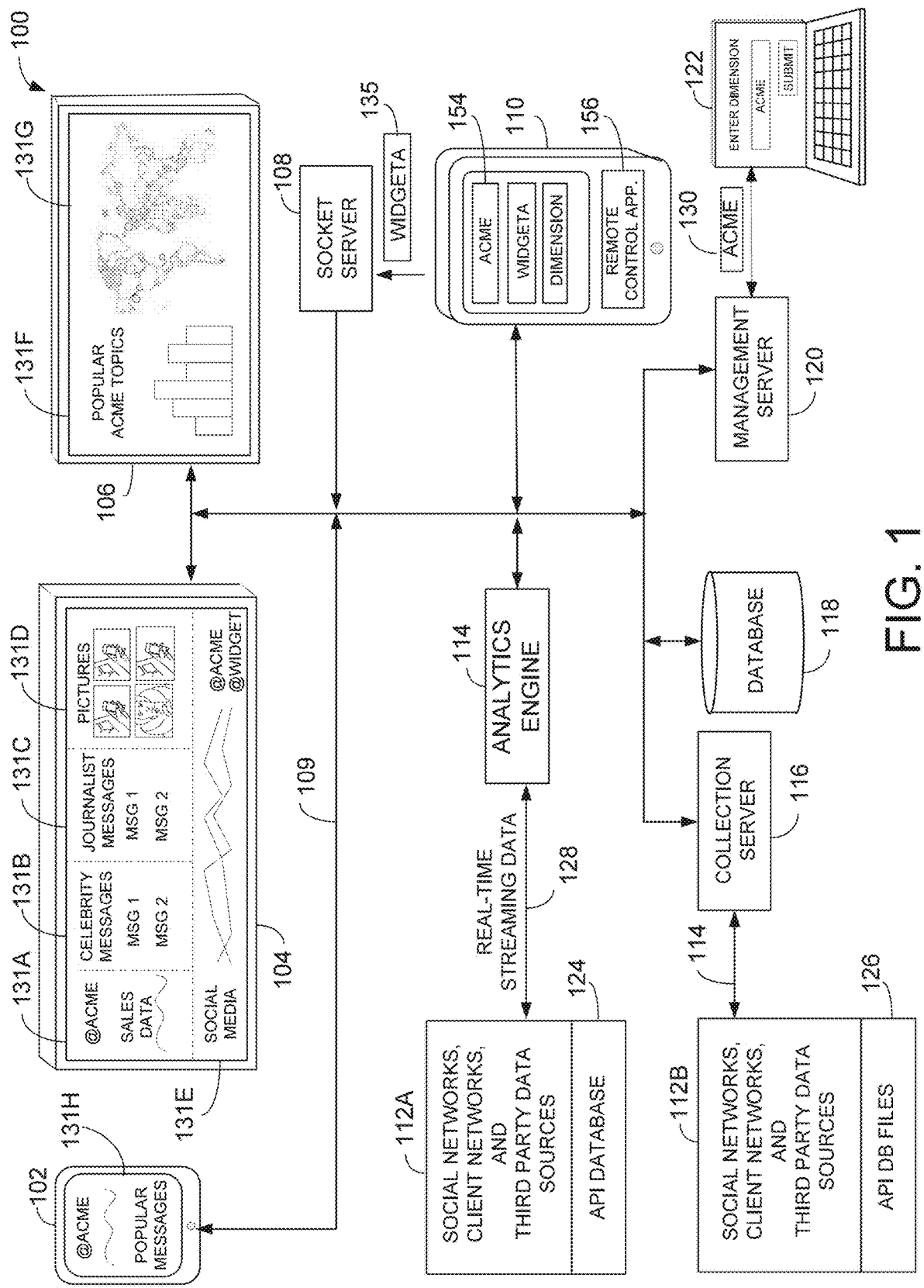
FIG. 1 depicts an example multi-dimensional command center.

FIG. 1 shows an example command center 100. An analytics engine 114 may connect to different display devices, such as a portable notebook, portable tablet, smart phone, smart watch, or personal computer 102. Display devices 104 and 106 may comprise display screens, such a light emitting diode (LED) screen, a liquid crystal display (LCD) screen, or any other type of flat screen or any other display device. Analytics engine 114 also connects to a tablet, smart phone, smart watch, or any other portable device 110 that can select what data is displayed on display devices 102, 104 and 106 with touch, voice, or gesture input.

Command center 100 may access data from different data sources 112, such as social networks, client networks, and third party websites. Social networks 112 may include websites, such as Twitter®, Facebook®, Instagram®, or the like. Client networks may include websites for a company, individual, or other entity associated with the data displayed on display devices 102, 104, and 106. For example, command center 100 may display data for an event sponsored by the Acme company. Client networks 112 may include the www.acme.com website and other Acme company databases. Command center 100 may download sales data, user visits, etc. associated with the web pages on www.acme.com from web analytic data sources as well as download any other data from the other identified Acme company databases.

Third party data sources 112 may include websites such as Adobe® or Google® analytics that monitor, measure, and generate metrics for other data sources or websites. Another example third party data source may include customized databases, such as created by Salesforce®, Salesforce® Radian6, or Sysomos® that provides access to marketing and sales data.

Some data sources 112 may provide more subjective data, such as content from posted messages that indicate what a user thinks of a particular event, service, or product. Some data sources 112 may provide more objective numerical data, such as company sales data, inventory data, financial data, spreadsheet data, website ecommerce data, wrist band radio frequency identification (RFID) reader data, number web page views, number of unique page views, time on web pages, starting web page, bounce rates, percentage of exists from web pages, or any other structured data contained in database systems.

Command center 100 uses application program interfaces (APIs) 124 and 126 to access data from data sources 112A and 112B, respectively. Some of data sources 112A and 112B may be the same, but are shown as separate sources in FIG. 1 for explanation purposes. For example, analytics engine 114 may use APIs 124 to extract real-time streaming data 128 from data sources 112A. A collection server 116 may use APIs 126 to extract and store data 114 from data sources 112B in a database 118. Streaming data 128 may be similar to data 114 but may include real-time updates to data currently stored in database 118.

A computer 122, such as a laptop, personal computer, notebook, or smart device identifies what data to extract from data sources 112. For example, a user may enter a keyword, data string, term, or any other combination of characters into computer 122 associated with a dimension 130. Dimension 130 may include any topic, segment, data category, gender, geography, time, content, metric, product, service, event, label, hashtag, gender, geography, time, content, metric, etc.

For example, dimension 130 may comprise the name of company or person, a name of a product or service, a brand name, a name for a campaign or event associated with a company or person, a name of a department within a company, a name of an account on a social website, a name of a subject or account, a hashtag associated with the person or company, a name of a competitor or competitive product, etc. Dimension 130 also may identify a particular content or category of data. For example, dimension 130 may specify content, such as celebrity posted messages associated with a particular product or event. Dimensions 130 also may specify a particular metric, such as number of posts, shared messages, responses to messages, comments on messages, likes, and/or trending items associated with the product, service, event, or topic.

Computer 122 may submit a list of dimensions 130 to a management server 120. Management server 120 may direct collection server 116 to extract data from data sources 112B associated with dimensions 130. Management server 120 also may direct analytics engine 114 to connect to data sources 112A and access streaming data 128 associated with dimensions 130.

Analytics engine 114 extracts and/or generates different metrics 131 from data 128 and 114. For example, analytics engine 114 may access sales data associated with dimension 130 and generate an associated graph 131A.

In the case of social media, analytics engine 114 may download messages 131B sent by different celebrities, messages 131C sent by different journalists, and images 131D sent by any variety of different users. Analytics engine 114 may accumulate all web traffic associated with dimensions 130 and generate time graphs 131E that identify the number of messages generated for the dimensions 130 for different time periods, such as every 30 minutes or every hour.

Analytics server 114 may generate additional content and metrics. For example, analytics engine 114 may generate a histogram 131F that identifies the number of messages associated with the most popular topics associated with Acme and generate a geographic map 131G that identifies the origination locations and numbers of social media messages associated with Acme. Analytics engine 114 also may generate a subset of content and metrics 131H for display on device 102. These are just examples of any variety of content and metrics 131 that may be downloaded and generated by analytics server 114.

Command center 100 provides the unique operation of synchronizing different content and metrics for different adhoc selected dimensions. For example, command center 100 displays corporate sales figures on timeline 131A and social media traffic in timelines 131E over the same time period. In addition, command center 100 may display content 131B and 131C from messages posted by different celebrities and journalists, respectively, over the same time periods associated with timelines 131A and 131E. Command center 100 also may display images 131D posted by different users over the same time periods.

Displaying these disparate data items together over a same relative timeline or time period allow a viewer to better correlate more objective metric data with more subjective social media content. For example, a user can not only view sales figures and web traffic 131A and 131E, respectively, for a particular product or event, but can also view the social commentary 131B-131D for the same product or event during that same time period. This allows the viewer to better understand customer objective and subjective responses to product, services, topics, and/or events.

For example, command center 100 may display the number of people attending an event in metric 131A and display content of messages 131B-131D posted by different users attending the event. A large number of attendees identified in metric 131A may initially indicate a successful event. However, the people attending the event may provide mixed reviews of the event in messages 131B-131D. Thus, command center 100 may provide financial, economic, or other objective metrics for the event, product, or service and also provide content that indicates the actual impressions and responses of attendees regarding the same event, product, or service.

A user may change the dimension 130 displayed by command center 100 simply by selecting different icons 154 displayed by a remote control application 156 operating on device 110. Remote control application 156 sends an input vector 135 to socket server 108 identifying the selected dimension 103. Socket server 108 sends input vector 135 to different display modules operating with applications on display devices 102, 104, and 106. Display modules 142 request analytics engine 114 to upload content or metrics associated with the new dimension 130. Display modules 142 then automatically display the associated content or metrics for a same synchronized time period.

Synchronizing metrics 131A and 131E with content 131B-131D allow an event operator to react to real-time social reviews. For example, a peak in graph 131E may indicate a significant event. The messages 131B-131D associated with the peak in graph 131E may identify a problem associated with the event. The event operator may send personnel to event locations to resolve the complaints regarding long waiting times or a poor sound system discussed in content 131B-131D. The event operator also may exploit positive content by posting associated messages 131B-131D on display devices 102, 104, and 106 or on a corporate website.

Figure 2:
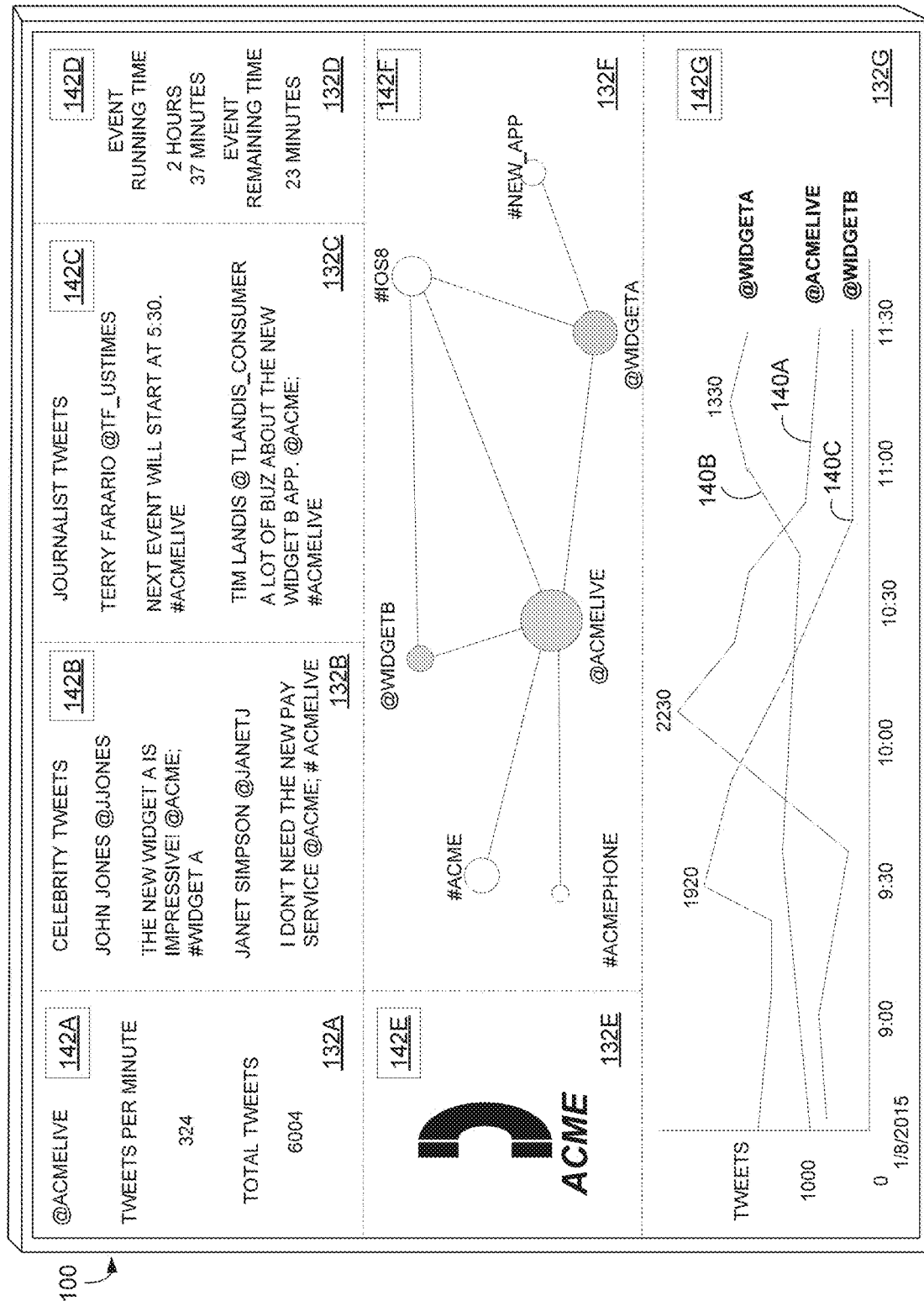
FIG. 2 depicts example content and metric data displayed by the command center.

FIG. 2 shows another example of data displayed by command center 100. In this example, a company Acme is hosting an event launching one or more products. The Acme company creates an account @acmelive on one or more websites. In addition, the Acme company may create accounts @widgetA and @widgetB and hashtags #widgetA and #widgetB for two new products widget A and widget B, respectively, being announced at the event. The Acme company may want to view in real-time different sales data and social media content associated with the event.

Referring to FIGS. 1 and 2, an employee from Acme company may enter a list of dimensions 130 into computer 122 that includes Acme, acmelive, widgetA, and widgetB. Management server 120 may generate a set of search terms that search data sources 112 for data associated with dimensions 130. For example, command center 100 may identify messages, tweets, comments, hashtags, images, likes, posts, etc. containing, referring to, or associated with the search terms Acme, acmelive, widgetA, and widgetB.

A function of the management server is to choose an appropriate query based on the dimension name for the third party data source. For instance, if the dimension name was "Widget A", management server 120 might try and find analytic data on all posts on connected social networks that mention "Widget" and "A" while at the same time find analytic data on all posts with the hashtag "#WidgetA" with no additional input or instruction from the user other than typing in the name "Widget A".

Command center 100 then generates content and metrics 132 for the identified data and displays content and metrics 132 on display devices 102, 104, and 106. Command center 100 may initially display the content and metrics associated with the acmelive event. For example, in FIG. 2 the analytics engine 114 may identify in metric 132A the total number of Twitter® messages (tweets) generated from the @acmelive account or referring to the @acmelive account and the number of those Twitter® messages generated per minute.

Command center 100 in FIG. 2 may display content 132B from some of the messages generated by celebrities attending the event. For example, analytics engine 114 may identify any users with a particular influence score or number of followers above some threshold level as a celebrity. Command center 100 also may store a predetermined list of celebrities. Command center 100 may display messages 132B generated by any of the identified celebrities that refer to the @acmelive account or are generated from the @acmelive account.

Analytics engine 114 also may display journalist messages 132C. For example, command center 100 may display messages generated from particular publisher accounts that refer to the @acmelive event or are generated from the @acmelive account. Command center 100 also may store a white list of journalist accounts and display messages from the list that refer to the @acmelive event. In another example, command center 100 may display random messages sent from the general public.

Command center 100 may display a running time and remaining time 132D for the acmelive event. Command center 100 also may extract and display an image 132E from the acmelive account, such as a company logo. For example, command center 100 may copy an image displayed in the @acmelive webpage.

Analytics engine 114 in FIG. 2 also may generate a topic graph 132F linking different terms used in the acmelive messages. For example, analytics engine 114 may generate graph 132F from the list of topics @acmelive, @widgetA, and @widgetB provided by the Acme company employee. Analytics engine 114 may generate a circle with a diameter proportional to the total number of messages associated with @acmelive. Analytics engine 114 then may generate other circles with diameters proportion to the number of @acmelive messages that include terms @widgetA and @widgetB.

Command center 100 may identify any other topics in topic graph 132F associated with @acmelive either based on the topic list received via computer 122 or adhoc. For example, analytics engine 114 may identify the other most frequently used terms, labels, hashtags, etc. in the @acmelive messages and possibly in the @widgetA and @widgetB messages. Analytics engine 114 then generates circles in graph 132F with diameters proportional to the number of adhoc messages that include the terms and creates links that indicate which messages contained the terms.

For example, topic graph 132F indicates that a first number of @acmelive messages included the term #acme, a second number of @acmelive messages included the term #acmephone, and a third number of @acmelive messages included the term #IOS8. Topic graph 132F also indicates a number of @widgetA and @widgetB messages also included the term #IOS8.

Command center 100 allows the viewer to search further into identified terms. For example, the viewer may discover a relatively large number of @acmelive messages include the term #IOS8. The viewer may enter the term IOS8 into remote control application 156 in FIG. 1 or may simply click on the circle in topic graph 132F associated with #IOS8. Command center 100 then may conduct a new search that identifies and generates content and metrics 132 associated specifically with the #IOS8 dimension. The newly generated content and metrics may provide further insight on what customers at the event are thinking and saying about #IOS8.

Analytic engine 114 in FIG. 2 also may generate different timelines 132G that identify the number of messages generated over the same relative time periods for different topics. For example, a first graph 140A may identify the number of @acmelive messages generated over different 30 minute time periods. A second graph 140B may identify the number of @widgetA messages generated during the same 30 minute time periods, and a third graph 140C may identify the number of @widgetB messages generated during the same 30 minute time periods.

Timelines 132G may reflect the popularity for different portions of an event or different products announced during the acmelive event. For example, a peak in graph 140B may correspond to the announcement of widgetA during the acmelive event and a peak in graph 140C may correspond with the announcement of widgetB during the acmelive event. The larger number of messages associated with graph 140C may indicate consumers are more interested in, or like, widgetB more than widgetA. In another example, a peak in graph 140A also may indicate a problem or other relatively significant event during the acmelive event.

The application operating on display device 104 may include separate display modules 142A-142G that each display different content or metrics 132 for the selected dimension. For example, display module 142A may be responsible for displaying the number of Twitter® messages sent per minute and total Twitter® messages 132A associated with the @acmelive event. Display module 142B may be responsible for displaying the contents of celebrity Twitter® messages 132B.

Display modules 142 automatically synchronize content and metrics 132 for the selected dimension over a same relative time period. For example, display module 142G displays timelines 132G identifying the number of Twitter® messages generated for the @acmelive event for 30 minute time periods on the day of the @acmelive event. Display module 142C displays the content of journalist Twitter® messages 132C for the same time periods during the same day. For example, display module 142C may continuously display and update journalist messages 132C for each thirty minute time period on the day of the @acmelive event.

Figure 3:
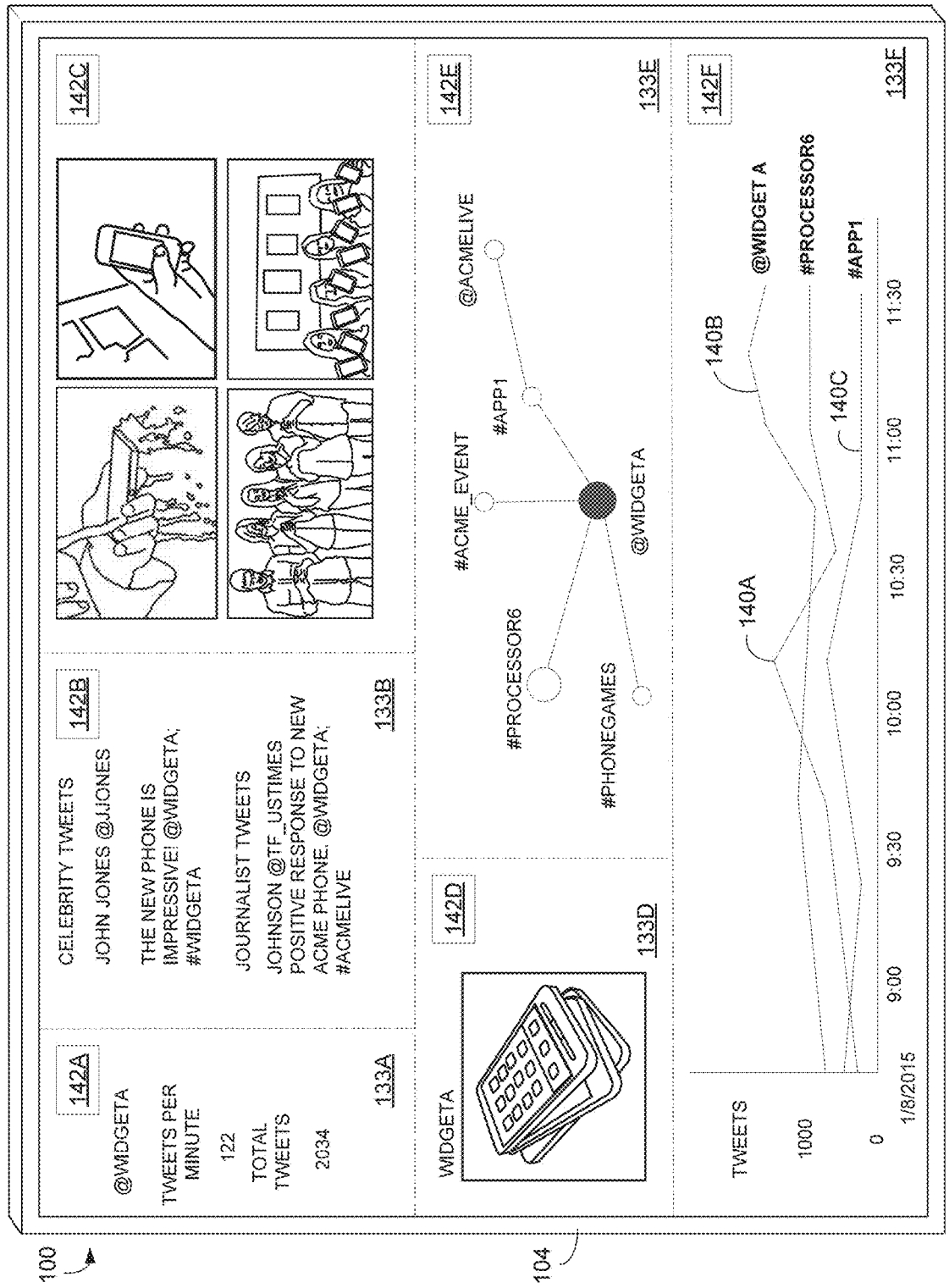
FIG. 3 depicts another example of different content and metrics displayed by the command center.

FIG. 3 shows another example of data displayed by the command center. Referring to FIGS. 1 and 3, a user may select a different dimension via remote control application 156 for displaying on display devices 102, 104, and 106. For example, the user may select the dimension or topic widgetA via selection of one of icons 154 displayed on device 110. In response to selecting icon 154, command center 100 generates and displays content and metrics 133 associated with widgetA.

For example, display modules 142 receive a new input vector 135 from socket server 108 identifying the new widgetA dimension. Each display module 142 then requests new data from analytics engine 114 for widgetA. For example, display module 142A may send a request to analytics engine 114 for the number of Twitter® messages associated with @widgetA. Separately, display module 142B may send a request to analytics engine 114 for celebrity messages associated with @widgetA.

In response to the request sent by display module 142A, analytics engine 114 may calculate the number of messages generated per minute and total generated messages 133A associated with @widgetA. In response to the request from display module 142B, analytics engine 114 also may identify content in celebrity messages 133B that refer to @widgetA.

In FIG. 3, command center 100 also identifies and displays images 133C from messages associated with @widgetA. For example, per a request from display module 142C, analytics engine 114 may extract images 133C from Instagram® messages that are generated from the @widgetA account or refer to @widgetA.

Command center 100 also displays a new image 133D representing widgetA. For example, per a request from display module 142D, analytics engine 114 may extract an image displayed on the web page of the @widgetA account. Display module 142D also may change the background color on display device 104 either to a color corresponding to the home web page for the @widgetA account or change the background color on display device 104 to any other color different from the background color previously used in FIG. 2. The change in background color on display device 104 and displaying image 133D provides a visual indication that the information on display device 104 has changed and is now associated with a different widgetA dimension.

In response to a request from display module 142E, analytics engine 114 generates a new topic graph 133E that now identifies the topics, hashtags, labels, etc. most frequently used in the messages associated with @widgetA. For example, topic graph 133E indicates that #processor6 is one of the most frequently used terms in the @widgetA messages.

In response to a request from display module 142F, analytics engine 114 also generates a new set of timelines 133F associated with @widgetA. For example, graph 140B may be the same graph previously shown in FIG. 2 showing the number of messages generated for @widgetA. However, graphs 140A and 140C now show changes in the number of messages for other topics specifically associated with @widgetA. For example, graph 140A may show the number of messages associated with a processor6 used in widget and graph 140C may show the number of messages associated with a software application running on widgetA.

Analytics engine 114 and display modules 142 generate and display content and metrics 133 for widgetA adhoc and in substantially real-time based on input vectors 135 received from remote control application 156 operating on device 110. The different display modules 142D automatically synchronize content and metrics 133 for the new selected widgetA dimension over the same relative time periods. For example, either via a time value included in input vector 135 or based on a preconfigured time period, each of display modules 142 will display the associated content or metric 133 for a same relative time period. For example, each display module 142 may display the associated content or metrics for the same corresponding 30 minute time periods over a current day.

Thus, a user can navigate through different dimensions associated with events, products, services, topics, etc. simply by selecting different icons displayed on device 110 in FIG. 1. All of the different content and metrics associated with the selected dimension is then automatically synchronized to the same relative time period. This navigation capability allows the viewer to better monitor, analyze, and correlate different data for different topics.

Figure 4:
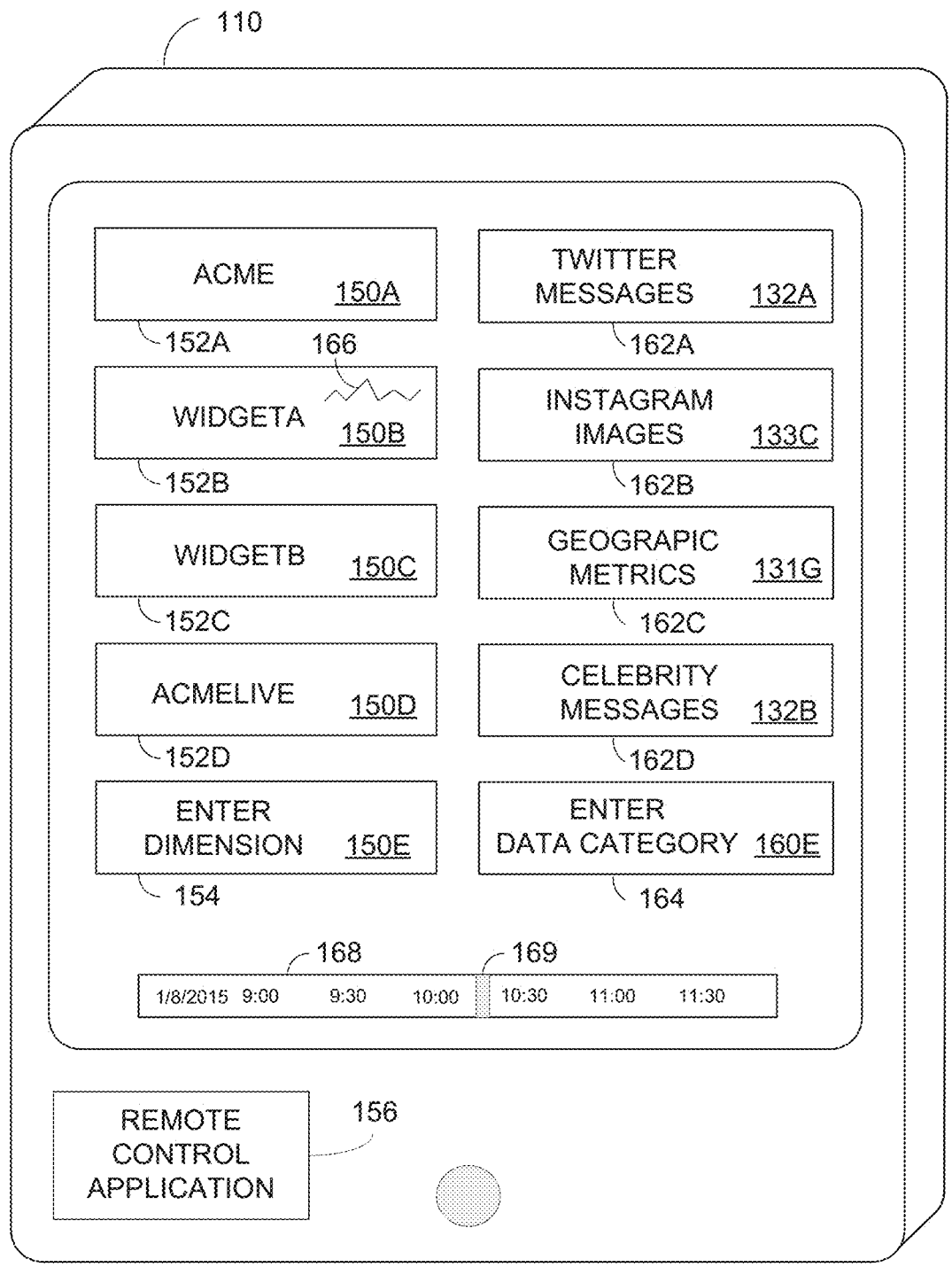
FIG. 4 depicts example remote control application used to control what data is displayed by the command center.

FIG. 4 shows remote control application 156 operating on device 110 in more detail. As described above, an operator may provide a list of dimensions 150 associated with a particular entity, event, or topic. In this example, a top level dimension 150A may be associated with the Acme company. Sub-dimensions 150B-150D may include products, services, topics and/or events associated with the Acme company, such as widgetA, widgetB, and acmelive, respectively.

Referring to FIGS. 1 and 4, device 110 may comprise a smart phone, tablet, watch, laptop, or any other portable computing device that operates remote control application 156. Application 156 displays a set of icons 152A-152D associated with dimensions 150A-150D, respectively. The viewer may select any of icons 152A-152D to view the content and metrics associated with dimensions 150A-150D, respectively. For example, as shown above, the operator may change from viewing content and metrics associated with the acmelive event 150D in FIG. 2 to viewing content and metrics associated with widgetA 150B in FIG. 3 simply by selecting icon 152B.

Remote control application 156 also may display a field 154 for entering other dimensions that are not currently displayed. For example, a user may enter any dimension, brand, account, hashtag, label, or topic 150E into field 154. Application 156 may send dimension 150E to management server 120, analytics engine 114, and display modules 142 in FIG. 2. Management server 120 may cause collection server 116 and analytics engine 114 to connect and download data from multiple data sources 112 associated with dimension 150E. Analytics engine 114 may generate metrics from the data and display modules 142 operating in applications on display devices 102, 104, and 106 may display the content and metrics.

Remote control application 156 also may display icons 162 associated with different content and metrics. For example, application 156 may display an icon 162A associated with Twitter® messages 132A, display an icon 162B associated with Instagram® messages 133C, display an icon 162C associated with geographic data 132E, and display an icon 162D associated with celebrity messages 132B. A user may change the content or metrics generated and displayed on display devices 102, 104, and 106 by selecting associated icons 162.

Display modules 142 in FIGS. 2 and 3 may initially display a group of content and metrics 132 as shown in FIG. 2. The user may change the types of content and metrics displayed by display modules 142 in FIG. 2 by selecting different icons 162 in FIG. 4. For example, the user may cause display module 142C to change from showing journalist messages 132C in FIG. 2 to displaying images 133C from Instagram® messages in FIG. 3 by selecting icon 162B in FIG. 4.

Similarly, the user may cause display module 132F to change from displaying topic graph 132F in FIG. 2 to displaying location map 131G in FIG. 1 by selecting icon 162C in FIG. 4. An icon 164 allows the user to enter any other data category, content, metric, etc. that is not currently associated with one of icons 162. Icons 162 also may include screen location identifiers (not shown) that indicate where to locate the associated content or metric within the display devices.

In one example, the application operating on at least one of display devices 102, 104, and/or 106 in FIG. 1 also may display the same icons 152 and/or 162 and fields 154 and 164 displayed on device 110. The user may touch the screen of the display device or touch the screen of device 110 to then select any of the icons 152 or 162, or enter values into fields 154 or 164.

In another example, remote control application 156 in FIG. 4 may display a portion of the associated content or metric within icons 152 or 162. For example, remote control application 156 may display a sparkline 166 within icon 152B that corresponds with the number to Twitter® messages for graph 140B in FIG. 2. A spike in sparkline 166 may provide a visual indication of event associated with widgetA.

Remote control application 156 may generate a notification identifying the event in sparkline 166. For example, analytics engine 114 may detect a volume of messages above a normal threshold. Analytics engine 114 then may push a notification message to application 156 indicating the number of Twitter® messages associated with widgetA has reached an all-time high. Application 156 then displays the message on device 110.

Remote control application 156 also may display a timeline 168. A user may move a scroll bar 169 to select different time periods for the content and metrics displayed by the display modules 142. Application 156 sends the time value selected by scroll bar 169 as part of input vector 135 in FIG. 1. The display modules in the display devices 102, 104, and 106 then display their associated content or metrics for the selected time value.

Thus, command center 100 creates adhoc multidimensional searches for data contained in different data sources. Command center 100 without any additional programming then generates and displays synchronized content and metrics for other selected dimensions enabling users to visually compare different types of data and then navigate through other dimensions and associated content and metrics simply by selecting different items from the remote control application 156.

Figure 5:
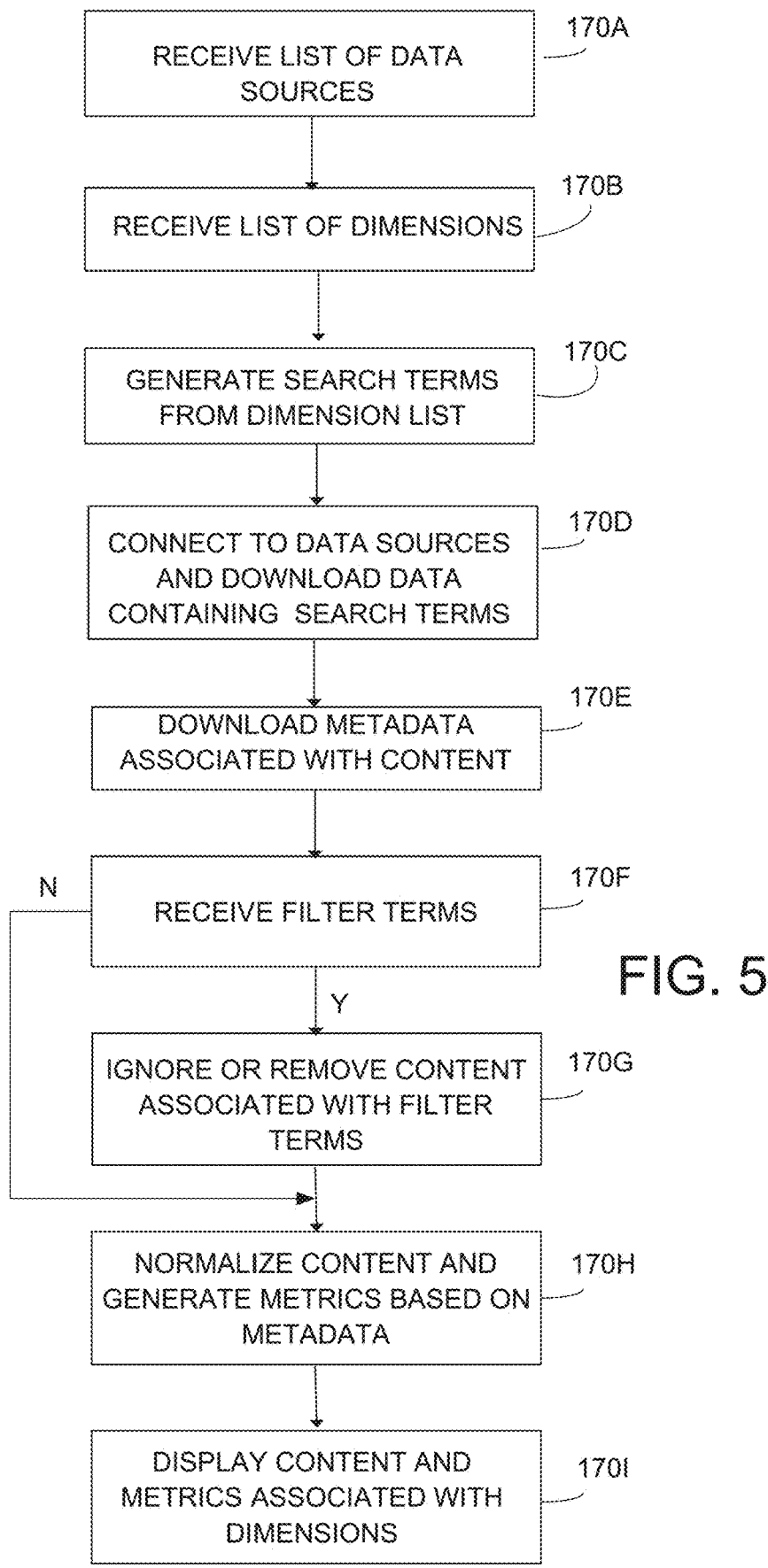
FIG. 5 depicts an example command center process for displaying data.

FIG. 5 depicts an example process for generating content and metrics. Referring to FIGS. 1 and 5, command center 100 in operation 170A receives a list of data sources. For example, an operator may enter a list via computer 122 that includes links to different social network websites, company websites, third party websites, and other data, such as spreadsheets, inventory databases, sales databases, reports, etc.

In operation 170B, command center 100 receives a list of dimensions via computer 122 or remote control device 110. As explained above, the list of dimensions may include any combination of products, events, services, topics, labels, etc. that a user wishes to monitor. In operation 170C, command center 100 generates a list of search terms associated with the list of dimensions. For example, command center 100 may convert the word ACME into search terms, such as acme, @acme and #acme.

In operation 170D, command center 100 connects to the different data sources and searches for data associated with the search terms. For example, command center 100 uses APIs 124 and 126 for the different data sources 112A and 112B, respectively, to download data associated with the search terms. For example, collection server 116 may search an ACME account on a Twitter® website, a Facebook® website, and an Instagram® website. Collection server 116 also may search a WWW.acme.com website.

Collection server 116 downloads data 114 from the different data sources 112B into database 118, such as content and associated metrics for messages, posts, images, etc. Analytics engine 114 also may download real-time streaming data 128 from data sources 112A.

The user may enter different dimensions associated with a corporate product hierarchy into computer 122 or command center 100 may determine the dimensions based on a URL hierarchy. For example, a user may enter the dimension ACME into computer 122. Collection server 116 may identify a first acme directory or acme web page in data sources 112 with the most volume as a root dimension and identify a widgetA sub-directory or sub-web page with a second largest amount of volume as a first sub-level dimension of the acme directory or web page.

Collection server 116 also may search for the closest string matches for widgetA, widgetB, and acmelive below the www.acme.com web page as www.acme.com/widgetA, www.acme.com/widgetB, and www.acme.com/acmelive. Collection server 116 may assume that every web page below a root web page is associated with the same root web page. For example, analytics engine 114 may count all user visits and messages to web page www.acme.com/widgetA and all visits to web pages below www.acme.com/widgetA as associated with widgetA.

In operation 170E, collection server 116 captures metadata associated with the dimension data. For example, command center 100 may identify time stamps and geographic data associated with the dimension and/or identify any other profile information associated with the user that accessed the web page or posted the message associated with the dimension.

In operation 170F, command center 100 may receive filter terms. For example, command center 100 may extract data from different data sources that are unrelated to the dimension. For example, a user may enter the dimension @acme for an account operated by a company that makes smart phones. However, command center 100 may identify additional data related to a @acme1 account operated by a company that sells shoes. Command center 100 may display the two terms @acme and @acme1 to the user and the user then may select terms for filtering, such as @acme1. In operation 170G, collection server 116 and/or analytics engine 114 either does not download the data associated with @acme1 or deletes downloaded data associated with @acme1.

In operation 170H, the downloaded data is normalized based on the associated metadata. For example, the metadata may include timestamps. Command center 100 may download different data from different data sources and generate different metrics for the different data based on the time stamps. For example, sales data from a first data source may include times and dates of sales for widgetA. Twitter® messages related to widgetA from a second Twitter® website may include times when messages were sent by users.

Command center 100 may accumulate data from the first and second data source for 30 minute time periods over the same day or week. Analytics engine 114 then generates a first graph showing the number of sales of widgetA for each 30 minute time period during a given day. Analytics engine 114 generates a second graph that shows the number of Twitter® messages associated with widgetA and content for some of the Twitter® messages for each 30 minute time period during that same day. Thus, both the sales figures and Twitter® messages are normalized over the same time periods. This normalization provides more intuitive visual correlation between the objective sales data and the more subjective social media content.

In operation 170I, the display modules display the content and metrics associated with the selected dimensions. Real-time content and metrics may be combined from data previously collected and accumulated over previous time periods. For example, analytics engine 114 may continuously receive the latest real-time streaming data 128 associated with a particular dimension. Analytics engine 114 may continuously accumulate and combine the real-time data with the previously accumulated data contained in database 118. The latest content associated with the dimension may be displayed and the associated metrics readjusted on display devices 102, 104, and 106.

Figure 6:
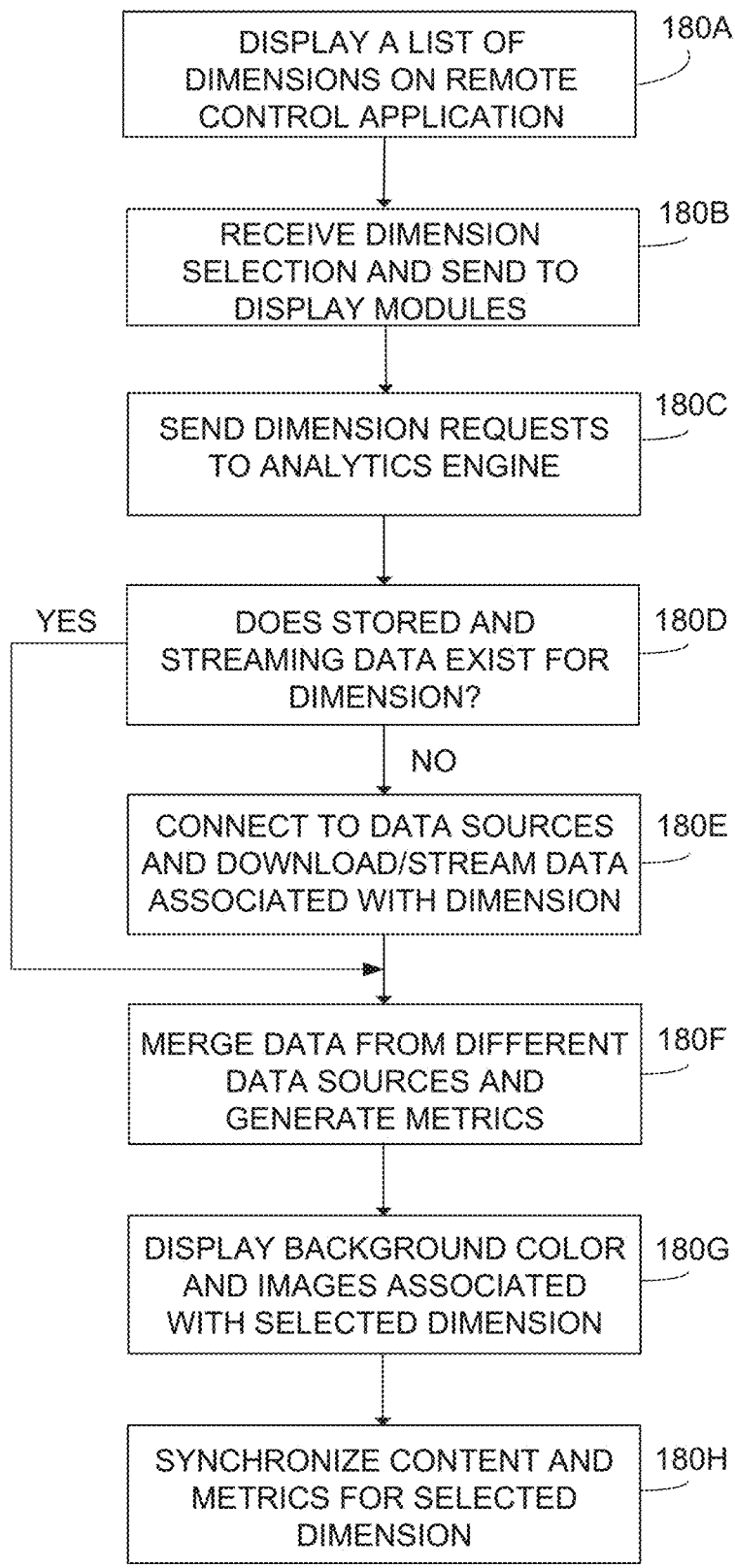
FIG. 6 depicts an example command center process for changing dimensions.

FIG. 6 shows an example process for varying the content and metrics currently displayed by the command center. Referring to FIGS. 1 and 6, remote control application 156 on device 110 in operation 180A displays different dimensions, content, and/or metrics. In operation 180B, application 156 detects a selection of an icon associated with a dimension, content, and/or metric that is not currently displayed on display devices 102, 104, or 106. Application 156 sends an input vector to socket server 108 in FIG. 1 and the socket server sends the input vector to the display modules operating in the display devices.

In operation 180C, the display modules send requests to the analytics engine for data associated with the selected dimension. For example, a first display module may ask the analytics engine to generate a graph displaying the number of Twitter® messages generated each 30 minutes for the selected dimension. A second display module may ask the analytics engine to provide images from Instagram® messages sent over the last 30 minutes for the selected dimension. As mentioned above, the user may select a specific time period for the dimension using timeline 168 in FIG. 4.

In operation 180D, display modules 142 and/or analytics engine 114 determine if data for the selected dimension and time period are currently being streamed and/or stored from data sources 112. If not, command center 100 connects to data sources 112 and searches for data associated with the selected dimension.

In operation 180F, analytics engine 114 merges the data from the different data sources 112 associated with the selected dimension. For example, analytics engine 114 merges real-time streaming data 128 with the data downloaded into database 118. Merging real-time data 128 with stored data 114 allows analytics engine 114 and display modules 142 to generate, display, and continuously update content and metrics associated with the selected dimension.

In operation 180G, one of the display modules 142 may display a background color and/or image associated with the selected dimension. For example, one of display modules 142 may identify a color and/or image displayed on a top web page associated the selected dimension and display the color and image on display devices 102, 104, and 106. The display module may change the background color or font on the display devices to indicate content and metrics are now being displayed for a new dimension.

In operation 180H, different display modules 142 display synchronized content and metrics for the selected dimension, time period, location, etc. The displayed content and metrics may depend on the data provided by the data sources. For example, a data source such as Google® analytics may identify the number of user visits, time on page, etc. for each web page. A data source such as Salesforce.com® may contain reports for sales figures, inventory, etc. Display modules 142 may display metrics for the user visits provided Google® analytics and display metrics for the sales figures provided by the Salesforce.com® reports. As explained above, the display modules display content and data for the same synchronized time periods.

Figure 7:
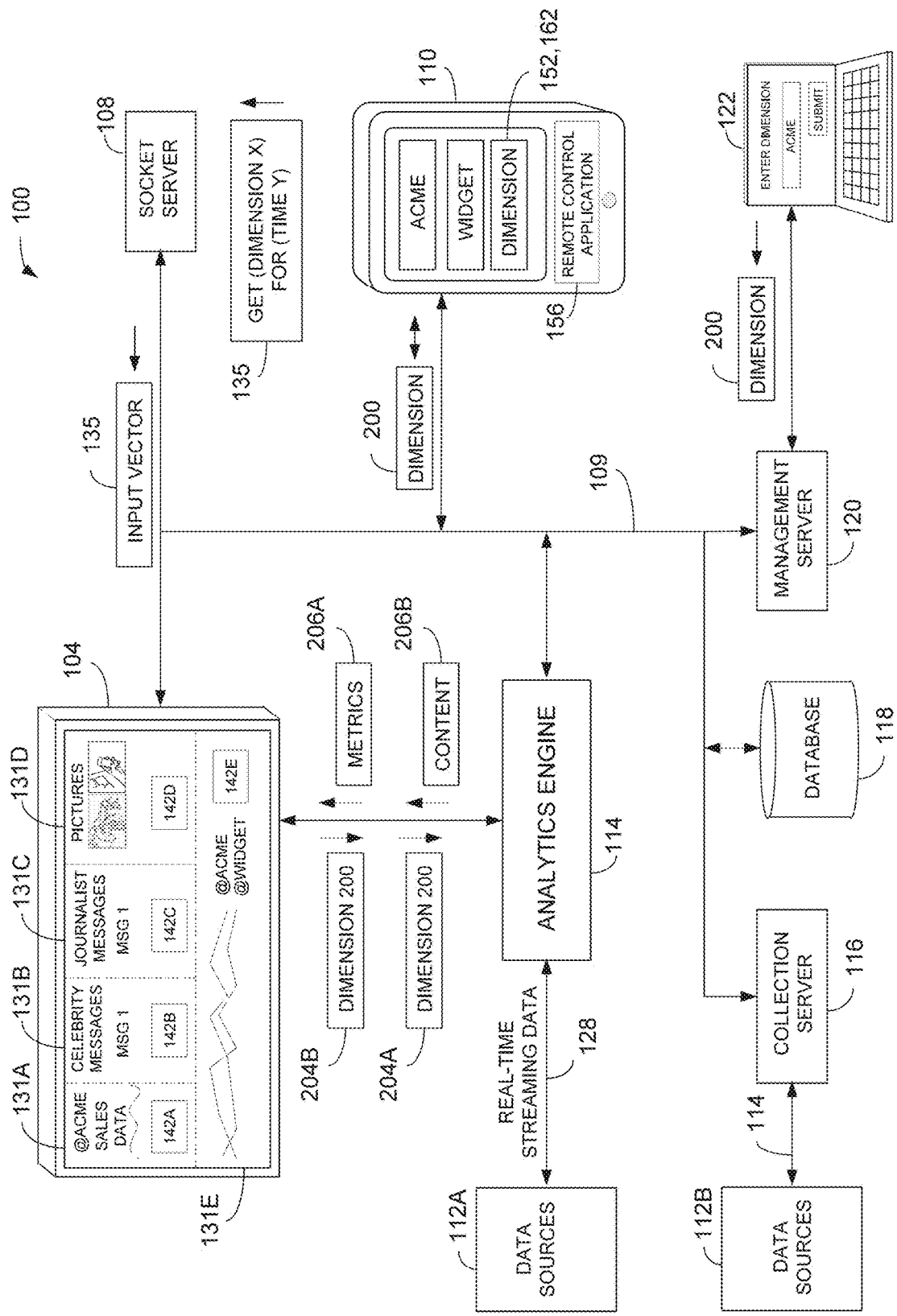
FIG. 7 depicts an example process for exchanging input vectors between different applications operating in the command center.

FIG. 7 shows how messages are exchanged between different applications in command center 100. The applications running on the devices in command center 100 operate as a real-time multi-dimensional search engine that synchronizes together different content and metrics for selected dimensions. In one example, messages and data are exchanged between the different applications operating in command center 100 via an Internet network 109. Of course, command center 100 may use any combination of wide area networks (WANs), local area network (LANs), wireless cellular networks, or WiFi networks 109.

Devices 104, 108, 110 114, 116, 120, and 122 may operate separate applications that are all part of a single universal resource locator (URL). If loaded on display device 104 or display device 106, the URL operates a set of display modules that display content and metrics 131. If loaded on device 110, the URL transitions into remote control application 156 described above in FIG. 4.

As explained above, remote control application 156 uses socket server 108 to control display modules 142 operating in display device 104. Socket server 108 allows browser sessions operating on the different command center devices to talk to each other and transfer data. Socket server 108 also allows remote control application 156 to send asynchronous input vectors 135 to display modules 142 without display modules 142 constantly polling application 156 for a current list of selected dimensions.

A user enters one or more dimensions 200 into computer 122 or enters one or more dimensions 200 into remote control application 156. Computer 122 may forward any received dimensions 200 to management server 120 and to remote control application 156. Remote control application 156 may display dimensions 200 received from computer 122 as icons 152 or 162. Remote control application 156 may send an input vector 135 that identifies dimensions 200 both to management server 120 and to socket server 108.

Management server 120 maintains a list of all available dimensions and determines if the selected dimensions 200 are contained in database 118. If not, management server 120 may direct collection server 116 and/or analytics engine 114 to connect to data sources 112 and search for data associated with dimensions 200.

Socket server 108 sends input vector 135 to display modules 142 that identify dimensions 200 selected via application 156. Display modules 142 then send messages 204 to analytics engine 114 requesting data associated with dimensions 200. For example, display module 142A may send a message 204A requesting sales data associated with dimension 200 and display module 142B may send a message 204B requesting celebrity Twitter® messages associated with dimension 200.

Analytics engine 114 provides data 206 back to display modules 142 containing the content and metrics available for dimension 200. For example, analytics engine 114 may send metrics 206A back to display module 142A identifying the number of sales associated with dimension 200 for the last 24 hours. Analytics engine 114 may send content 206B back to display module 142B comprising celebrity Twitter® messages associated with dimension 200.

Display modules 142 continue to ask for new data from analytics engine 114 and coordinate how the new data is displayed and merged with other data. For example, display modules 142 determine what content and metrics are displayed on the display device and how updates to the content and metrics are integrated with previously displayed data. If additional data is needed, display modules 142 may direct analytics engine 114 and/or collection server 116 to download additional data associated with dimensions 200.

Another socket server (not shown) may be connected between data sources 112A and analytics engine 114. Analytics engine 114 may not only warehouse data or pass data through to display modules 142, but may combine the data from the different data sources 112 together into a hybrid set of content and metrics. Analytics engine 114 and display modules 142 also provide real-time updates to the content and metrics displayed on display device 104. Some information loses value after a short amount of time. Therefore, the real-time streaming by analytics engine 114 and display modules 142 allow a user to identify trending topics and select, search, and generate more up to the minute content and metrics associated with those topics.

Analytics engine 114 also may archive data for playback. For example, computer 122 may display a timeline or application 156 may display timeline 168 in FIG. 4. The user may choose other time dimension ranges or even scroll a timeline to display data associated with specific points in time within a larger time period. Analytics engine 114 may store data for different selected and non-selected dimensions in database 118. The user may replay the stored data for any event or dimension regardless if the event or dimension was ever previously selected by the user.

In summary, remote control application 156 generates input vectors 135 that may include dimension 200 and/or a time values. Socket server 108 sends the input vectors 135 to each of the different display modules 142. Display modules 142 then separately communicate with analytics engine 114 requesting different content or metrics 131. Display modules 142 then display the associated content or metric for the same synchronized time periods on display device 104.

Input vectors 135 in combination with control display modules 142 allow command center 100 to automatically display synchronized content and metrics for any selectable dimension on any display canvas configuration. For example, one command center 100 as shown in FIG. 1 may include multiple display devices 102, 104, and 106. A command center administrator simply configures different display modules 142 to different locations within the different display devices 102, 104, and 106. Display modules 142 operating on the different display devices 102, 104, and 105 then automatically take over responsibility for displaying the associated content or metric 131 for any received dimension received via input vector 135.

Command center 100 may display a set of selectable display modules 142. A user may select display modules 142 for displaying different types of data on display device 104. For example, display device 104 may display a set of display modules 142 in a toolbar and the user may drag and drop different display modules 142 into different locations in display device 104. In another example, computer 122 and/or remote control device 110 may display the display modules in a tool bar and drag and drop display modules 142 into different locations of a virtual image of the display device 104. The selected display modules 142 then take over displaying associated types of data in the selected locations of display device 104.

Dynamic Topic Correlation

Figure 8:
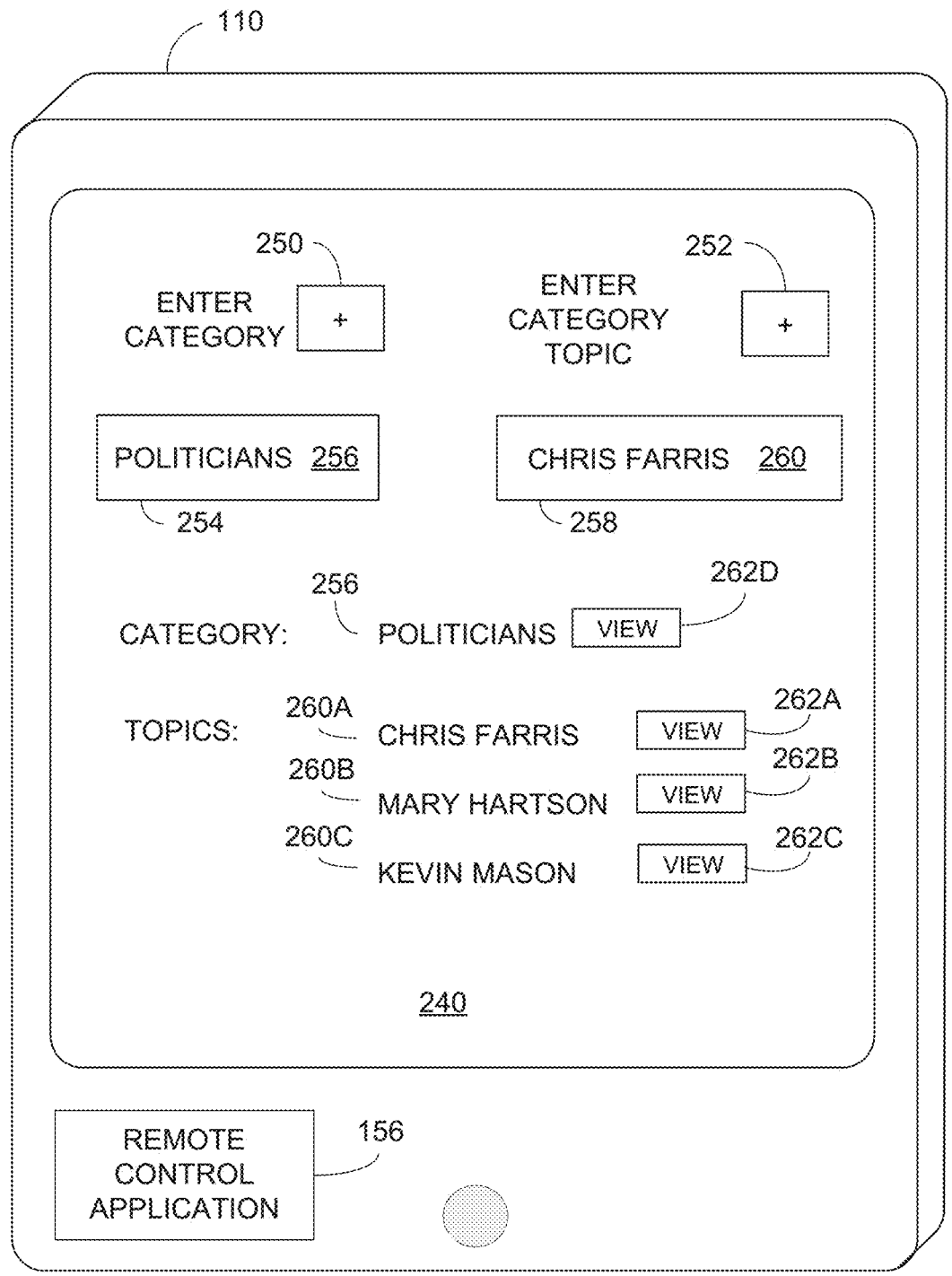
FIG. 8 depicts another example remote control device.

FIG. 8 displays remote control device 110 in more detail. As mentioned above, a dimension may include any topic, segment, data category, gender, geography, time, content, metric, product, service, event, label, hashtag, gender, geography, time, content, metric, etc. The example below uses the term topic interchangeably with dimension.

Referring to FIGS. 7 and 8, remote control application 156 may provide a user interface 240 for dynamically selecting and displaying different categories 256 and/or different topics 260. In response to selecting icon 250, remote control application 156 may display a field 254 for entering a category 256. In response to selecting icon 252, remote control application 156 may display a field 258 for entering a topic 260. Category 256 and topic 260 may include any subject that the user would like to view on display device 104.

In this example, the user creates a politicians category and creates topics under the politicians category for different political candidates. The user may enter the word "politicians" into field 254 as category 256. However, the user may enter any word, phrase, term, etc. into field 254 and create any number of categories 256. In this example, the user enters the word "Chris Farris" into field 258 as a candidate topic 260 underneath politicians category 256. The user also may enter any word, phrase, term, etc. into field 258 and create any number of topics 260 for category 256. For example, the user may enter other candidate topics 260 into field 258, such as Mary Hartson and Kevin Mason. Remote control application 156 may save categories 256 and associated topics 260 in memory.

Remote control application 156 may display categories 256 and associated topics 260 in response the user selecting other icons in user interface 240. For example, remote control application 156 may display all of the categories previously entered by the user on a first screen of user interface 240. In response to selecting politicians category 256, remote control application 156 may display the associated politicians topics 260A-260C for Chris Farris, Mary Hartson, and Kevin Mason, respectively.

The user may enter other categories 256 or topics 260 into remote control device 110. Command center 100 then may identify any related topics. For example, the use may enter a category for sports into remote control device 110 and command center 100 may identify different related topics, such as hockey, basketball, football, and baseball.

Command center 100 may search different data sources 112 for data associated with the three topics 260A-260C entered by the user for politicians category 256. In another example, command center 100 may dynamically identify topics 260. For example, the user may not enter any topics 260 for politicians category 256, or the user may only enter a few topics 260. Command center 100 may automatically identify additional topics 260 for politicians category 256 and display the identified topics 260 on user interface 240. Automatically generating topics 260 is described in more detail below in FIG. 9.

Remote control application 156 may display view icons 262 next to category 256 and associated topics 260. Remote control application 156 may cause command center 100 to search for data related to topics 260 or generally to category 256 in response to selecting view icons 262A-262D. For example, command center 100 may search for data related to politicians category 256 in response to a user selecting view icon 262D. In another example, command center 100 may search different data sources 112 for data associated with Chris Farris topic 260A in response to a user selecting view icon 262A.

Command center 100 may start searching data sources 112 as soon as the user enters a category 256 and/or topic 260 into remote control device 110. Otherwise, command center 100 may search for data associated with selected categories 256 and/or topics 260 and display the data on display devices 104 in response to the user selecting view icons 262.

In another example, remote control device 110 and/or computer 122 may include voice recognition software. The user may utter voice commands into remote control device 110 and/or computer 122 to create and view categories 256 and/or topics 260. For example, the user may speak into a microphone on remote control device 110 and give the oral command "create topic." Remote control application 156 may display field 258 in response to the voice command. Remote control application 156 may create topic 260A in response to the user then uttering the voice command "Chris Farris." Remote control application 156 may display data related to topic 260A in response to the user then uttering a voice command, such as "view topic Chris Farris."

Remote control application 156 also may change topics and display data associated with the new topics in response to voice commands. For example, command center 100 may currently display data for Chris Farris and also display a metric showing the number of messages posted over the day for Chris Farris, Mary Hartson, and Kevin Mason. The user may utter the voice command "view topic Kevin Mason" into remote control device 110. Remote control application 156 sends the new topic "Kevin Mason" to command center 100 and command center 100 then searches and displays data for "Kevin Mason" on display device 104.

Figure 9:
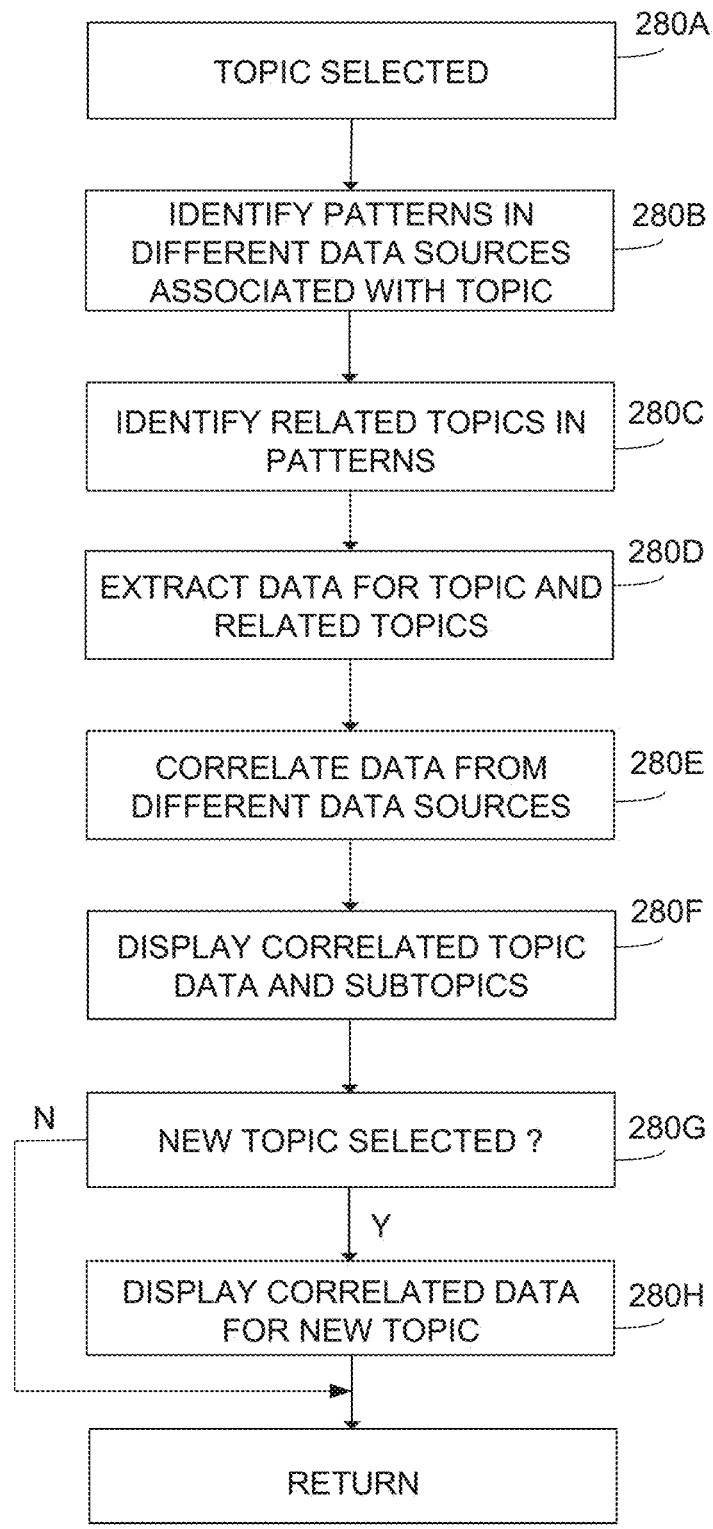
FIG. 9 depicts an example process for correlating topics.

FIG. 9 depicts an example process for dynamically identifying topics and correlating data for the identified topics. Referring to FIGS. 7, 8, and 9, command center 100 dynamically correlates data from disparate data sources 112 with different topics 260. The user may identify the primary topic and command center 100 may automatically identify related topics. A user simply enters a topic 260 into remote control device 110 to view the correlated data associated with that topic 260. Command center 100 enables users to dynamically navigate and view correlated data for other related topics 260 simply by selecting topic inputs on remote control device 110.

In operation 280A of FIG. 9, command center 100 may detect selection of a topic. For example, the user may enter a topic name into device 110 as described above in FIG. 8.

In operation 280B, command center 100 may identify patterns in different data sources 112 based on data structures used in data sources 112.

For example, a first data source 112 may include structured data from a company website. As explained above, the website may have a root directory associated with the company and include subdirectories for different products, services, or activities associated with the company. The subdirectories for the different products, services, or other activities may include additional subdirectories for associated campaigns, activities, etc.

Command center 100 may use the root directory and subdirectories to identify related topics. In the example above, the user may select the politician Chris Farris as a primary topic. Command center 100 may search the website operated by Chris Farris and identify a root directory and subdirectories on the website identifying different political topics. For example, one sub-directory may relate to foreign policy and a second sub-directory may relate to immigration. In operation 280C, the command center may identify both foreign policy and immigration as topics related to Chris Farris.

In operation 280D, command center 100 extracts data for the identified topics. In this example, command center 100 may extract metric, image, and/or any text data from the Chris Farris website related to foreign policy and immigration.

Data center 100 may use webpage analytics to help identify patterns and related topics. For example, web analytic services may identify the number of visits, clicks, dwell times, data selections, etc. for webpages. Command center 100 may extract data and identify topics from the directory names and webpages with the most visited webpages.

Command center 100 may identify other patterns and topics for data sources 112 with other data structures. For example, command center 100 also may search a social media account @Chris Farris. The social media account may not have a directory structure with a root directory and subdirectories like the privately operated website. Command center 100 may identify patterns in the social media account based on conversations, influencers, keywords, hashtags, message reuse, or the like, or any combination thereof.

For example, some social media websites identify messages or accounts with the largest number of likes or highest trending scores. Social media websites also may identify messages posted by users with the largest number of followers or largest influence. Social media messages also may include links, hashtags, accounts, and other content.

In operation 280B, command center 100 may identify patterns and related topics based on the conversations, number of likes, influencers, keywords, hashtags, content, etc. associated with the messages in the social media account. For example, command center 100 may identify messages posted in the @Chris Farris account from large influencers or with a large number of likes. The messages may repeatedly refer to campaign funding. Command center 100 may identify campaign funding as a new topic associated with Chris Farris.

In the operation 280D, command center 100 extracts data for the topic selected by the user and may extract data for related topics. For example, command center 100 may extract and store metrics, text, and images for the selected topic Chris Farris, and also extract and store metrics, text, and images for the dynamically identified related topics of foreign policy, immigration, and campaign funding.

In operation 280E, command center 100 may correlate the data extracted from the different data sources 112. As explained above, command center 100 may use timestamps to correlate the different data with a same time period. For example, command center 100 may identify metrics from a first structured data source 112 identifying website usage on the Chris Farris private website for each hour of the day. Command center 100 also may identify messages from the @Chris Farris social media account posted by the biggest influencers or with the most likes. Command center 100 identifies the messages with timestamps for the same hour time periods during the same day.

In operation 280F, command center 100 displays the correlated data for the selected topic and for possibly related topics. As explained above, some display modules 142 may display data related to a user-selected topic, such as for topic Chris Farris. For example, one display module 142 may display the metrics for the webpage usage metrics from the Chris Farris private website and a second display module 142 may display the most popular messages posted on the @Chris Farris social media account.

Other display modules 142 may display content for related topics. For example, as described above in FIG. 8, the user may have entered three topics 260A-260C into remote control device 110 for Chris Farris, Mary Hartson, and Kevin Mason, respectively. One display module 142 may display metrics that show the number of messages posted each hour on Chris Farris, Mary Hartson, and Kevin Mason social media accounts.

Another display module may display the dynamically discovered topics for foreign policy, immigration, and campaign funding. The display module correlates the foreign policy, immigration, and campaign funding topics in time with the other data for Chris Farris, Mary Hartson, and Kevin Mason.

In operation 280G, the user may select a new topic. For example, the user may select one of the other politician topics 260B or 260C displayed on remote control device 110 in FIG. 8 or the user may manually enter a new topic into remote control device 110. The user also may select topics that command center 100 automatically discovered while searching for previous topics and then displayed on user interface 240 of remote control device 110.

In operation 280H, command center 100 searches and displays the data for the new topic. For example, remote control application 156 sends the selected topic to display modules 142 that then request and display the data associated with the new topic.

In another example, the user may want to track a candidate debate between three politicians. The user may enter the three politician topics 260A-260C into remote control application 156 as described above in FIG. 8. Remote control application 156 may cause command center 100 to search and display data related to all three politicians 260A-260C. During the debate, one of display modules 142 may track the number of messages on a social media site for each of the politicians. The number of messages may spike for politician Mary Hartson during the debate.

The user may use remote control application 156 to select view icon 262B in FIG. 8 to view additional data for Mary Hartson. Command center 100 may display messages posted on the @Mary Hartson social media account that refer positively to a comment made by Mary Hartson during the debate. Command center 100 also may display metrics from the @Mary Hartson social media account that also indicate a large number of people liked the posted message. Thus, command center 100 may identify in real-time the overall positive or negative public response to comments made during the debate.

The following are example types of data and metrics command center 100 may use to identify data related to a topic and identify other topics related to a selected topic.

A. User Generated Content (UGC) Posts
   1. Volume by network by date
   2. Stream of all posts, list and Geo
   3. Total Posts
   4. Impressions
   5. Top Influencers that have used a hashtag sorted by followers
   6. Top Posts that used hashtag sorted by engagement
   7. Top Hashtags also mentioned in posts by popularity
   8. Top Keywords in posts by popularity
   9. Top @Replies in posts by popularity
   10. Network by volume
   11. Audience Attitude (sentiment)

B. Brand
   1. Followers by Network for brand
   2. Top Posts posted by brand using the hashtag sorted by engagement
   3. Number of posts by network for brand posts using the hashtag
   4. Klout influence score for brand C. Demographics of Participants
   1. Gender by percentage
   2. Age range by percentage
   3. Income by percentage
   4. Ethnicity by percentage
   5. Countries by percentage sorted by popularity
   6. State/Province by percentage sorted by popularity
   7. City by percentage sorted by popularity
   8. Top Interests sorted by popularity
   9. Top Brands sorted by popularity
   10. Top Influencers (of that audience) sorted by popularity
   11. Top TV Shows sorted by popularity The user may configure command center 100 to display content for different time periods, such as for each hour over 24 hours, or for each minute over an hour. Display modules 142 then may request and display metrics for the selected topics for the configured time periods.

Command center 100 may display data with background images and colors associated with the topic. For example, command center 100 may identify the root page for a topic associated with a corporation or brand. Command center 100 may extract a portion of the root webpage for displaying as background on display devices 104 providing a similar look and feel for the corporation or brand. Command center 100 also may identify a primary color on the root webpage and use that primary color to display metrics for that corporation or brand. These social media display enhancements are also described in U.S. provisional application Ser. No. 62/165,479, which is incorporated by reference in its entirety.

Hardware and Software

Figure 10:
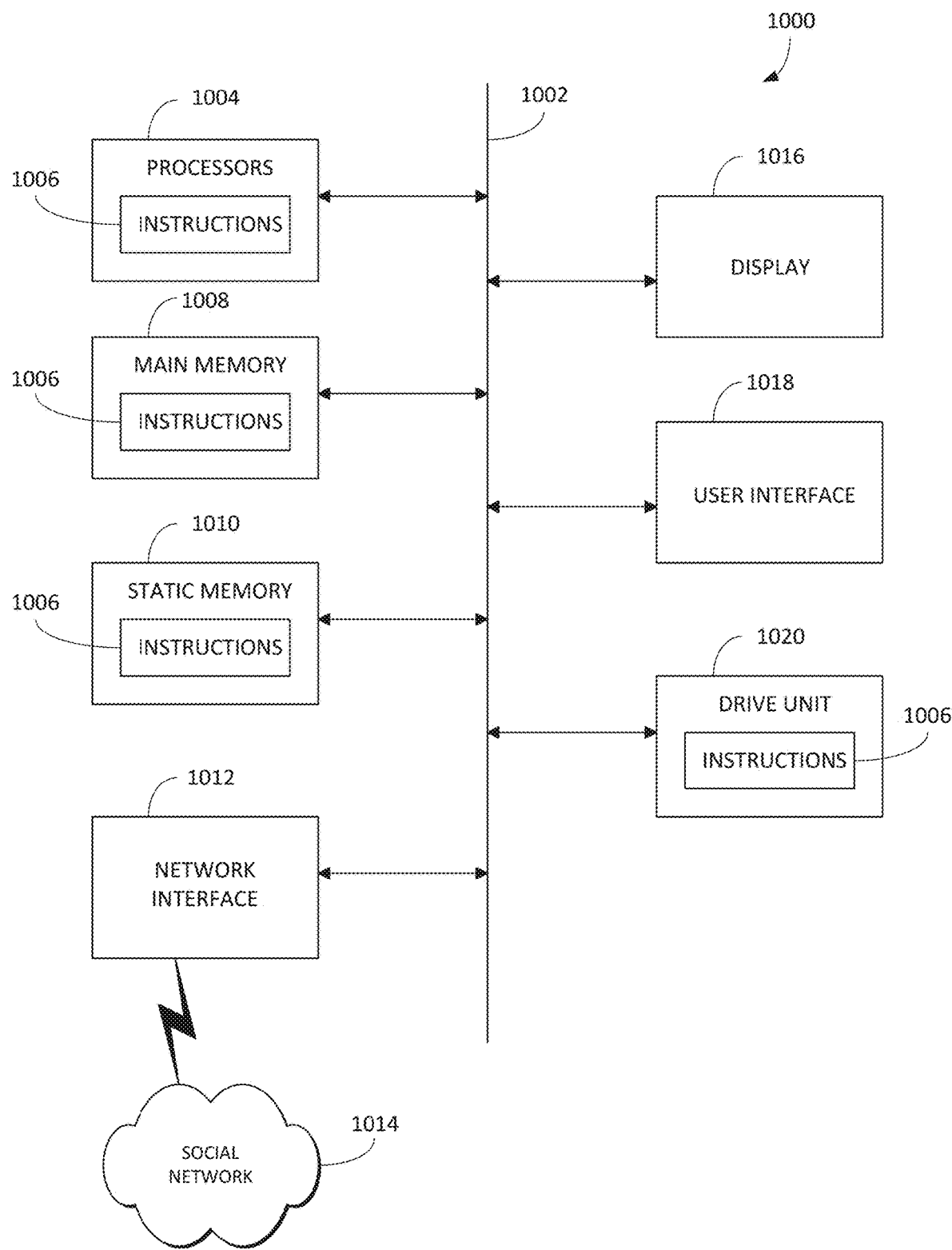
FIG. 10 depicts an example computing device used in the command center.

FIG. 10 shows a computing device 1000 that may be used for operating the command center computing devices and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Social Media Enhancement

Figure 11:
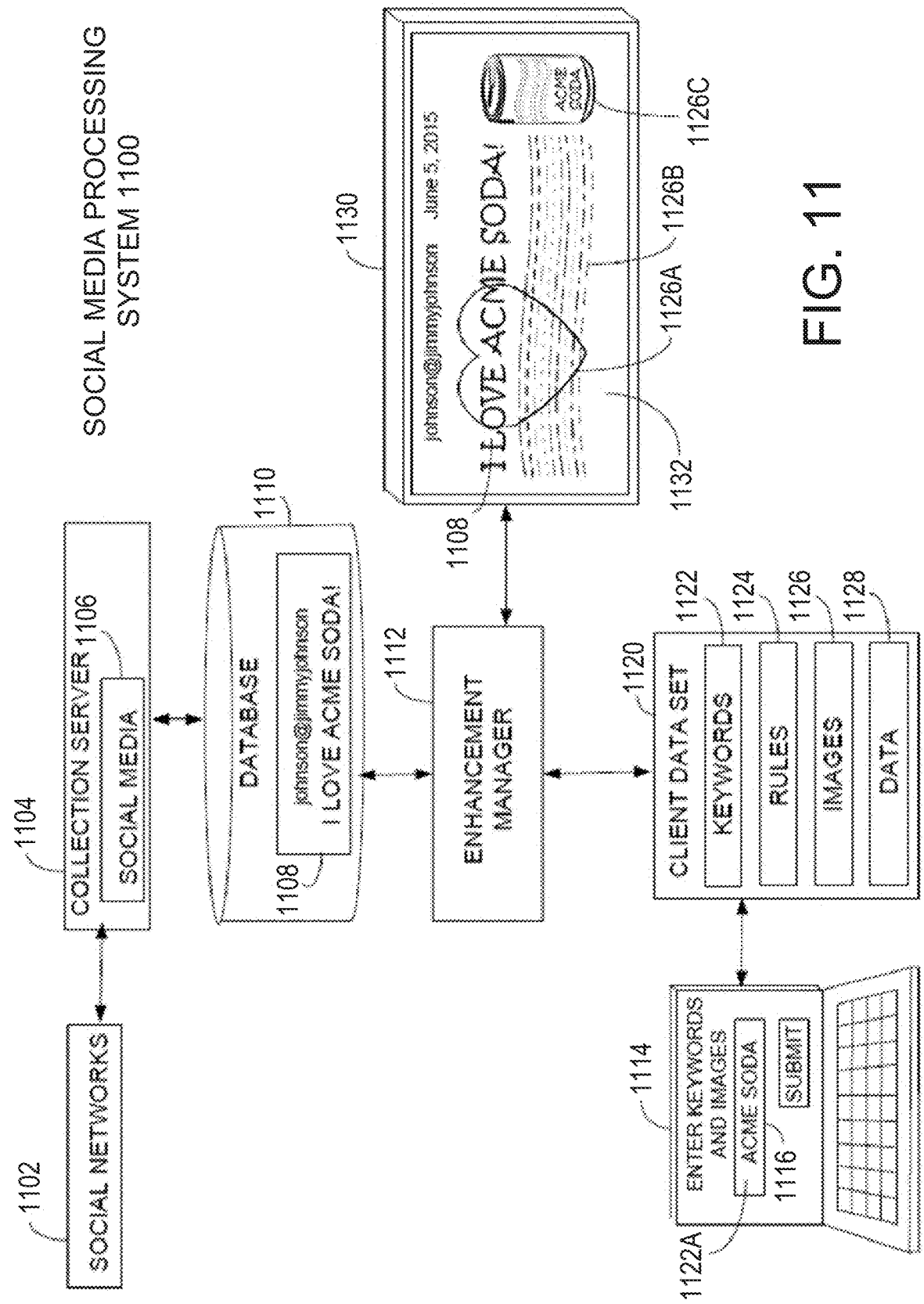
FIG. 11 depicts an example social media processing system.

FIG. 11 shows an example social media processing system (processing system) 1100. A collection server 1104 accesses different social networks 1102, such as Twitter®, Facebook®, Instagram®, Google®, or any other website associated with a company, individual, or any other entity. Collection server 1104 collects and stores social media 1106 from social networks 1102 in database 1110. Social media 1106 may include messages, tweets, pictures, images, audio, video, text, posts, or any other data.

A data set 1120 may include any combination of keywords 1122, rules 1124, images 1126, or any other data 1128. A user may create data set 1120 via a user device 1114, such as a portable notebook, portable tablet, or personal computer 1102. The user may create a data set associated with a particular company. For example, the user may add a keyword 1122A such as Acme Soda into a field 1116 displayed on the screen of user device 1114.

The user may enter and associate one or more rules 1124, images 1126, and/or any other data 1128 with keywords 1122. For example, the client may create a rule 1124 that associates the keyword Acme Soda with an Acme Soda logo 1126B and an image of an Acme Soda can 1126C.

An enhancement manager 1112 may operate in an application server within processing system 1100 and enhance social media 1106 based on data set 1120. Enhancement manager 1112 may identify social streams in social media 1106 associated with the Acme Company. For example, enhancement manager 1112 may identify messages within social media 1106 sent to a @Acme social network account or that include a #Acme hashtag.

Enhancement manager 1112 may curate the identified messages for rendering on a display screen 1130. For example, enhancement manager 1112 may filter out derogatory or obscene messages and/or identify messages with positive comments regarding Acme Soda.

In one example, enhancement manager 1112 identifies a message 1108 that includes the text: I LOVE ACME SODA. Enhancement manager 1112 compares the words in message 1108 with keywords 1122 in data set 1120. In this example, the term Acme Soda in message 1108A matches keyword 1122A in data set 1120. Enhancement manager 1120 identifies images 1126B and 1126C in data set 1120 specified by rules 1124 associated with the matching keyword 1122A. Enhancement manager 1112 adds images 1126B and 1126C as enhancements to message 1108 and displays both as enhanced post 1132 on display screen 1130.

Data set 1120 may associate other keywords 1122 with other images 1126. For example, the user may associate another image 1126A in data set 1120 with the keyword LOVE. Enhancement manager 1112 then may identify the additional word LOVE in message 1108 and add the associated image 1126A prior to rendering enhanced message 1132 on display screen 1130.

Enhancement manager 1112 may add other data 1128 from data set 1120 to message 1108, such as a price of the product and/or a location for purchasing the product mentioned in message 1108. Data 1128 in data set 1120 also may identify different fonts and font sizes for associated keywords 1122. For example, data 1128 may identify a font used on Acme Soda cans. Enhancement manager 1112 may further enhance message 1108 by changing the font originally used in message 1108 to the font used on Acme soda cans.

Enhancement manager 1112 also may identify images contained in message 1108. For example, a user may post a message that includes a company logo. Data set 1120 may include the logo as part of keywords 1122 and enhancement manager 1112 may use an image detection system to detect any messages 1108 that contain the logo. Enhancement manager 1112 then may include a rule and associated images and/or data for adding to message 1108 based on the detected logo.

Enhancements 1126 increase the visual connection of a product mentioned in post 1108 with viewers. For example, logo 1126B and soda can 1126C immediately connect viewers with Acme Soda. In addition, heart image 1126A immediately notifies viewers that message 1108 is a positive endorsement of Acme Soda. Thus, enhanced message 1132 combines the increased visual impact and viewer association of images 1126 with the user endorsement contained in message 1108.

The same or different data sets 1120 may include different keywords 1122, rules 1124, images 1126, and data 1128 for different products, services, and events. For example, a first set of keywords 1122, rules 1124, and images 1126 may be associated with a first type of soda and a second set of keywords 1122, rules 1124, and images 1126 may be associated with a second type of soda. A third set of keywords 1122, rules 1124, and images 1126 may be associated with a particular campaign or event associated with Acme Soda, such as an athletic event or concert.

Processing system 1100 may associated different data sets 1120 with different clients. For example, a first dataset 1120 may contain the keywords, rules, image and/or data for a clothes manufacturer and a second dataset 1120 may contain the keywords, rules, image and/or data for a movie studio. Users via user device 1114 or datasets 1120 may identify which social media streams for applying to different data sets 1120.

In another example, processing system 1100 may include multiple display screens 1130 and a different data set 1120 or group of rules in a same data set 1120 may be associated with each display screen. For example, the multiple display screens 1130 may be located in a sports stadium and enhancement manager 1112 may displayed enhanced messages 1132 on each of display screens 1130 associated with different players from a sports team.

Figure 12:
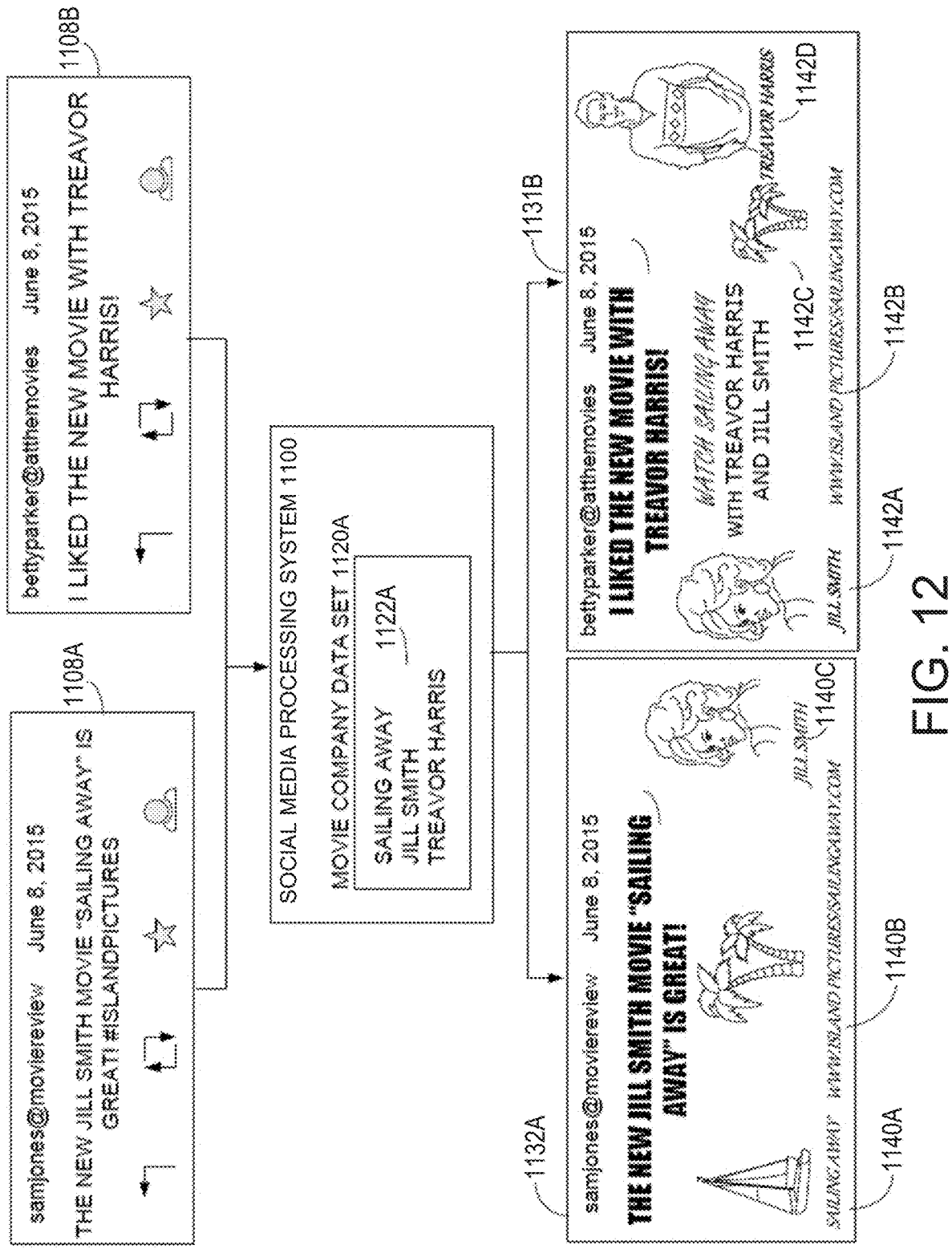
FIG. 12 depicts example enhancements added to different posts.

FIG. 12 shows another example of how the processing system may add enhancements to social media. In this example, a movie company may create a data set 1120A within social media processing system 1100 with keywords and associated rules 1122A including the name of a movie and names of actors in the movie. Processing system 1100 may collect social media posted on the movie company social network accounts or any other social media that mentions the movie, movie company, actors in the movie, or any other associated context.

In this example, a user may post a message 1108A stating: THE NEW JILL SMITH MOVIE "SAILING AWAY" IS GREAT! The user may post message 1108A on one of the social media accounts for the movie company that distributes the movie or may have referenced the movie name or movie company name in a hashtag.

Processing system 1100 compares keywords 1122A with the terms in message 1108A and identifies matches for the movie name SAILING AWAY and the actor name JILL SMITH. Data set 1120A may include a first rule that directs processing system 1100 to add an image 1140A from the movie and add an image 1140B with the name and logo of the movie company based on the movie name match. The first rule also may specify a particular font to use for message 1108A.

Based on the keyword match with actor name JILL SMITH, data set 1120A may include a second rule that directs processing system 1100 to add image 1140C for the actor Jill Smith to message 1108A. Thus, resulting enhanced message 1132A may have substantially more visual interest than original message 1108A.

Processing system 1100 may receive another message 1108B relating to the same movie including the text: I LIKED THE NEW MOVIE WITH TREAVOR HARRIS! Processing system 1100 compares keywords 1122A with the terms in message 1108B and identifies a match with the actor name Treavor Harris. Data set 1120A may include a rule associated with the Treavor Harris keyword 1122 that directs processing system 1100 to add enhancements 1142 to message 1108B. In this example, enhancements 1142 may include an image 1142A of Jill Smith and an image 1142D of Treavor Harris.

Enhancements 1142 also may include an image 1142B of the movie company name and logo. In this example, the rule also may direct processing system 1100 to add an advertisement 1142C identifying the name of the movie and names of actors in the movie when not already mentioned in message 1108B. Thus, processing system 1100 may apply different enhancements based on the content in messages 1108.

Figure 13:
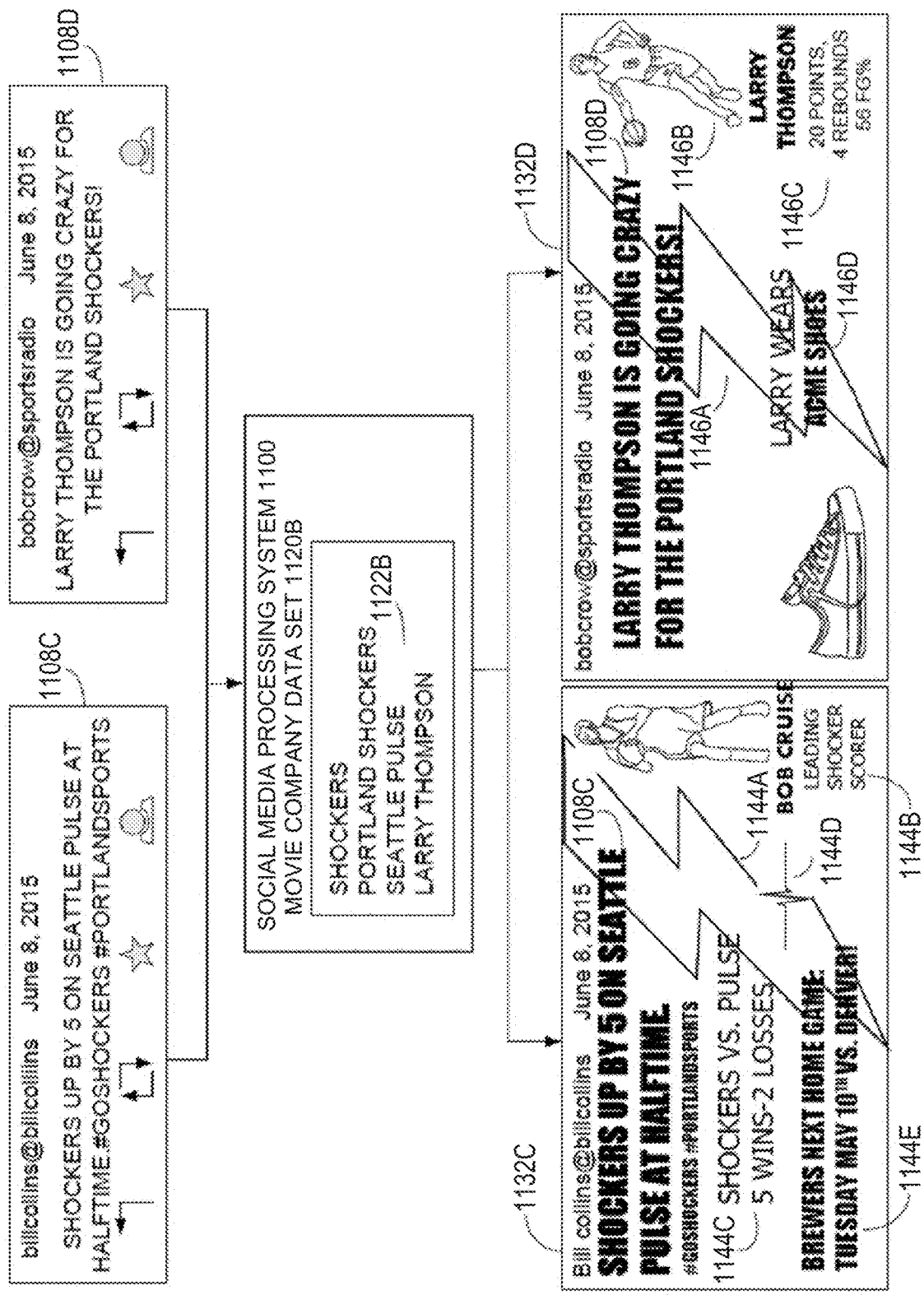
FIG. 13 depicts additional example enhancements added to posts.

FIG. 13 shows another example of enhancements added to social media. In this example, a sports organization may create a data set 1120B in processing system 1100 with keywords and associated rules 1122B including the name of the basketball team, names of players on the basketball team, and names of other basketball teams. Processing system 1100 may collect social media posted on the sports team social network accounts or any other social media that mentions the basketball team, players on the basketball team, other basketball teams, or any other associated context. In this example, a sports fan may post a message 1108C stating: SHOCKERS UP BY 5 ON SEATTLE PULSE AT HALFTIME. Processing system 1100 compares keywords 1122B with the terms in message 1108C and identifies matches both for the sports team Shockers and for another sports team Seattle Pulse that is currently playing the Shockers.

Matches of keywords 1122B may include an associated rule that directs processing system 1100 to add enhancements 1144 to message 1108C. Enhancements 1144 may include a logo 1144A for the basketball team and an image 1144B of a leading scorer for the basketball team. Enhancements 1144 also may include a picture of Portland that processing system 1100 adds as background to message 1108C when message 1108C also includes the term Portland.

Processing system 1100 may receive message 1108C during a basketball game with the Seattle Pulse. Based either on the coinciding times of the basketball game and message 1108C and/or based on message 1108C also mentioning the Seattle Pulse basketball team, a rule in data set 1120B may direct processing system 1100 to include a current record 1144C between the two basketball teams and also may include an image 1140D of the opposing team logo.

Data set 1120B also may include the current score of the basketball game. In this example, the rule in data set 1120B also may display data 1144E identifying a next home game for the Portland Shockers. Thus, enhancements 1144 provide additional information regarding current and future events associated with the sports team mentioned in message 1108C.

Processing system 1100 may receive another message 1108D stating: LARRY THOMPSON IS GOING CRAZY FOR THE PORTLAND SHOCKERS! Processing system 1100 compares keywords 1122B with the words in message 1108D and identifies a match with the basketball team name Shockers and the basketball player name Larry Thompson. Based on the two matches another rule in data set 1122B may direct processing system 1100 to add a different set of enhancements 1146 to message 1108C.

In this example, enhancements 1146 may include an image 1146A of the team logo, an image 1146B of the player mentioned in message 1108D, and statistics 1146C for the player mentioned in message 1108D. Statistics 1146C may include statistics of the mentioned player either for the year or for the current basketball game with the Seattle Pulse. Enhancements 1146 also may include an advertisement 1146D for a product endorsed by the player mentioned in message 1108D. Thus, enhancements 1146 also provide additional information regarding a specific person mentioned in message 1108D.

In another example, different brand names may be associated with different sports. Data set 1120B may contain different sport images associated with the different brand names. For example, a first brand name may be associated with basketball and a second band name may be associated with golfing. Data set 1120B may include a first keyword 1122B for the first brand name that includes an associated image of a basketball player and include a second keyword 1122B for the second brand name that includes an associated image of a golfer.

In another example, a user may post a self picture (selfie) with an attached message that mentions a sports figure. Processing system 1100 may add a picture of the mentioned sports figure to the posted message.

Figure 14:
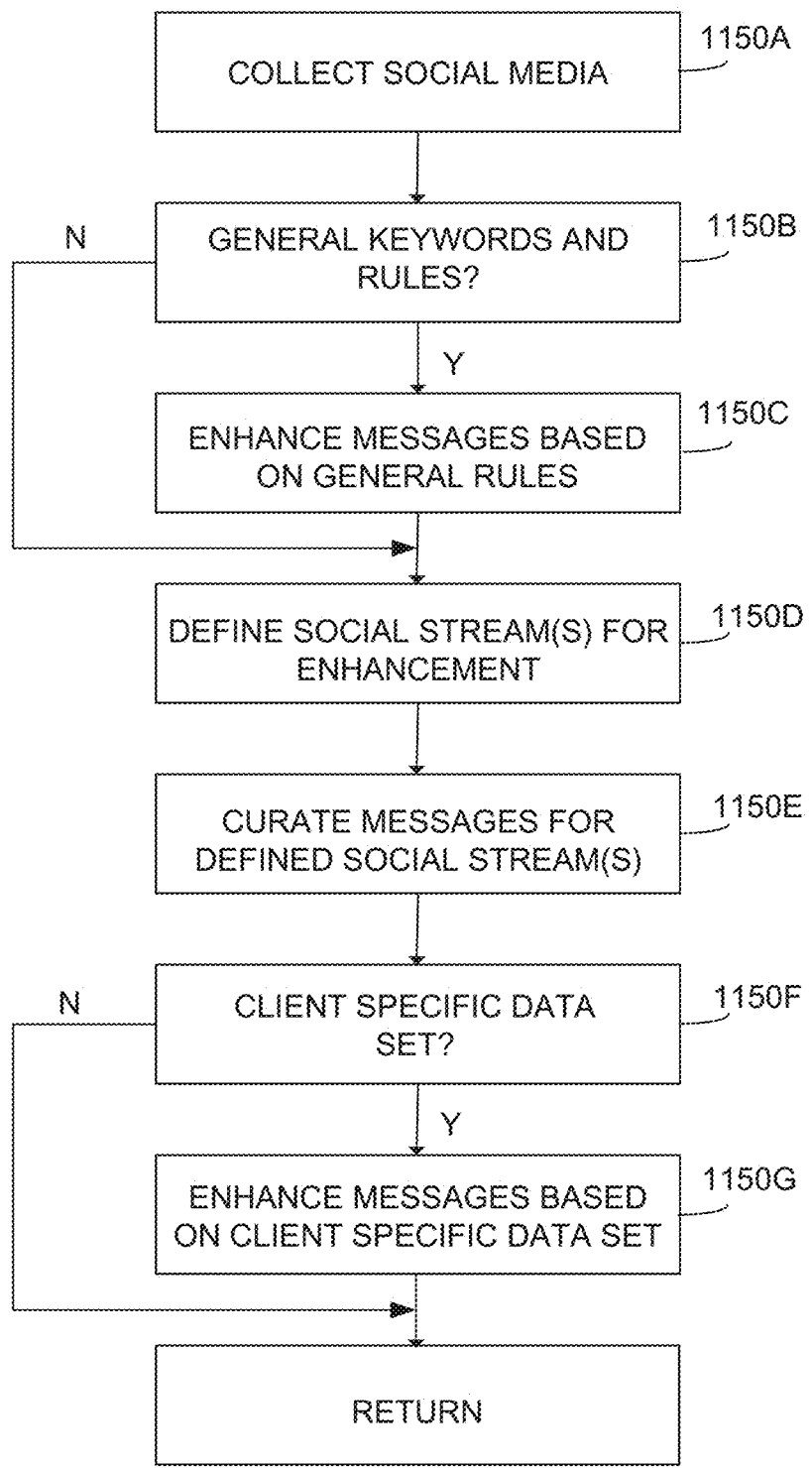
FIG. 14 depicts an example process for the social media processing system of FIG. 11.

FIG. 14 shows one example process performed by the social media processing system. In operation 1150A, the processing system collects social media from different social networks. For example, the processing system may collect messages posted on different accounts on different messaging services, such as Twitter®, Facebook®, Instagram®, Google®, etc.

In operation 1150B, the processing system may contain a general set of keywords and rules and add a general set of enhancements to any message with matching terms. For example, the processing system in operation 1150C may add the heart image shown in FIG. 11 to any messages that include a positive endorsement term, such like, love, admire, happy, etc.

In operation 1150D, the processing system may define different social streams for additional enhancements. For example, an operator may configure the processing system to identify messages posted on particular accounts or that include a particular hashtag.

In operation 1150E, the processing system may curate the messages for the defined social streams. For example, an operator, or the enhancement manager 1112 in FIG. 11, may select different messages from the social streams for displaying on a display screen.

In operation 1150F, the processing system may determine if a second client specific data set exists for applying to the curated messages. For example, a client may create a data set with a specific set of keywords and rules for applying to messages associated with a particular product, event, day, location, or any other criteria.

In operation 1150G, the processing system enhances the curated messages based on the client specific data set. For example, the second data set may include a set of rules that direct the processing system to add corporate specific, product specific, location specific, date specific, time specific, and/or event specific enhancements to the messages based on different matching keywords.

The second data set also may have different sets of keyword, rules, and images for different time periods. For example, the second data set may direct the processing device to use a first set of keywords, rules, and images for a first time period and use a second set of keywords, rules, and images for a second time period.

Figure 15:
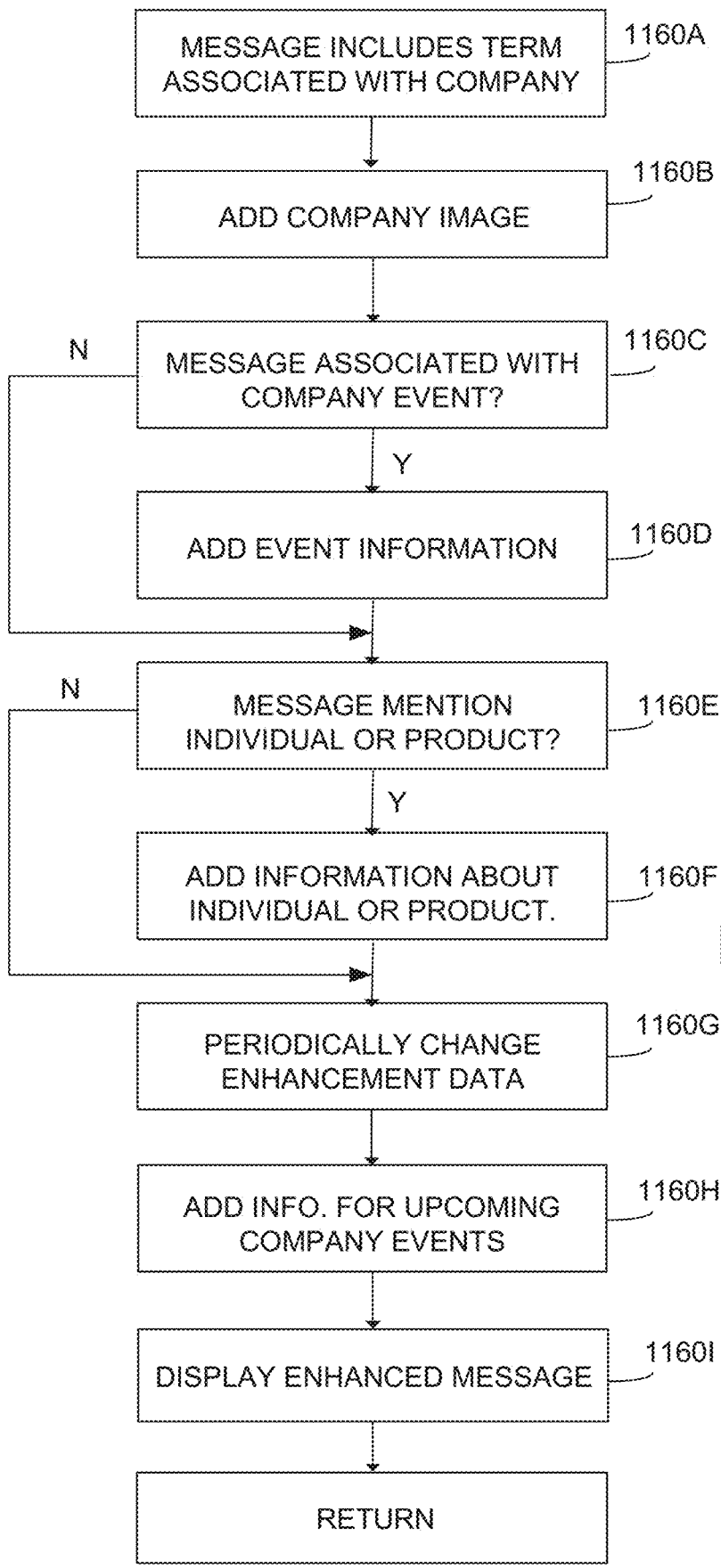
FIG. 15 depicts an example process for enhancing posts.

FIG. 15 shows one example set of rules that a data set may use for enhancing social media. This of course is just one example of an almost limitless combination of keywords, rules and images that may be applied to a social media message.

In operation 1160A, the processing system may identify a message including a term associated with a company. For example, the message may mention the name of the company or the name of a product sold by the company. In operation 1160B, the processing system may add a company image to the message. For example, the processing system may add a company logo or add an image of a company product to the message.

In operation 1160C, the processing system may determine if the message is associated with a particular event. For example, the data set may associate a set of keywords with event specific information. The processing system in operation 1160D may add event information to any messages associated with the event. For example, processing system may add a picture from the event or add information about the event, such as where and when the event in taking place.

In operation 1160E, the message may mention a participant or product associated with the event. For example, the message may mention a speaker at the product launch event or a player in a sporting event. In operation 1160F, the processing system may add information to the message about the event participant or product. For example, the processing system may add an image of the speaker and/or add information about the speaker.

In operation 1160G, the processing system may periodically change the enhancement data. For example, the data set may have different sets of images associated with the same keywords. To prevent enhanced messages from becoming stale, the data set rules may cause the processing system to use different sets of images for different time periods. For example, a first company logo may be added to messages in the morning and a second company logo, advertisement, and/or image may be added to messages in the afternoon.

In operation 1160H, the processing device may add any other information associated with the matching keywords, such as information regarding upcoming events. In operation 1160I, the processing device displays the enhanced message on a display screen.

Figure 16:
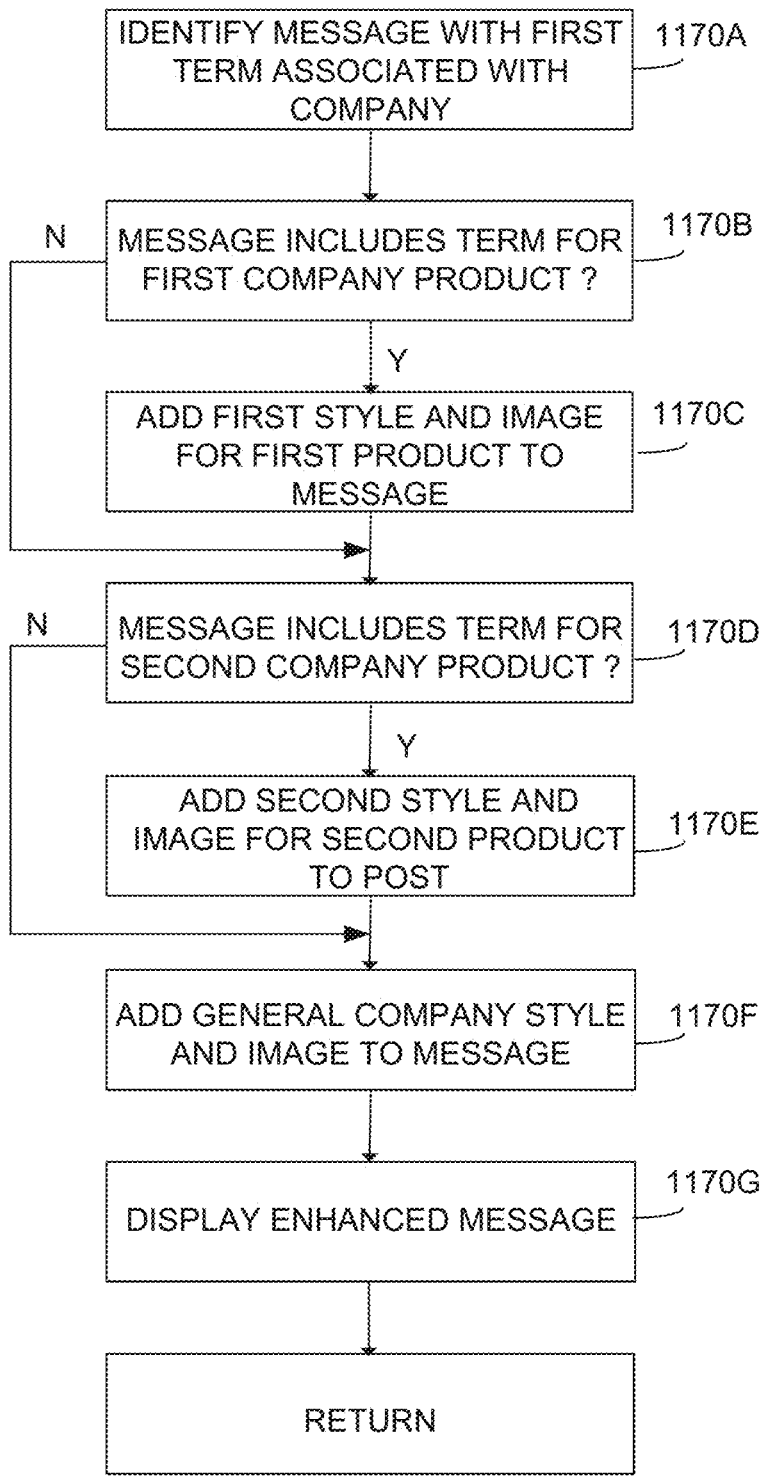
FIG. 16 depicts an example process for enhancing posts associated with an event.

FIG. 16 shows another example of rules that a data set may use to enhance social media. In operation 1170A, the processing system may identify a message that contains a first term associated with a particular company, such as the term Acme.

In operation 1170B, the processing system may search for a second term associated with a first product sold by the company, such as Diet Acme. If the second term is identified, the processing system in operation 1170C may add a first style and image to the message associated with the first product. For example, the processing system may add a silver and black background to the message that corresponds with the colors on an Acme diet soda can and also may add an image of the Acme diet soda can.

In operation 1170D, the processing system may search for a term associated with a second product sold by the company, such as Orange Acme. If the third term is identified, the processing system in operation 1170E may add a second style and image to the message associated with the second product. For example, the processing system may add a second orange and white background image to the message that corresponds with the colors on Acme orange soda cans and also may include an image of the Acme orange soda can.

In operation 1170F, the processing system may add a general company style and image to the message. For example, the processing system may add a general logo or background used on all Acme products. In operation 1170G, the processing system then displays the enhanced message on a display device. These of course are just a few examples of rules used by the processing system to enhance social media.

Thus, the enhanced social media may create additional visual connections.

Digital Signage Content Curation Based on Social Media

Digital signage is used in many different businesses. The digital sign may display different creative featuring products, services, advertisements, promotions, and/or interstitials associated with the businesses. For example, a digital sign at a fast food restaurant may continuously display creative featuring different products sold by the restaurant. The creative displayed on digital signage screens are often scheduled manually weeks or months in advance across multiple locations and regions. Therefore, the digital sign operator is left to speculate far in advance of what displayed content may be most interesting to customers across large regions of store locations.

Manual content curation can miss what might be the most effective or most popular content, specifically as certain topics begin to trend in real time. A processing system dynamically determines which creative to display on digital signage based on trends emerging in social media data. The social media contains specific conversations regarding a brand and associated products. Social media monitoring is set up by an operator by creating topics, which are queries, that are used to fetch data from social media networks. Once stored, segments of the data that align to the brand, like features of a newly released product, can be analyzed.

Once this segmentation is set up, results are used to determine which prepared creative content to feature on digital signage for the brand. For instance, if the brand is a fast food restaurant, a digital sign facing the street may promote the most popular breakfast items in the morning and the most popular sandwiches at lunch and dinner without any manual curation by the brand. This solution may determine which creative ads or promotions to dynamically feature. No manual curation of what content to feature is necessary. The processing system saves time and effort as well as taps into real time consumer trends.

FIG. 17 shows a system that curates creative content for digital signage based on social media. A processing system 1200 includes a scheduler 1206 that displays different images 1218A-1218C on a digital sign 1204 based on metrics 1215 generated by an analytics engine 1214 from different social media 1216.

In the explanation below, images 1218 are alternatively referred to as creative and may refer to any reviewed content that a company may want to use as advertisements for related products. However, image 1218 may include any content that a company or any other entity may want to display responsive to social media metrics 1216.

Scheduler 1206 may receive metrics 1215 from analytic engine 1214 indicating a most "liked" shoe on social media 1216. Social media 1216 may indicate the most liked shoe sold by a company Acme, Inc. is the Acme Sky. Accordingly, scheduler 1206 may display creative 1218B for the Acme Sky shoe in digital sign 1204.

Processing system 1200 prevents marketers from having to guess which creative 1218 to use for advertising different products. For example, prior to a marketing campaign, a company may produce multiple different creative advertisements showing different products, or users of products, that are part of the campaign. The advertiser may manually display different advertisements over different time periods at different locations. However, over time it may be determined that a particular product is not popular with customers and another product is very popular with customers. Unpopular advertisements may not provide much sales or "lift" when displayed in stores.

Instead of manually replacing unpopular creative advertisements, processing system 200 determines in real-time which products are most popular on social media, and then automatically displays the creative advertisements 1218 associated with the most popular products.

It should also be understood that processing system 1200 may display different creative 1218 based on an aggregation of social media 1216 positively referring to a product associated with that creative 1218. For example, processing system 1200 may display one of creative 1218 when an associated product has a largest number of positive posts, highest positive sentiment, most positive engagement, largest volume of likes of posts referring to the product, or the like, or any combination thereof.

Processing system 1200 may store rules 1210 that determine which creative 1218 to display on digital sign 1204. For example, a rule 1210 may include a set of keywords 1217 associated with different creative 1218. Rule 1210 also may include a metric identifier 1219 for selecting one of creative 1218. For example, keywords 1217 may include the names of the three Acme shoes Flyer, Sky, and Cross. Metric identifier 1219 may direct scheduler 1206 to display one of creative 1218 associated with the shoe with the most positive mentions in social media 1216.

Scheduler 1206 accesses analytic engine 1214 to determine which of the three shoes includes the most positive mentions in social media 1216. In this example, the Acme Sky shoe has received the most positive mentions over a particular time period. Scheduler 1206 then displays creative 1218B for the Acme Sky shoe on digital display 1204.

Scheduler 1206 can dynamically and automatically change which creative 1218 is displayed on digital sign 1204 based on any real-time changes in social media 1216. For example, over time a particular shoe may lose popularity while another shoe may gain in popularity. Scheduler 1206 may continuously monitor metrics 1215 to identify any changes in shoe popularity and then automatically display creative 1218 associated with the latest most popular shoe.

In another example, a particular product may have a largest number of mentions, but the sentiment for that product may be mostly negative. For example, a product recall or an overall negative consumer response to a product may generate a large number of negative mentions on social media 1216. Rule 1210 may direct scheduler 1206 to only display creative 1218 associated with the product with the most number of positive mentions. Other rules and metrics are described in more detail below.

Digital sign 1204 may be located at a business location, on a website, or at any other point of sale where a customer may purchase a product or service. For example, digital sign 1204 may be located in a shoe store 1202 in-between or adjacent to racks of shoes. In another example, digital sign 1204 may be located above the sales counter at a fast food restaurant. In yet another example, digital sign 1204 may be located in a grocery store next to food items sold by a particular food manufacturer. Of course, digital sign 1204 could be located in any other location.

In one example, analytics engine 1214 may aggregate the number of positive messages related to a particular company and associated product. In another example, analytics engine 1214 may identify a largest number of followers associated with a particular company, product, and/or service. In yet another example, analytics engine 1214 may identify the total number of positive Twitter® messages (tweets) generated from a particular company account, such as an @acmelive account or referring to the @acmelive account, and the number of those Twitter® messages generated per minute. In yet other examples, analytics engine 1214 may identify the number of likes for posts related to different products. Analytics engine 1214 may generate any other metric that may indicate the aggregated social media popularity, engagement, volume, sentiment, etc. of a particular product or service.

In one example, analytics engine 1214 may receive metrics 1215 from third party data sources, such as Adobe® or Google® analytics that monitor, measure, and generate metrics for different data sources or websites. In another example, analytics engine 1214 may receive metrics 1215 from customized databases, such as created by Salesforce®, Salesforce® Radian6, or Sysomos® that provide access to marketing and sales data.

As explained in copending application Ser. Nos. 15/160, 694 and 14/997,013, social media 1216 may include any message, tweet, picture, image, audio, video, text, posts, or any other data generated on any social media platform by any combination of users. Analytic engine 1214 may generate social media metrics 1215 based any combination of social media 1216. Generating social media metrics 1215 is known to those skilled in the art and is therefore not described in further detail.

FIG. 18A shows another example where processing system 1200 identifies and displays creative 1218 based on social media metrics in different geographical regions. Digital signs 1204 may be located in different geographic regions. For example, digital sign 1204A may be located in a store on the East Coast of the United States and digital sign 1204B may be located in a store on the West Coast of the United States. Social media metrics 1215 may be different in different geographic regions.

An operator may create a rule 1210 that directs scheduler 1206 to display the creative for the most popular shoe on social media in each geographic region. For example, rule 1210 may direct scheduler 1206 to display creative 1218 for the shoe with the most likes in each geographic region. Analytic engine 1214 may generate metrics 1215A for social media 1216 generated on the East Coast and may generate metrics 1215B for social media generated on the West Coast. East Coast metrics 1215A may identify the Acme Flyer shoe as having the most likes and West Coast metrics 1215B may identify the Acme Sky shoe as having the most likes.

Accordingly, scheduler 1206 may send creative 1218A for the Acme Flyer shoe to digital sign 1204A located on the East Coast and may send creative 1218B for the Acme Sky shoe to digital sign 1204B located on the West Coast. Thus, regional digital signs 1204A and 1204B may display different creative 1218 based on trending social media in those areas. Again, creative 1218 may be displayed based on any social media metric 1215, such as sentiment, volume, or engagement.

Figure 18B:
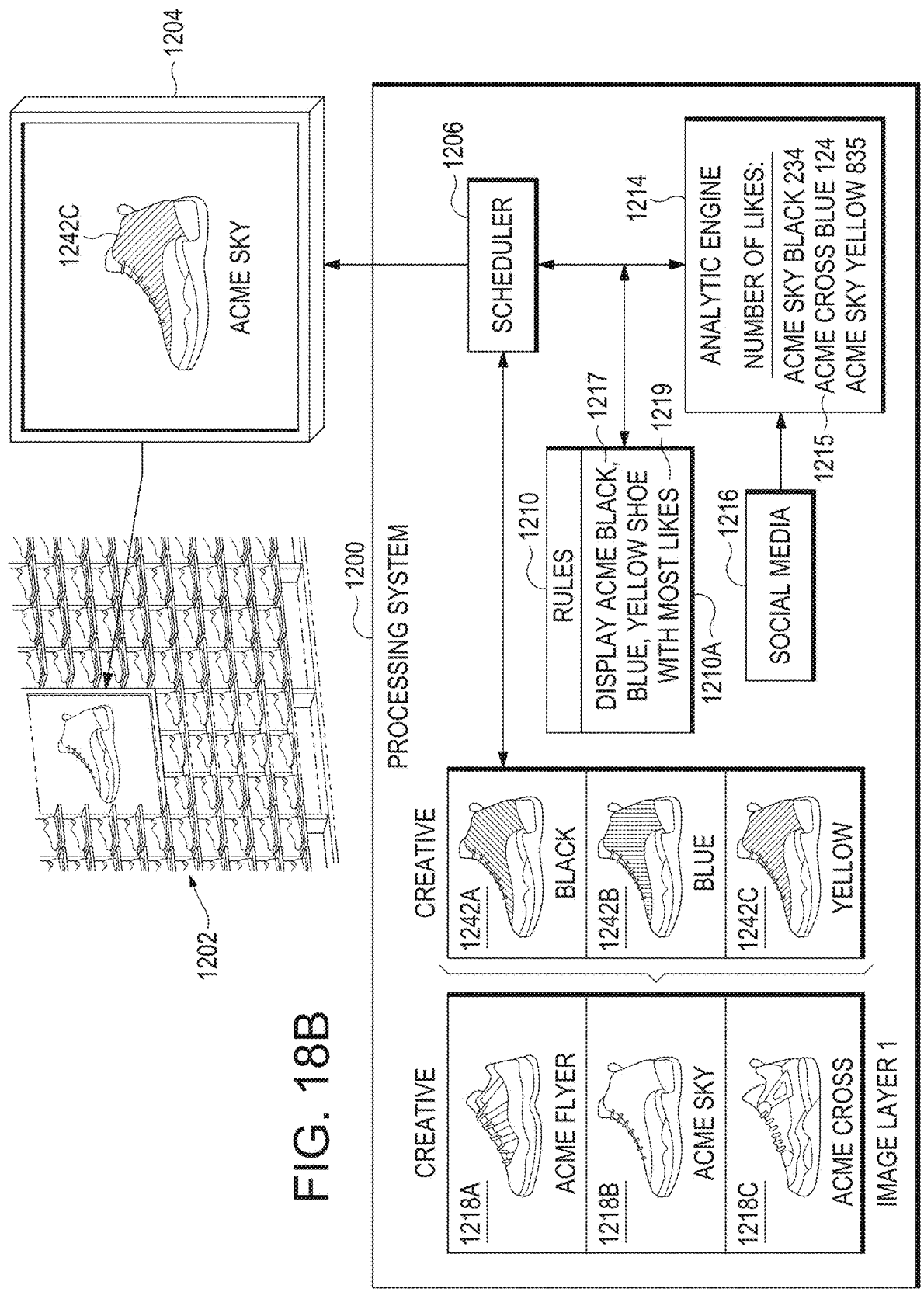
FIG. 18B depicts another example processing system that displays creative for different versions of a product based on social media metrics.

FIG. 18B shows another example where processing system 1200 identifies and displays creative for a particular model, color, style, pattern or other distinguishing feature of a product. An advertising firm may generate multiple creative 1242A-1242C for different colors of the same product. Prior to launching a campaign, the shoe company and their associated advertising firm may have no idea which model, color, or style of a particular product may be the most popular.

Instead of guessing, the advertising firm may produce multiple layers of creative 1218 and 1242 that include different brands, models, styles, colors, features, etc. For example, another layer of creative may show each of the different shoe colors in either a high top version or a low top version.

An operator generates rules 1210 directing scheduler 1206 to determine which of the product models, styles, colors, features, etc. are most popular in social media 1216. Scheduler 1206 receives metrics 1215 from analytic engine 1214 that identifies the yellow Acme Sky as the most liked shoe. Accordingly, scheduler 1206 sends creative 1242C for the yellow Acme Sky shoe to digital sign 1204.

In one example, processing system 1200 may initially cycle through creative 1218 and 1242 for all shoe models and colors to determine which shoe model and color is most popular with customers in different geographic regions. Processing system 1200 then displays one of creative 1218 or 1242 for the most popular shoe model and color indicated by metrics 1215. Processing system 1200 can be programmed for any number of creative to correspond with any combination of product models, styles, colors, features, etc. Creative 1218 and 1242 can be broken into different layers where each component of the creative is determined by a segmentation.

FIG. 19 shows another example where processing system 1200 automatically displays promotions 1209 based on metrics 1215 derived from social media 1216. An operator may store data 1208 in processing system 1200 that includes a promotion 1209 or any other content that may be combined with creative 1218. In this example, promotion 1209 is for 25% off.

The business owner may determine that sales are slow between the hours of 2:00 pm-4:00 pm. To increase sales during this slow period, operator may create rule 1210 that directs scheduler 1206 to display promotion 1209 for a highest trending Acme shoe between the hours of 2:00 pm-4:00 μm.

Scheduler 1206 reads data 1208 and rule 1210 and identifies a highest trending Acme shoe for some designated time period, such as for the last week. In this example, metrics 1215 identify the Acme Flyer shoe as the highest trending shoe. Based on rule 1210, scheduler 1206 displays creative 1218A and promotion 1209 between the hours of 2:00 pm and 4:00 pm on digital display 1204. Thus, processing system 1200 automatically generates promotions that may help increase sales for a particular product that may be trending on social media 1216. Data 1208 may include any other image, audio, text, or video that may be displayed based on social media 1216 and/or rules 1210.

Rules 1210 also may direct scheduler 1206 to display curated social media posts 1244 with creative 1218. For example, scheduler 1206 may identify a positive post 1244 regarding the highest trending Acme Flyer shoe. Scheduler 1206 displays post 1244 with Acme Flyer creative 1218A to add an additional dimension of authenticity.

Figure 20:
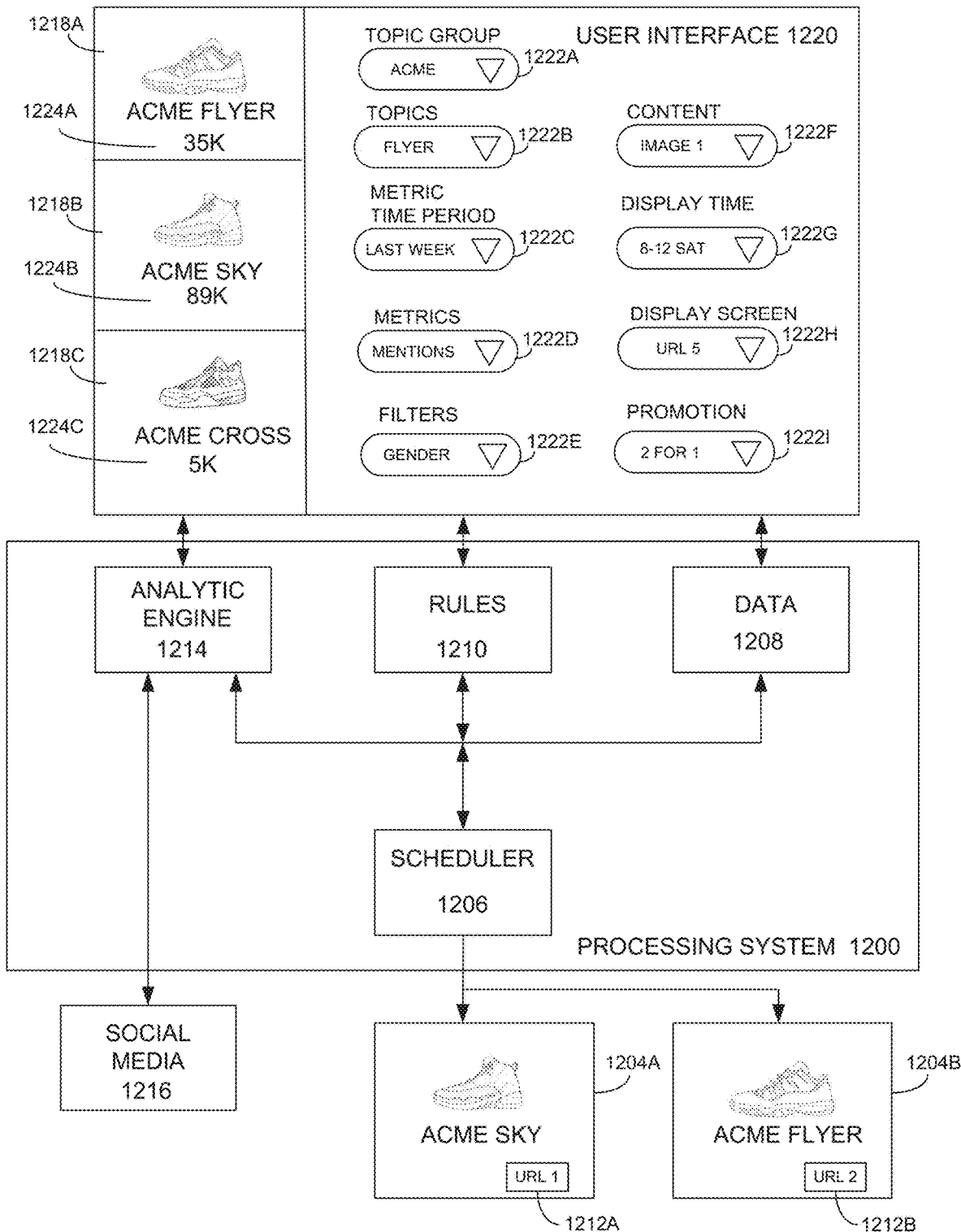
FIG. 20 depicts an example user interface that is used to generate rules for the processing system.

FIG. 20 shows an example user interface 1220 that operates in conjunction with processing system 1200. User interface 1200 may include an array of control elements 1222A-1222I that can control, program, and/or configure any combination of analytic engine 1214, rules 1210, scheduler 1206, and data 1208. In one example, control elements 1222 may be a series of drop down menus. However, any mechanism can be used for entering data and programming processing system 1200, such as any combination of control icons and fields.

The operator may select control element 1222A to enter a group topic, such as a company or any other general category. The operator may select different topics associated with the topic group with control element 1222B. For example, the operator may select different shoe models with control element 1222B sold by the Acme company. Analytic engine 1214 may extract social media 1216 associated with the topic group and topic selected with control elements 1222A and 1222B, respectively.

The operator may select a metric time period with control element 1222C associated with the identified topic. The metric time period may define the time window of social media used for generating associated metrics. For example, the operator may select a time period for a last week. Analytic engine 1214 then may identify social media 1216 generated during the last week that includes the topics selected with control elements 1222A and 1222B.

The operator may select a metric with control element 1222D for the identified topic. For example, the operator may select a mentions metric with control element 1222D. Analytic engine 1214 then may identify which of the topics selected with control element 1222B has the most positive mentions over the last week. Any of the metrics described above may be used for determining which associated creative 1218 to display on digital sign 1204. For example, metrics may be any social trend, volume, positive volume, sentiment, or engagement.

Social media 1216 containing the topics may comprise posts, blogs, tweets, re-tweets, sentiment indicators, emails, text messages, videos, wall posts, comments, photos, links, or any other type of message or the like, or any combination thereof.

The operator may select different filters using control element 1222E. For example, the operator may select a gender filter with control element 1222E that directs analytic engine 1214 to generate metrics from social media 1216 generated by the selected gender. Any filter may be selected with control element 1222E, including but not limited to, age, sex, demographic, geographical location, type of social media, or the like, or any combination thereof.

The operator may use control element 1222F to select the different creative content 1218 for displaying on digital signs 1104. For example, the operator may select creative 1218A for displaying with topics associated the Acme Flyer shoe, select creative 1218B for displaying with topics associated the Acme Sky shoe, and select creative 1218C for displaying with topics associated the Acme Cross shoe.

The operator may use control element 1222G to select a display time for using a particular set of rules generated with control elements 1222. The operator may select a first set of rules that include topics, metrics, filters, and associated creative for a first time period and select a second set of rules for a second time period.

For example, it may be determined that an older demographic visits shoe stores in the afternoon and a younger demographic visits shoe stores in the evening. The operator may create a first rule with a filter using only social media 1216 generated by the older demographic and generate associated metrics for the older demographic during the afternoon hours. The first rule also may include creative 1218 for products more commonly purchased by the older demographic or include creative 1218 more appealing to the older demographic.

The operator may create a second rule with a filter using social media 1216 generated by a younger demographic and generating associated metrics for the younger demographic during the evening hours. The second rule may include creative 1218 for shoes more commonly purchased by the younger demographic or include creative 1218 more appealing to the younger demographic.

The operator may use control element 1222H to associate a particular set of rules with a particular digital sign 1204. For example, each digital sign 1204 may have an associated universal resource locator (URL). The operator may create a first set of rules 1210 associated with a first digital sign 1204A located on the West Coast. The first set of rules 1210 may include filters directing analytic engine 1214 to generate metrics from social media 1216 generated by users on the West Coast of the United States. The operator may create a second set of rules 1210 associated with a second digital sign 1204B located on the East Coast. The second set of rules 1210 may include filters directing analytic engine 1214 to generate metrics from social media 1216 generated by users on the east coast of the United States.

In another example, processing system 1200 may automatically generate rules for different geographic regions. For example, an operator may generate a rule that directs scheduler 1206 to display creative 1218 associated with the shoe with a highest positive sentiment. Processing system 1200 may automatically generate different filters 1222E for display signs 1204A and 1204B in the different geographic regions. For example, processing system 1200 may generate a first filter 1222E for display signs 1204A on the East Coast that only uses social media 1216 generated on the East Coast and may automatically generate a second filter 1222E for display signs 1204B on the West Coast that only uses social media generated on the West Coast. Thus, the operator only has to create one rule 1210 that automatically customizes/filters based on the geographic region where the associated digital display 1204 is located.

The operator may use control element 1222I to generate any other data associated with a particular set of rules 1210 and/or creative 1218. For example, the operator may create a promotion such as a 2 for 1 promotion for a particular time period when shoe sales are slow. Rules 1210 may cause scheduler 1206 to display the 2 for 1 promotion during the time period with slow shoe sales.

Processing system 1200 also may display real-time metrics 1224 associated with different topics and associated creative 1218. For example, processing system 200 may display the number of mentions 1224A, 1224B, and 1224C for each of the different Acme Flyer, Sky, and Cross shoes, respectively. This allows the operator to select and adjust rules 1210 based on real-time customer feedback to different products.

Figure 21:
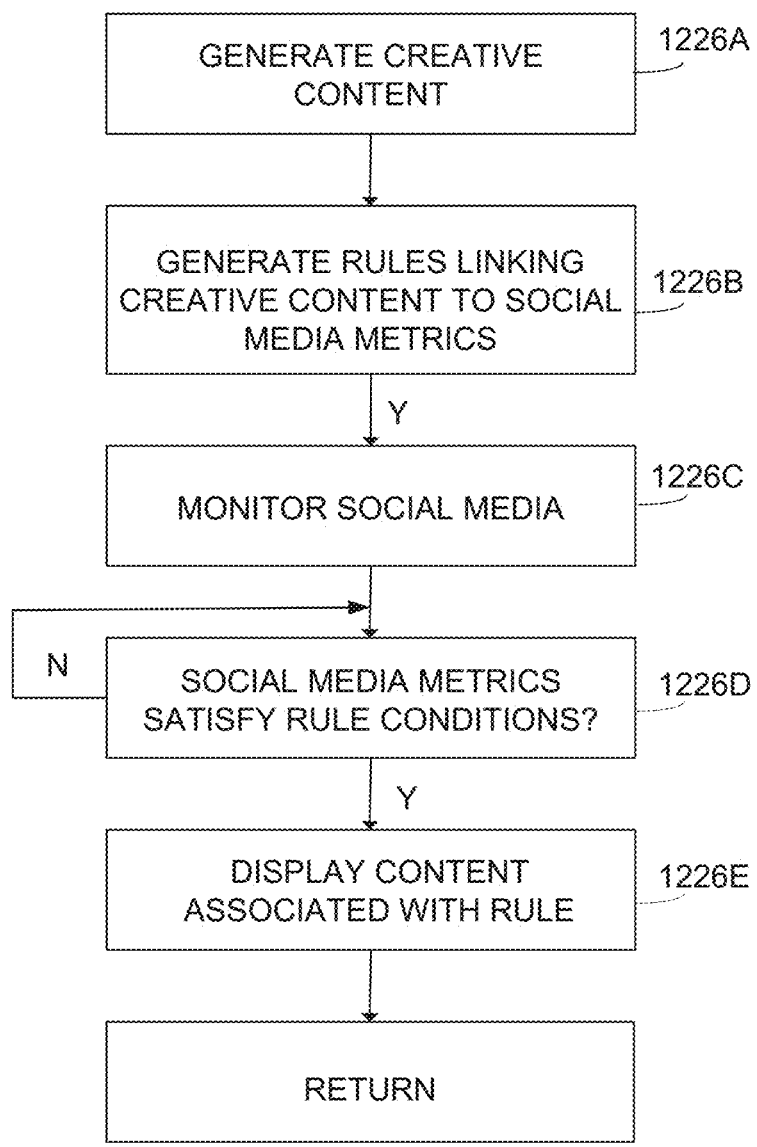
FIG. 21 depicts an example process for displaying content based on social media metrics.

FIG. 21 is an example process performed by processing system 1200. Referring to FIGS. 20 and 21, in operation 1226A, processing system 1200 generates creative content, such as images 1218 for particular products or services. As mentioned above, creative 1218 may include creative content created by an advertising firm, or any other media that may promote the sales of an associated product or service. In operation 1226B, processing system 1200 generates rules 1210 linking the creative to different social media metrics. As explained above, the rules may direct processing system 1200 to display a particular creative, image, promotion, etc. when an associated topic produces a particular metric in the social media.

In operation 1226C, processing system 1200 monitors social media 1216. For example, analytic engine 1214 generates metrics for particular topics in social media 1216. In operation 1226D, processing system 1200 determines if the social media metrics satisfy conditions of rules 1210 that trigger the display of creative. For example, rules 1210 may direct processing system 1200 to display different creative for topics having a highest aggregated social media metric, such as a shoe with the largest number of likes. In operation 1226E, processing system 1200 displays the creative associated with the topic with the highest metric.

FIG. 22 shows some example rules generated by processing system 1200. This example shows three different rules 1210A, 1210B, and 1210C. Each rule 1210 may have an associated display identifier 1228A. For example, rule 1210A may be associated with three digital signs having a URL 1, URL 3, and URL 4. Rule 1210B may be associated with the digital sign having URL 1, and rule 1210C may be associated with a digital sign having URL 2.

Each rule 1210 may have an associated set of topics 1228B. In this example, rules 1210 are all associated with the same set of topics that identify the three different Acme shoes. Each rule 1210 also may have associated metric identifiers 1228C. For example, rules 1210A and 1210C may have metric 1228C for a largest number of positive mentions and rule 1210B may have a metric for a largest number of likes.

Each rule 1210 may have associated filters 1228D. In this example, rule 1210A has a filter 1228D directing the analytic engine to use social media associated with the geographic region of the digital sign. For example, if URL 1 is located on the East Coast, the scheduler would only use metrics from social media generated on the East Coast to identify the Acme shoe with the largest number of mentions. If URL 3 is located in Spain, the scheduler would only use metrics from social media generated in Spain to identify the Acme shoe with the largest number of mentions.

Rule 1210B has a filter 1228D directing the scheduler to only use social media generated by users between the ages of 21-34 when identifying the Acme shoe with the largest number of likes.

A display time 1228E may indicate when the processing system displays the content associated with rule 1210. For example, rules 1210A and 1210C may be used all day and rule 1210B may only be used between the hours of 6 pm-10 pm.

Creative identifiers 1228F may identify the creative images associated with different topics 1228B. For example, each rule 1210 includes three creative images associated with the three topics Acme Flyer, Acme Sky, and Acme Cross. Of course other images could be associated with any combination of rules 1210 and topics.

Data 1228G may associate any other content or parameter with rules 1210. As explained above, different promotions may be associated with different rules 1210. Any other parameter or condition can also be added to any rule 1210 as described above in FIG. 20.

Figure 23A:
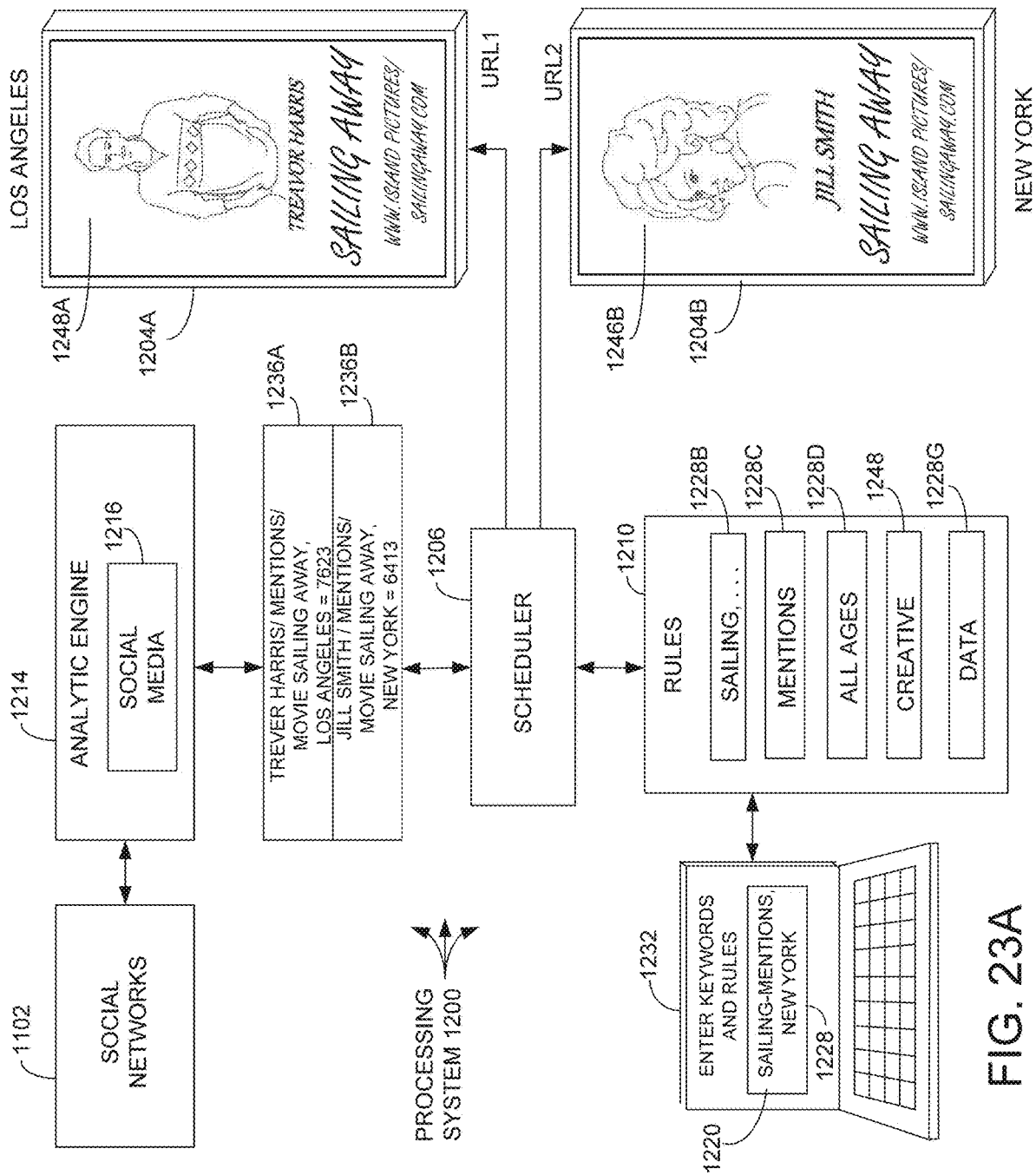
FIG. 23A depicts another example of how the processing system may display creative based on social media metrics.

FIG. 23A shows another example of how the processing system curates creative content based on social media metrics. In this example, processing system 1200 displays different content on movie bill boards based on social media. In this example, a movie entitled Sailing Away is being shown at different movie theaters around the country. The two main actors in the movie are Trever Harris and Jill Smith. The movie studio would like to increase movie ticket sales by promoting the actor most popular with audiences.

Typically, the movie studio creates multiple posters that each promote a different actor or promote different combinations of actors. However, the movie studio may not know which actor, or which character played by the actor, will be most popular with audiences. Further, different actors may be more popular with different age groups or more popular with audiences in different cities.

The operator may enter parameters 1228 for rules 1210 into user interface 1220 operated on a computer 1232 as described above. Rules 1210 may include keywords or topics 1228B that include the name of the movie and the name of the actors in the movie. Rule 1210 also may include metrics 1228B that direct analytic engine 1214 to identify the number of positive mentions for each of the different actors in the Sailing Away movie. Rule 1210 also may include filters 1228C that in this example direct analytic engine 1214 to identify the number of positive mentions for all age groups. Rule 1210 also may identify the creative 1248 associated with each actor and any other data 1228G displayed in conjunction with creative 1248.

Analytic engine 1214 extracts social media 1216 from any combination of social networks 1102 and generates metrics 1236 identified by rule 1210. In this example, analytic engine 1214 determines that Trevor Harris generates the most positive mentions for the movie Sailing Away in Los Angeles and Jill Smith generates the most mentions for the movie Sailing Away in New York.

Rule 1210 directs scheduler 1206 to display creative 1248 for the actor with the most positive mentions in Los Angeles on digital sign 1204A and display creative1 248 for the actor with the most mentions in New York on digital sign 1204B. Accordingly, scheduler 1206 displays creative 1248A for Trevor Harris on digital sign 1204A and displays creative 1248B for Jill Smith on digital sign 1204B.

If metrics 1236A and 1236B change over some specified time period in either Los Angeles or New York, scheduler 1206 may automatically update creative 1248A and/or 1248B with the creative of the new actor with the most mentions.

As also described above, rules 1210 may include different filters and time periods. For example, older customers may attend matinees in the afternoon. The operator may create a filter that causes analytic engine 1214 to generate metrics 1236 for users above the age of 50. Scheduler 1206 then may display the creative 1248 for the actors with the most mentions by users above the age of 50 between the hours of 12:00 pm-5:00 pm. Of course any other filter or time period also may be programmed into rules 1210.

Figure 23B:
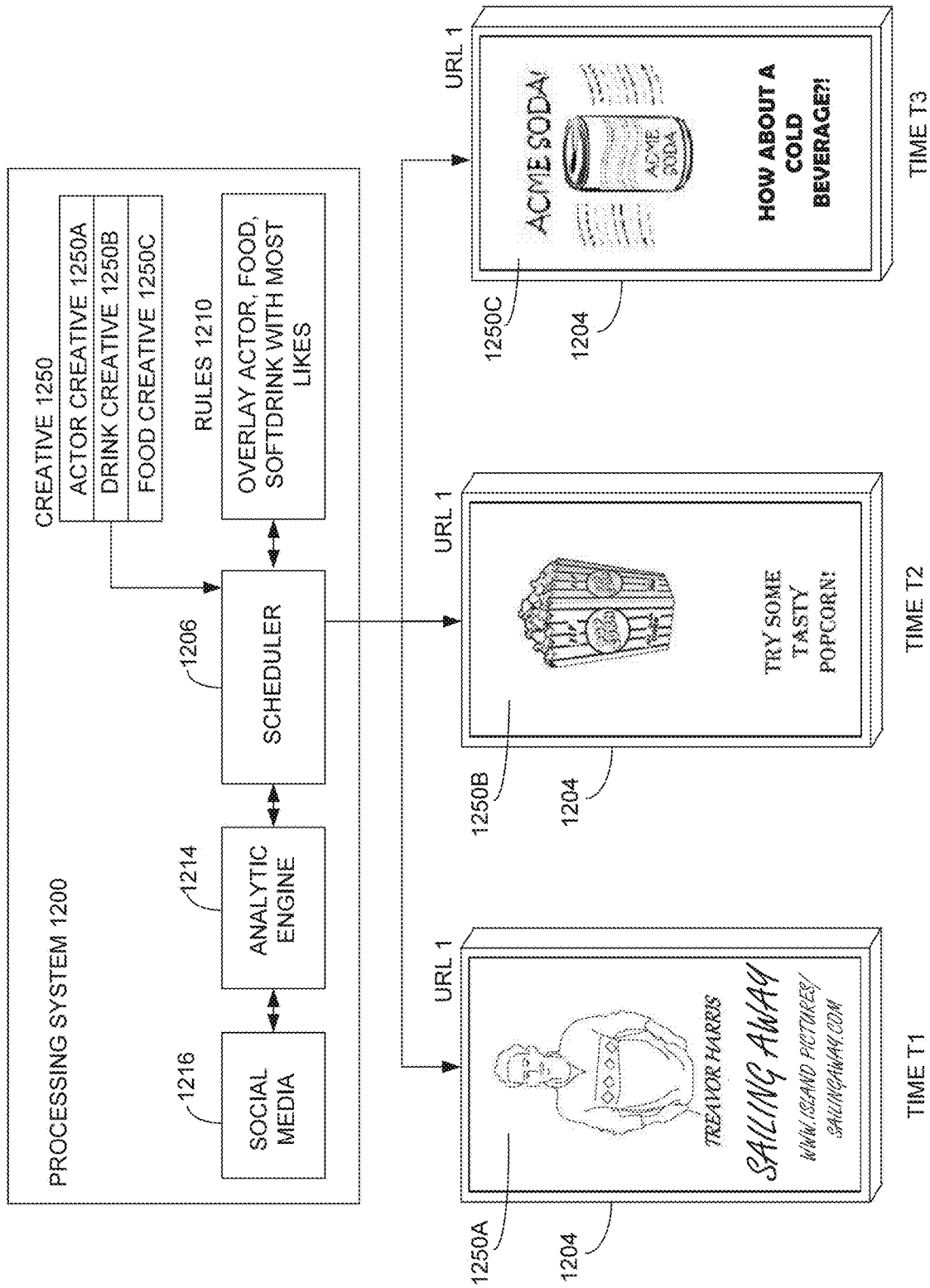
FIG. 23B depicts another example of how the processing system may overlay creative for different subjects based on social media metrics for the different subjects.

FIG. 23B shows how processing system 1200 overlays multiple creative 1250 based on social media metrics. An operator may store different groups of creative images 1250 in processing system 1200. In this example, a first group of creative 1250A may include actors in the movie Sailing Away, a second group of creative 1250B may include drink products sold at the movie theater showing the movie Sailing Away, and a third group of creative 1250C may include food products sold at the movie theater showing the movie Sailing Away.

In this example, rules 1210 direct scheduler 1206 to interlay actor creative 1250A, drink creative 1250B, and food creative 1250C based on related social media metrics. For example, scheduler 1206 first may identify one of the actors in the movie Sailing Away with the most likes in social media 1216. In this example, scheduler displays creative 1250A for Trevor Harris on digital sign 1204 for a predetermined time period T1.

Rules 1210 also directs scheduler 1206 to automatically overlay a second drink creative 1250C over actor creative 1250A. Scheduler 1206 identifies one of a list of drink products sold by the theater with the most likes and displays the associated creative 1250B on digital sign 1204 for a time period T2.

Rules 1210 then directs scheduler 1206 to automatically overlay a third food creative 1250C over drink creative 1250B. Scheduler 1206 identifies one of a list of food products sold by the theater with the most likes and overlays the associated creative 1250C on digital sign 1204 for a time period T3. Rules 1210 may direct scheduler 1206 to repeat the display process by then overlaying an actor creative 1250A with the most likes.

The social media based overlays in FIG. 23B can be used for any combination of items. For example, a restaurant may serve breakfast, lunch, and dinner items. An operator may include three sets of creative 1250A, 1250B, and 1250C associated with breakfast, lunch, and dinner items, respectively. Rules 1210 may direct scheduler 1206 to display one or more breakfast creative 1250A associated with a breakfast product with highest social media metric during a first time period associated with breakfast, display one or more lunch creative 1250B associated with a lunch product with a highest social media metric during a second time period associated with lunch, and display one or more creative 1250C associated with a dinner product with a highest social metric during a third time period associated with dinner.

FIG. 24 shows another example of how processing system 1200 may automatically generate different promotions. A manufacturer may sell mayonnaise products on shelves 1252 of a grocery store. Digital display 1204 may be located adjacent to shelves 1252. An advertising team may generate a series of creative images 1254 showing mayonnaise used with different food products. For example, creative 1254A may show the mayonnaise used with deviled eggs and creative 1254B may show the mayonnaise used on a sandwich. A third creative 1254C may show a generic picture of a mayonnaise container.

An operator may generate a set of rules 1210 that direct processing system 1200 to display different creative 1254 based on social media metrics. For example, rules 1210 may direct analytic engine 1214 to aggregate social media that refers to food items and the manufacturers mayonnaise. Rules 1210 also direct scheduler 1206 to display data 1208 that contains a 20% off promotion 1209.

Based on rules 1210, analytic engine 1214 generates metrics from social media 1216 referring to food items in conjunction with the manufacturer's mayonnaise. Analytic engine 1214 also identifies which of the food items has a highest sentiment metric 1215. In this example, analytic engine 1214 identifies deviled eggs as having a highest social media sentiment 1215.

Rules 1210 associate creative 1254A with the topic deviled eggs. Scheduler 1206 then displays creative 1254A on digital sign 1204 that shows the mayonnaise being used with deviled eggs. Rules 1210 also may direct scheduler 1206 to display a promotion 1209 that offers 25% off the mayonnaise. As explained above, promotion 1209 may be displayed for a particular time period, location, or any other condition.

Rules 1210 also may direct scheduler 1206 to display social media messages 1256 associated with the highest sentiment food item. As explained above, displaying social media messages 1256 may provide more customer interest in the creative 1254 displayed on digital sign 1204.

Social media sentiments for different food items may change based on the time of year or time of day. Processing system 1200 automatically changes creative 1254 based on the food item with the current highest sentiment. Advertisers can then create a series of creative advertisements 1254 and allow processing system 1200 to select the particular advertisement 1254 most appealing to consumers.

Figure 25:
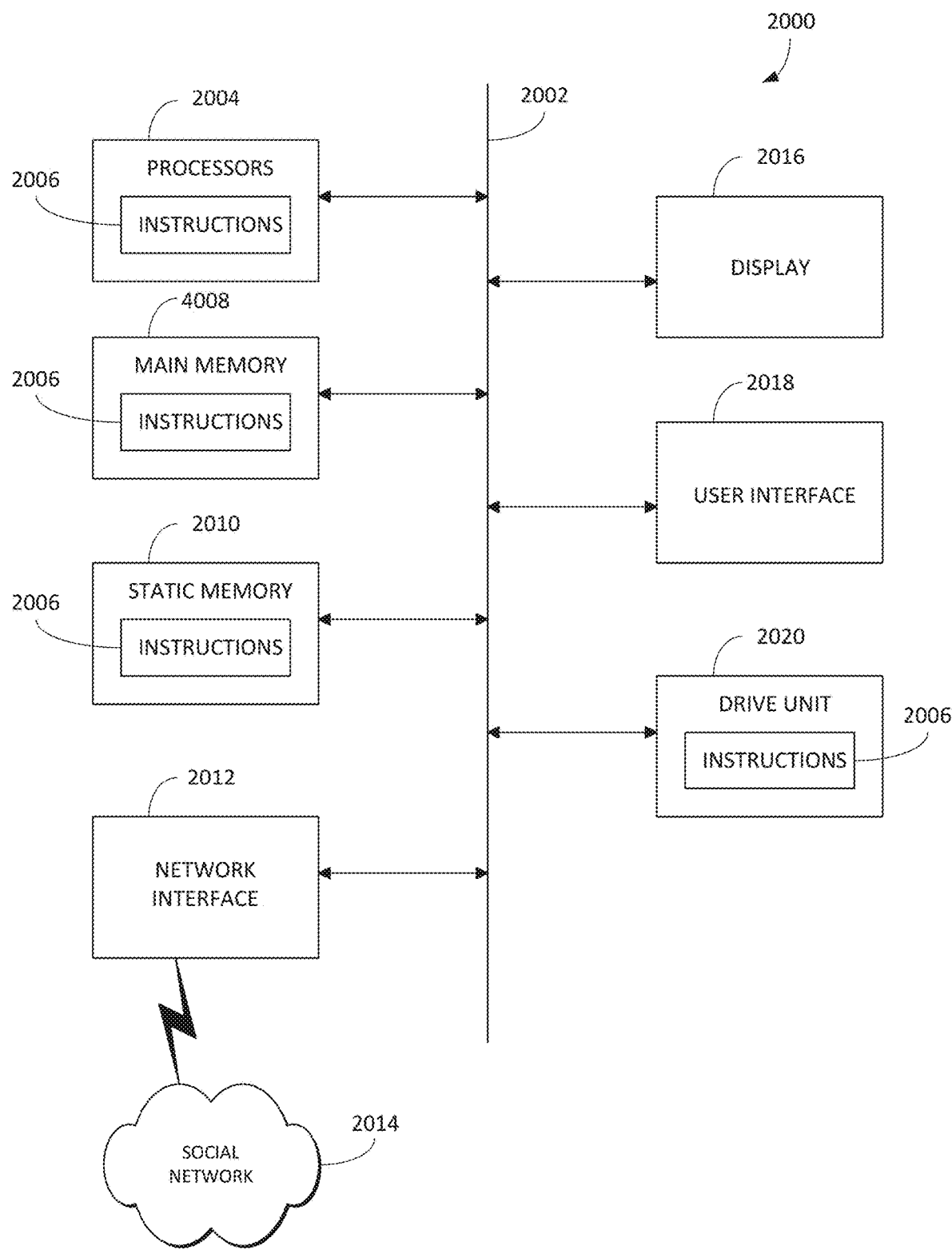
FIG. 25 depicts an example computing device used in the processing system.

FIG. 25 shows a computing device 2000 that may be used for operating processing system 1200 and performing any combination of processes discussed above. The computing device 2000 may operate in the capacity of a server or a client machine in a server-client network environment, or as a peer machine in a peer-to-peer (or distributed) network environment. In other examples, computing device 2000 may be a personal computer (PC), a tablet, a Personal Digital Assistant (PDA), a cellular telephone, a smart phone, a web appliance, or any other machine or device capable of executing instructions 2006 (sequential or otherwise) that specify actions to be taken by that machine.

While only a single computing device 2000 is shown, the computing device 2000 may include any collection of devices or circuitry that individually or jointly execute a set (or multiple sets) of instructions to perform any one or more of the operations discussed above. Computing device 2000 may be part of an integrated control system or system manager, or may be provided as a portable electronic device configured to interface with a networked system either locally or remotely via wireless transmission.

Processors 2004 may comprise a central processing unit (CPU), a graphics processing unit (GPU), programmable logic devices, dedicated processor systems, micro controllers, or microprocessors that may perform some or all of the operations described above. Processors 2004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 2004 may execute instructions or "code" 2006 stored in any one of memories 2008, 2010, or 2020. The memories may store data as well. Instructions 2006 and data can also be transmitted or received over a network 2014 via a network interface device 2012 utilizing any one of a number of well-known transfer protocols.

Memories 2008, 2010, and 2020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 2000 can further include a video display 2016, such as a liquid crystal display (LCD) or a cathode ray tube (CRT)) and a user interface 2018, such as a keyboard, mouse, touch screen, etc. All of the components of computing device 2000 may be connected together via a bus 2002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Dynamic Campaign Analytics Via Hashtag Detection

Analytic systems measure social media performance across different conversations and social accounts. The analytics are generally very broad and are only specific on a custom report basis. For example, custom software is typically developed to display specific custom reports associated with a particular business entity and/or social media campaign.

Data obtained from social network participation may identify marketing trends and effectiveness of media campaigns for particular products or branding projects. For example, the data may identify the number of participants registering or joining a particular social media network and gauge the interest level in an associated product. The social media participants may have profiles, including date of birth, gender, credit score, etc., that help identify what audiences or consumer demography are most interested in a product.

It may be difficult to identify and track all the social media associated with different social media campaigns. For example, a company may continually launch different product campaigns on different social media networks. Custom reporting software may not track every campaign launched on every social media network or track campaigns launched after development of the custom report software. Therefore, existing analytic systems may not provide a complete picture of brand performance over different social media networks.

Companies, organizations, or individuals post messages on different social networks, sometimes multiple times a day. The posted messages often include hashtags. Repetitive use of the hashtags may actually indicate the beginning, end, and current campaigns and the importance of a campaign to a brand. A hashtag analytic system may use the hashtags to identify social media campaigns and generate analytics for the campaigns.

An operator only has to enter a name of a company, product, or any other entity into a user interface. The hashtag analytic system then automatically discovers social media campaigns associated with that entity based on hashtag or keyword usage in associated posted messages. The hashtag analytic system may automatically discover the social media accounts for the entity and then scan messages posted on the social media accounts for hashtags. The hashtag analytic groups together posted messages that include campaign related hashtags and generates analytics for the groups of messages associated with the same campaigns.

The hashtag analytics provide marketers valuable insight into types of audiences and subjects of interest to those audiences. The hashtag analytics can be extrapolated as representations of target audiences for other marketing campaigns or target consumers for products or services. For instance, by collecting the specific audience of participants that include specific hashtags in their posted messages, a marketer may determine specific subjects of interest to that audience. A marketer then may identify broader advertising campaigns for identified subjects that may do well if placed in related environments, media, or publications.

The hashtag analytic system may evaluate posted messages for a particular product or branding campaign from groups of otherwise unrelated participants to better understand the overall effectiveness of a marketing strategy. The hashtag analytic system also may cross-reference between one or more communities of participants to evaluate what products and/or services a select group of participants may more likely buy or use.

Figure 26:
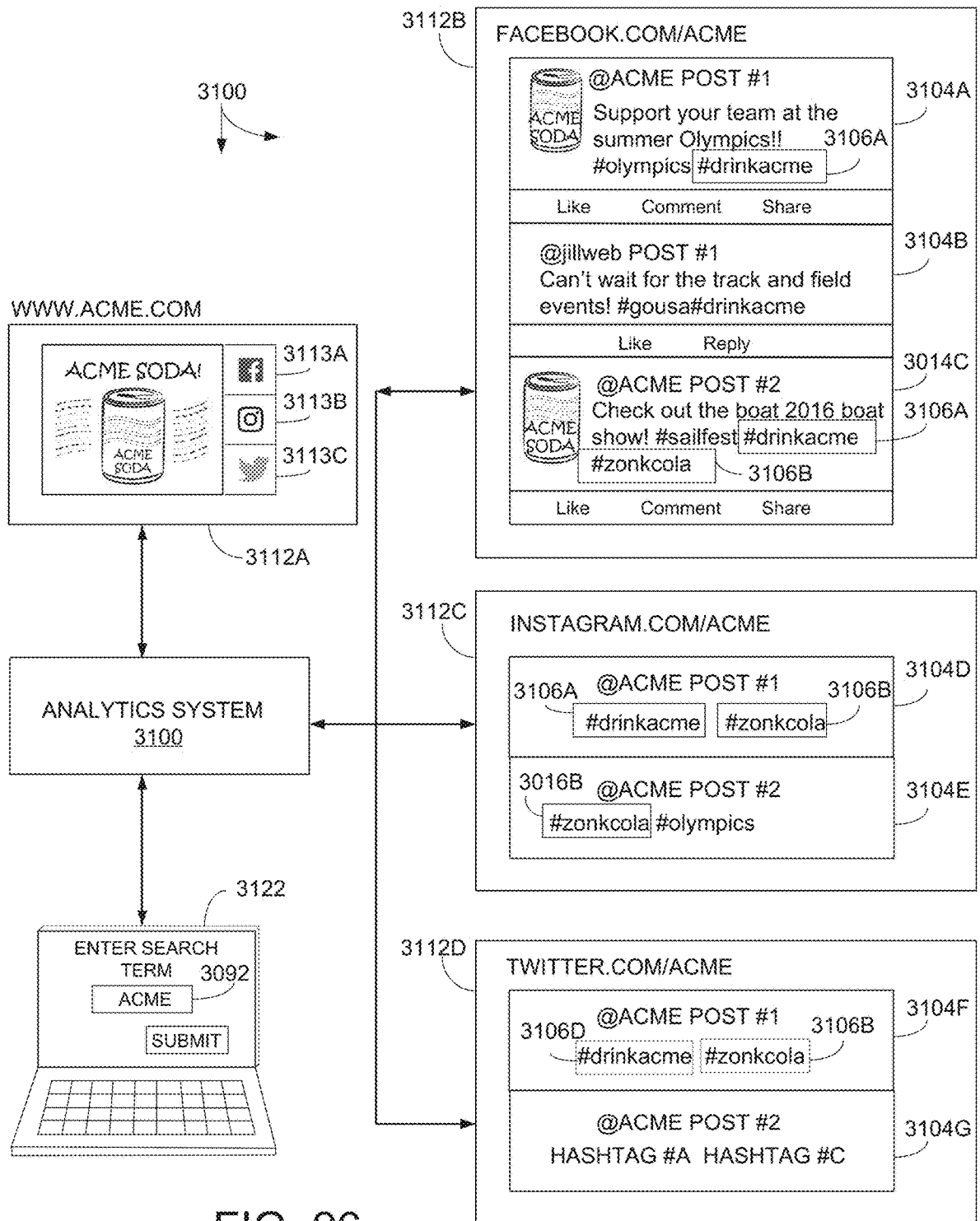
FIG. 26 depicts an example hashtag analytic system.

FIG. 26 shows a hashtag analytic system 3100 (analytic system) that automatically identifies social media campaigns associated with a particular company or other entity and then automatically generates analytics associated with the identified campaigns.

A user may access analytic system 3100 via a computer 3122, such as a laptop, personal computer, notebook, or smart device. The user may enter a search term 3092 into computer 3122 associated with any entity, such as a company, brand, person, name, event, service, product, subject, issue, etc. For example, a user may enter the name of a company Acme into a field on a user interface operating on computer 3122.

Analytics system 3100 may assume that the search term Acme is the name of an entity associated with a universal resource locator (URL), such as Acme.com. Analytics system 3100 may use the URL to identify different products and social media associated with Acme. For example, analytic system 3100 may identify links 3113A, 3113B, and 3113C on a www.acme.com webpage identifying different social media accounts. In this example, link 3113A may identify an Acme Facebook® social media account, link 3113A may identify an Acme Instagram® social media account, and link 3113C may identify an Acme Twitter® social media account.

Alternatively, analytic system 3100 may assume Acme operates certain social media accounts, such as www.facebook.com/acme; www.instagram.com/acme; and www.twitter.com/acme. Of course these are just examples and analytic system 3100 may identify any account on any social media network associated with any entity.

Analytics system 3100 also may automatically create a map of different products associated with Acme. For example, Acme may sell multiple different brands of soft drinks. The different brands may include separate webpages and/or have a webpage hierarchy on the Acme.com website 3112A. Analytics system 3100 may identify the different brands or products on the Acme website 3112A and also identify the links to different social media accounts for each of the identified brands or products. Automatically identifying different products or bands associated with an entity is also described in co-pending U.S. patent application Ser. No. 15/160,694, Entitled: Social Media Enhancement, filed May 20, 2016, which is herein incorporated by reference in its entirety.

Analytics system 3100 accesses social media accounts 3112B-3112D identified in Acme website 112A. For example, analytic system 3100 may scan and/or download messages 3104A-3104C posted by the Acme Facebook® social media account 3112B. Similarly, analytic system 3100 may scan and/or download messages 3104D and 3104E posted on the Acme Instagram® account 3112C, and messages 3104F and 3104G posted on the Acme Twitter® account 3112D.

Analytics system 3100 may assume most campaigns launched by a company have associated hashtags, keywords, or mentions. For example, the Acme company may post messages 3104 that include certain hashtags 3106 associated with different social media campaigns.

In this example, Acme may post a message 3104A on social media account 3112B that includes the hashtags #olympics and #drinkacme and may post a message 3104C that includes the hashtags #drinkacme and #zonkcola. Acme may post message 3104D on social media account 3112C that includes the hashtags #drinkacme and #zonkcola and post message 3104E on social media account 3112D that includes the hashtags #drinkacme and #zonkcola.

Analytics system 3100 may identify hashtags associated with campaigns based on the number of times the hashtags are used in posted messages. For example, analytic system 3100 may associate any hashtag 3106 with a campaign when used in two or more messages 3104 posted by the same and/or different Acme social media accounts 3112. In this example, two messages 3104A and 3104C posted by the @Acme Facebook® account include #drinkacme hashtag 3106A. Accordingly, analytic system 3100 associates hashtag 3106A with a campaign.

Based on the identified campaign, analytic system 3100 may generate metrics associated with the #drinkacme hashtag. For example, analytic system 3100 may generate metrics for any messages 3104A-3104C on the Facebook® social media network that include the #drinkacme hashtag. For example, analytic system 3100 may identify impressions, views, posts, influencers, likes or any other type of participant engagement with the #drinkacme campaign. Analytics system 3100 also may identify demographics for the participants interacting with the #drinkacme campaign.

Analytic system 3100 may discover other campaigns launched by the same entity. For example, analytic system 3100 may identify a second hashtag 3106B used multiple times in messages posted in social media account 3112C. Accordingly, analytic system 3100 may download all of the messages posted on social media account 3112C that include #zonkcola hashtag 3106B and generate associated metrics. Analytics system 3100 also may compare analytics for different identified campaigns, such as comparing the number of impressions, user posts, demographics and any other user generated content (UGC) for the #drinkacme and #zonkcola campaigns.

If a campaign is identified in any one social media account 3112, analytic system 3100 may identify posted messages on other identified social media accounts 3112 that include the associated hashtag and generate associated analytics. In another example, analytic system 3100 may associate a hashtag with a campaign when the same hashtag is used in messages posted in two or more social media accounts 3112. For example, social media accounts 3112B, 3112C, and 3112D have all posted messages that include the #drinkacme and #zonkcola hashtags.

Thus, analytic system 3100 automatically identifies any campaigns launched by an entity and automatically generates analytics associated with the identified campaigns based on a single search term 3092 entered into computer 3122. Analytic system 3100 generates real-time less expensive social media analytics with more comprehensive views of all social media campaigns without having to create custom campaign reports.

Figure 27:
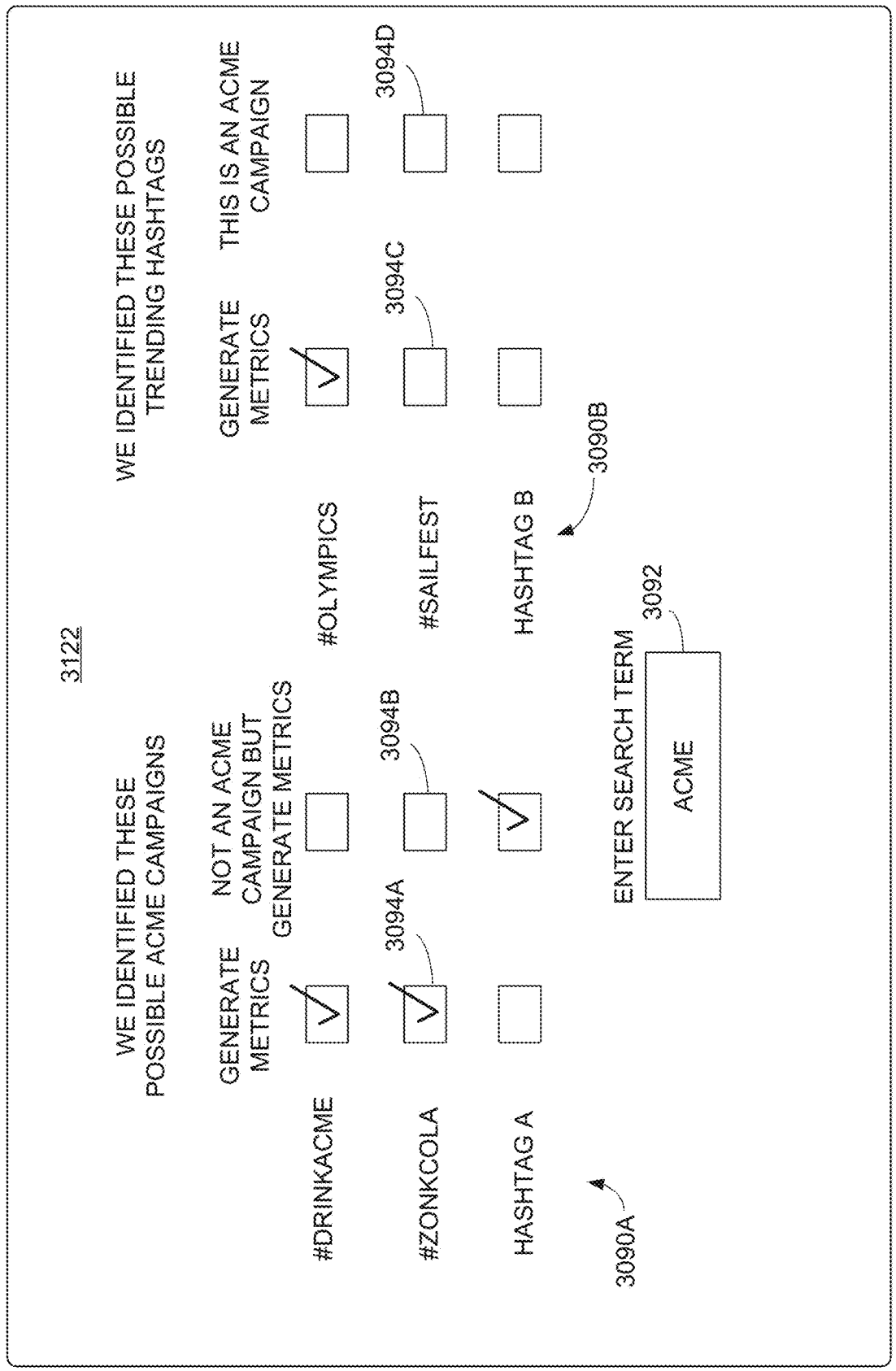
FIG. 27 depicts example campaign hashtags identified by the hashtag analytic system.

FIG. 27 shows initial search results from the analytic system. Referring to FIGS. 26 and 27, a user enters a search term 3092, such as Acme, into a field displayed on computer 3122. Analytic system 3100 may access a webpage and/or social network accounts associated with the Acme search term as described above in FIG. 26.

Analytics system 3100 scans the social media accounts as described above to identify different hashtags. Analytics system 3100 may identify a first group of hashtags 3090A as possibly associated with Acme campaigns. For example, analytic system 3100 may list hashtags 3090A used in multiple Acme posted messages as possible campaigns. Analytics system 3100 may list other highest trending hashtags 3090B that are not used multiple times in multiple Acme posts and/or are used in messages posted by Acme account participants.

Analytics system 3100 may display a first column of check boxes 3094A that a user may select to confirm which hashtags 3090A are associated with actual Acme campaigns. Analytic system 3100 may generate analytics for hashtags selected in boxes 94A. Analytics system 3100 may display a second column of check boxes 3094B that the user may select to identify hashtags 3090A that are not Acme campaigns. In one example, analytic system 3100 may generate analytics for the non-campaign hashtags selected in boxes 94B.

Analytic system 3100 may display a third column of check boxes 3094C for trending hashtags 3090B that are not initially identified as associated with campaigns. For example, Acme accounts may post messages that include popular hashtags that are not necessarily associated with Acme products or services. These are typically indicated by a single post or a couple of posts in one day.

A user has the option of directing analytic system 3100 to generate metrics for trending hashtags 3090B by selecting associated boxes 3094C. For example, the user may be interested in viewing the demographic data for a trending hashtag 3090B associated with the summer Olympics. Based on the demographics, the user may add the trending hashtag and/or other related content to messages for a particular campaign.

Analytics system 3100 may display a fourth column of check boxes 3094D that a user may select to identify hashtags that were initially identified as trending hashtags but are identified by the user as associated with Acme campaigns. Analytics system 3100 may move hashtags 3090B selected in boxes 3094D to hashtags list 3090A.

Figure 28:
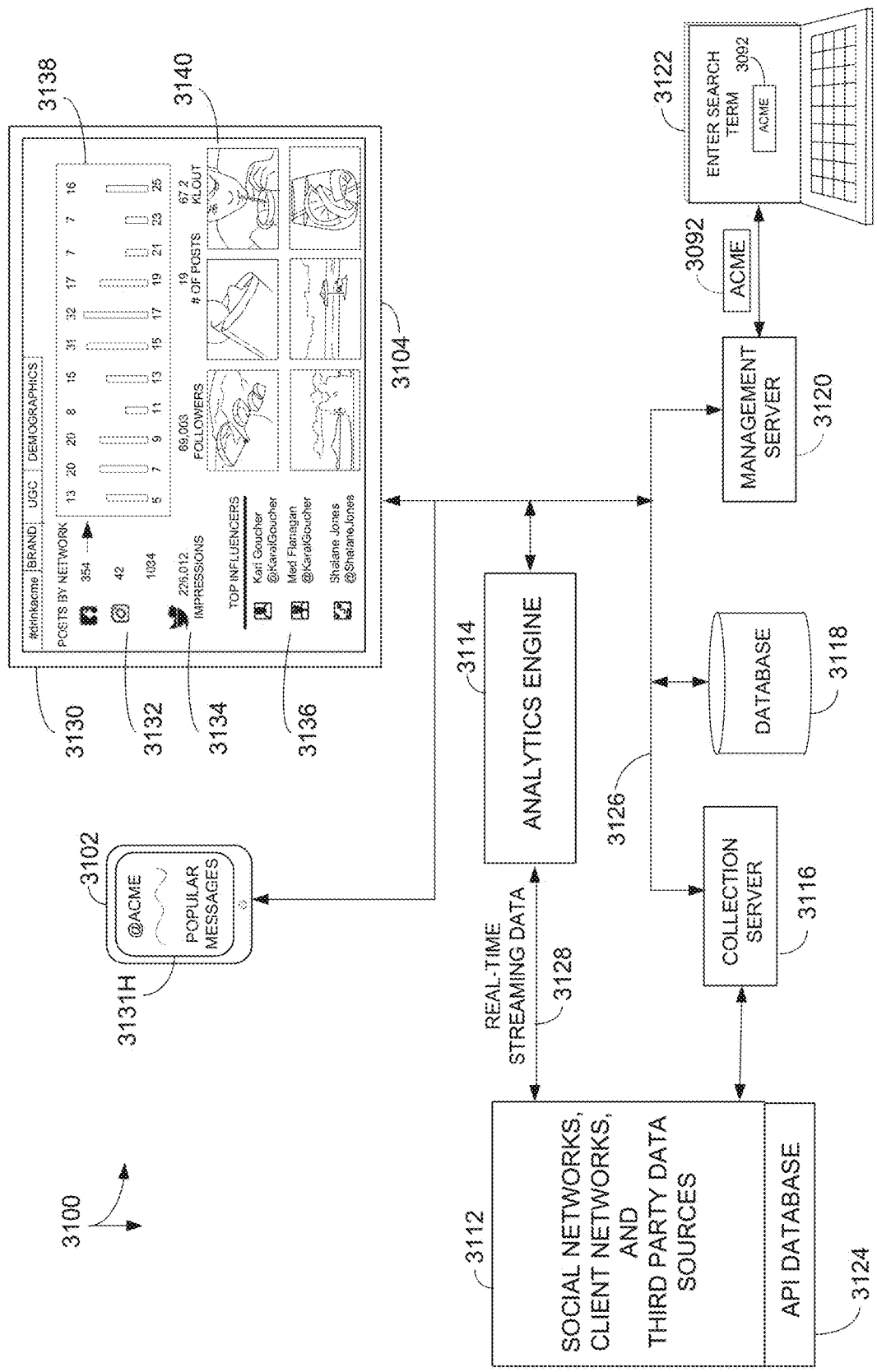
FIG. 28 depicts the hashtag analytic system of FIG. 26 in more detail.

FIG. 28 shows hashtag analytic system 3100 in more detail. An analytics engine 3114 may connect to different display devices 3102 and 3104. For example, display device 3102 may include a portable notebook, portable tablet, smart phone, smart watch, personal computer, or the like, or any combination thereof. Display device 3104 include a display screen, such a light emitting diode (LED) screen, a liquid crystal display (LCD) screen, or any other type of screen or display device. Analytics engine 3114 also connects to a computer 3122 that may include a personal computer (PC), laptop, tablet, smart phone, smart watch, or any other computing device that can initiate a campaign search.

Analytic system 3100 may access different data sources 3112, such as social networks, client networks, or any other source of social media content or analytic data. As mentioned above, social networks may include social media websites, such as Twitter®, Facebook®, Instagram®, or the like. Client networks may include websites for a company, individual, or any other entity associated with social media. For example, client networks may include the www.acme.com website and other Acme company databases.

Third party data sources 3112 may include websites such as Adobe® or Google® analytics that monitor, measure, and/or generate metrics for social media, data sources, websites, etc. Another example third party data source 3112 may include customized databases, such as created by Salesforce®, Salesforce® Radian6, or Sysomos® that provide access to marketing and sales data.

Some data sources 3112 may provide content, such as posted messages, and other data sources 3110 may provide more numerical data such as, analytic data, company sales data, inventory data, financial data, spreadsheet data, website ecommerce data, wrist band radio frequency identification (RFID) reader data, number web page views, number of unique page views, time on web pages, starting web page, bounce rates, percentage of exists from web pages, impressions, Klout, or any other analytic data that may be relevant to a social media campaign.

Analytics engine 3114 and collection server 3116 may use database application programmer interfaces (APIs) 3124 to access data from data sources 3112. For example, analytics engine 3114 may use APIs 3124 to extract real-time streaming data 3128 from data sources 3112. Collection server 3116 also may use APIs 3124 to extract and store data 3126 from data sources 3112 in a database 3118. Streaming data 3128 may be similar to data 3126 and may include real-time updates to data already stored in database 3118.

A user may enter search term 3092 into computer 3122. For example, the user may enter any keyword, data string, term, value, or any other combination of characters into computer 3122. In one example, search term 3092 may include the name of company or person, a name of a product or service, a brand name, a name of a campaign or event associated with a company or person, a name of a department within a company, a name of an account on a social website, a name of a subject or account, a hashtag name associated with the person or company, a name of a competitor or competitive product, or the name of any other service, item, topic, data category, content, event, or any other entity identifier.

A management server 3120 may direct collection server 3116 and/or analytics engine 3114 to identify and extract data from data sources 3112 associated with search term 3092. For example, management server 3120 may direct collection server 3116 or analytics engine 3114 to search for different social media accounts on the www.acme.com website and extract or scan data for different products or services sold on the www.acme.com website.

Collection server 3116 may download links to the social media accounts and product information into database 3118. Management server 3120 then may direct collection server 3116 to download content from the social media accounts identified on the Acme website. For example, collection server 3116 may download or scan posted messages from the www.facebook.com/acme social media account into database 3118. Alternatively, a user may enter the social media account directly into computer 3122 as search term 3092.

Management server 3120 and/or analytics engine 3114 then may identify campaigns launched by Acme based on the hashtags in the posted messages. As mentioned above, analytic system 3100 may count the number of times the same hashtag or keyword is used in different posted messages. Analytic system 3100 may identify any hashtag or keyword used more than some threshold number of times in Acme posted messages as associated with a campaign.

Analytic system 3100 then may cause collection server 3116 to download messages posted by the Acme account or posted by Acme account participants that include the identified campaign hashtag. Analytic system 3100 may download any other analytics associated with the downloaded messages, such as participant influencer data. Analytic system 3100 then may cause analytics engine 3114 to start downloading real-time streaming data 3128 from data sources 3112 that include, or are associated with, the identified campaign hashtag.

Analytics engine 3114 may group together content based on the identified campaign hashtag. For example, an identified campaign may include all of the messages posted by the Acme account that include the identified campaign hashtag and include all of the messages posted by participants underneath the Acme posted messages, such as posted messages, replies, comments, etc. The campaign data may include any other data associated with the campaign hashtag.

Analytics engine 3114 may generate and display content and analytics related to the campaign hashtag on display devices 3102 and/or 3104. For example, analytic system 3100 may display a menu 3130 that identifies a selected campaign hashtag, such as #drinkacme. The user may select brand analytics, user generated content (UGC) analytics, or demographics from menu 3130. Some analytics are described in more detail below and are just examples of any analytic data that may be downloaded and/or generated by hashtag analytic system 3100.

In response to the user selecting UGC analytics from menu 3130, analytics engine 3114 may identify a number of messages 3132 posted by different participants on different Acme social media accounts that are part of the #drinkacme hashtag thread. Analytics server 3114 also may display analytics 3134 that identify the number of impressions, number of followers, number of acme posts and Klout for the #drinkacme campaign.

Analytics system 3100 may identify the top influencers 3136 that posted messages including the #drinkacme hashtag. Top influencers 3136 may include participants with the largest number of followers, such as celebrities, journalists, experts, etc. Analytic system 3100 also may display histograms 3138 identifying the number of messages posted by participants on the different social media account over different days of the past month.

Analytics system 3100 also may display highest trending user posts 3140, posts with the largest number of likes, or participants with the largest number of followers. Again, these are just examples of any combination of content and analytic data may be downloaded, generated, and displayed by analytic system 3100.

A user may enter a new search term 3092 into computer 3122. Management server 3120 may identify previously grouped social media associated with the new search term 3192. If content does not currently exist, management server 3120 may direct collection server 3116 and analytics engine 3114 to search data sources 3112 for associated websites and social media accounts associated with the new search term 3092 as described above. Analytic system 3100 then identifies the campaigns and generates the associated metrics as also described above.

Thus, analytic system 3100 provides the unique features of identifying different campaigns for an entity and then automatically generating metrics for the identified campaigns based on a single search term.

Figure 29:
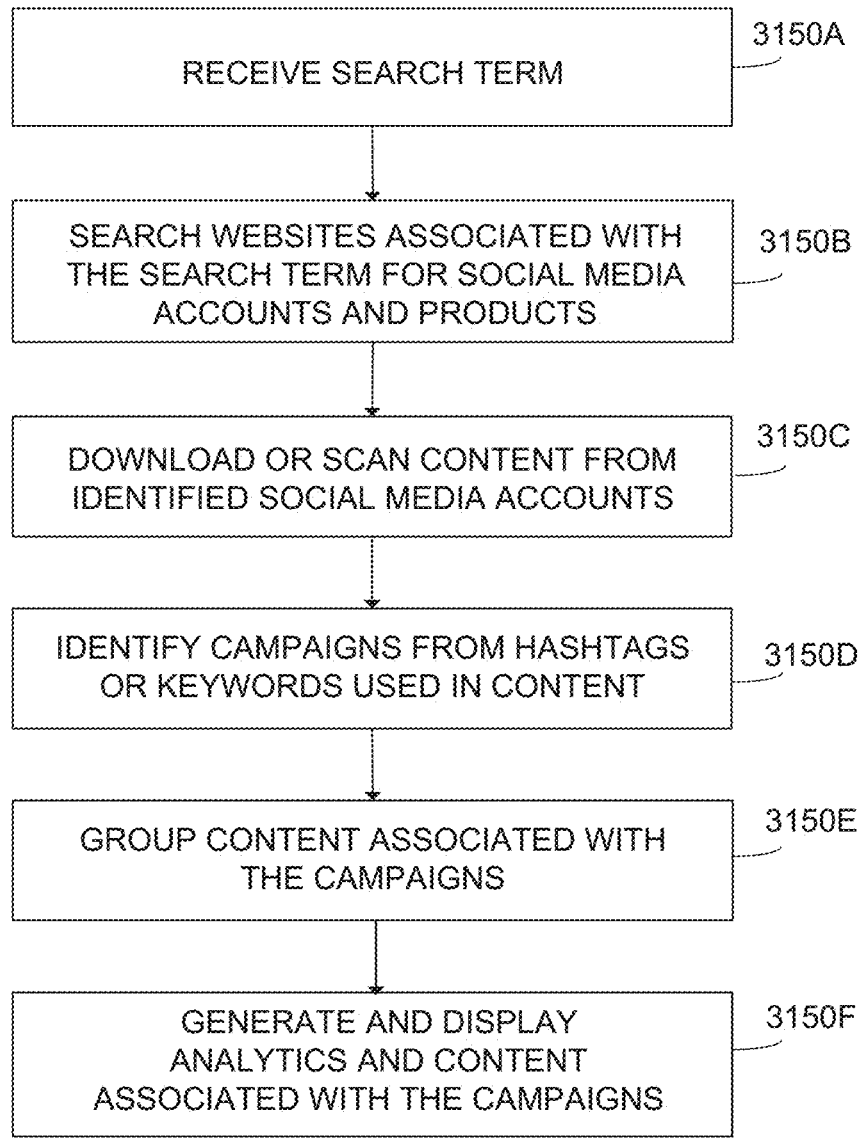
FIG. 29 depicts an example process for identifying social media campaigns.

FIG. 29 shows an example campaign identification process. In operation 3150A, the analytic system receives a search term. As mentioned above, the search term may include any identifier of any type of entity, including a company name, product or service name, campaign name, hashtag, keyword, event, or the like, or any combination thereof.

In operation 3150B, the analytic system searches websites, or any other data sources associated with the search term, for social media accounts. For example, the analytic system may search for any links or content on a brand website identifying social media accounts.

In operation 3150C, the analytic system may download content from the identified social media accounts. For example, the analytic system may download messages posted both by the identified social media account and by participants interacting on the social media accounts. Alternatively, the analytic system may just scan the posted messages for specific data without first downloading the posted content into the analytic system database.

In operation 3150D, the analytic system may identify hashtags or other keywords, used in the downloaded social media. The analytic system then identifies hashtags or keywords associated with campaigns. For example, analytic system may count the number of times a particular hashtag or keyword is included in messages posted by the social media account.

The analytic system may use different criteria for determining if the hashtag is associated with a campaign. For example, the analytic system may determine that any hashtag used two or more times on the same social media account as potentially associated with a campaign. Other criteria may identify campaigns based on the number of times the hashtag is used in messages posted on different social media accounts.

In operation 3150E, the analytic system groups social media content together based on the identified campaigns. For example, the analytic system may group together a thread of all posted messages and associated analytic data associated with the identified campaign hashtag.

In operation 3150F, the analytic system may generate and display analytics and content associated with the campaigns. As explained before, the analytic system may generate analytics for all of the messages posted by a social media account that include the campaign hashtag. The analytic system also may generate metrics for the participants posting messages or otherwise responding to the social media account posted content, such as impressions, number of participants, participant posts, etc. The analytic system also may generate demographic data for the participants, such as age, sex, race, interests, geographic locations, etc. The analytic system may use known filters to remove spam posts that could alter the campaign analytics.

The analytic system may continually monitor any identified social media accounts for new campaigns and update previously generated campaign analytics. For example, the Acme company may start a new campaign on a new soft drink. The analytic system may automatically identify the hashtag used in the new soft drink campaign, generate metrics for the new campaign, and display the newly identified campaign and associated analytics.

As mentioned above, the analytic system may generate analytics based on any group of social media associated with the identified campaign hashtag. In one example, the analytic system may generate analytics based only on posts that include the hashtag or may generate analytics that include other content associated with the social media accounts. Analytics generated for a specific set of posted messages that include the campaign hashtag may be more tailored to specific campaign topics and audiences.

Figure 30:
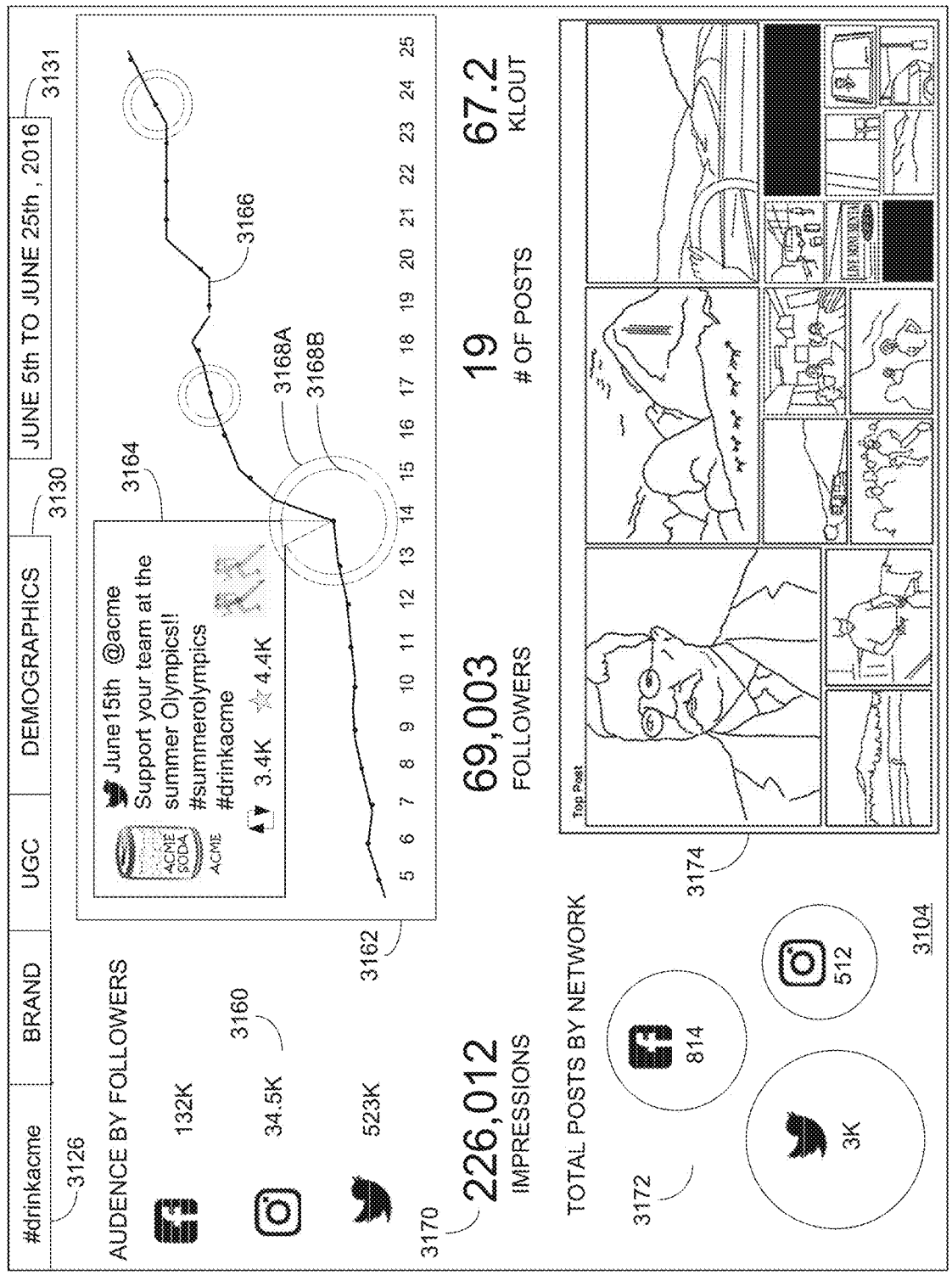
FIG. 30 depicts example brand analytics generated by the hashtag analytic system.

FIG. 30 shows example brand related analytics generated by the analytic system. The analytic system may display menu 3130 in a top corner of display device 3104. Menu 3130 may display a selected campaign hashtag 3126 in a first field. The user may select between brand analytics, UGC analytics, and demographic analytics within menu 3130. The user also may select a time period 3131 for the selected analytics such as, from June $5^{th}$ to June $25^{th}$.

In response to the user selecting brand analytics from menu 3130, the analytic system may identify the number of followers 3160 on each Acme social media account. Followers are participants that subscribe to a social media account and/or choose to view posted messages from a particular social media account.

The analytic system may display a chart 3162 that graphs specific social media activity at specific points in time overlaid on top of a trending line chart 3166. For example, item 3164 may be a post from an Acme Instagram® account that discusses the Summer Olympics. Line chart 3162 may identify the total number of participants that have joined, registered, viewed, or otherwise interacted with posted messages and/or participated in a social network forum as a function of time.

The analytic system may display posted message 3164 in combination with a set of layered circles 3168 that each represent a different score based on volume for item 3164. For example, an outer circle 3168A may represent the number of likes for posted message 3164 and an inner circle 3168B may represent the number of comments for posted message 3164 accumulated over the selected time period.

The effect of a particular hashtag post 3164 attracting or eliciting participation in the broader social network forum may be determined from chart 3162. For example, there may be a correlation between the numbers of likes and/or comments associated with a particular hashtag posted message 3164 (as indicated by the size of one or both layered circles 3168) and the effect of message 3164 on the total number of participants identified by line chart 3166.

In some cases a particular posted message 3164 having relatively few comments and/or likes may nevertheless drive a disproportionately large increase in total participation in line chart 3166, or vice versa. For example, messages 3164 posted by participants having large user followings, such as celebrities, may be more influential in attracting additional participants compared with messages 3164 posted by participants having fewer followers.

The analytic system also may display analytics 3170 identifying the number of impressions and number of followers for the social media account and posted message associated with campaign hashtag 3126. Impressions in the context of online advertising indicate the number of times an advertisement is fetched from its source.

The analytic system also may generate a Klout score typically a number between 1 and 100 that represents an influence of the social media campaign. The more influential the campaign, the higher the Klout score. Impressions, followers, and Klout scores are known to those skilled in the art and therefore are not described in further detail.

The analytic system may identify the total number of messages 3172 posted on each social media account that include hashtag 3126. The analytic system also may identify the most popular messages 3174 posted by the social media accounts that include hashtag 3126. For example, posted messages 3174 and associated sub-tree messages may have the largest number of likes.

Figure 31:
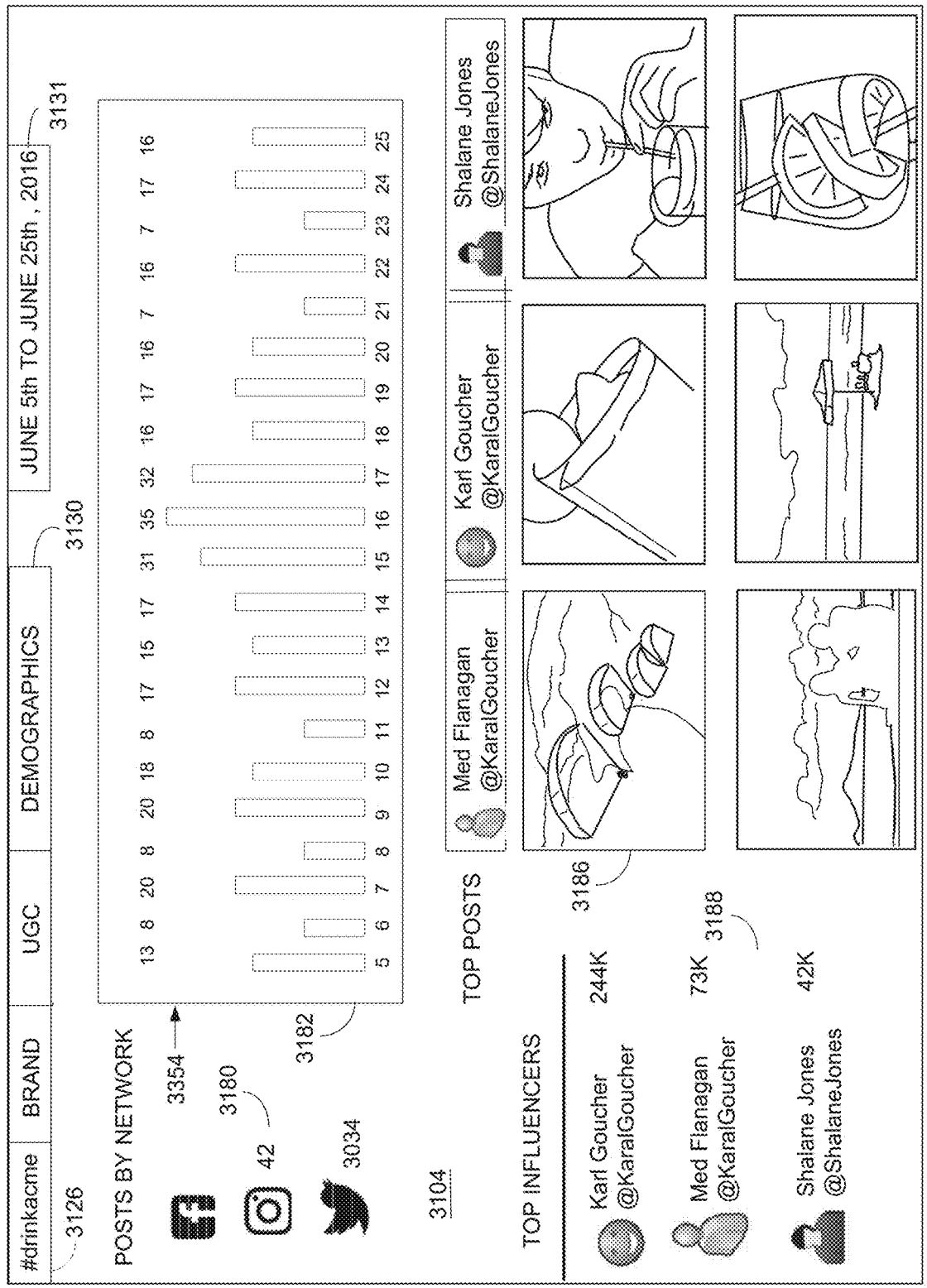
FIG. 31 depicts example customer generated content analytics generated by the hashtag analytic system.

FIG. 31 shows one example of user generated content (UGC) analytics associated with hashtag 3126. In response to selection of the UGC icon in display menu 3130, the analytic system may identify the number of messages posted by participants on different social media accounts 3180 that include hashtag 3126.

The analytic system may display a histogram chart 3182 that identifies the number of user posted messages for a selected one of social media accounts 3180 over a selected time period. The analytic system also may identify the top influencers 3188 that posted messages including hashtag 3126. For example, top influencers 3188 may be celebrities with large numbers of followers. The analytic system also may display the top messages 3186 posted by participants, such as with the largest number of likes.

The UGC analytics represent earned social media marketing created by participants other than the entity that operates the social media account. For example, photos in messages 186 may provide insight into what content customers use in responses. The brand may then use similar photos to increase participant engagement or sponsor related types of events.

The analytic system also may display analytics with brand colors. For example, the analytic system may extract a brand color scheme from a brand avatar and use the color scheme as a background for displaying brand analytics. Using brand themes is also described in described in co-pending U.S. patent application Ser. No. 15/160,694, Entitled: Social Media Enhancement, filed May 20, 2016, which has been incorporated by reference.

Figure 32:
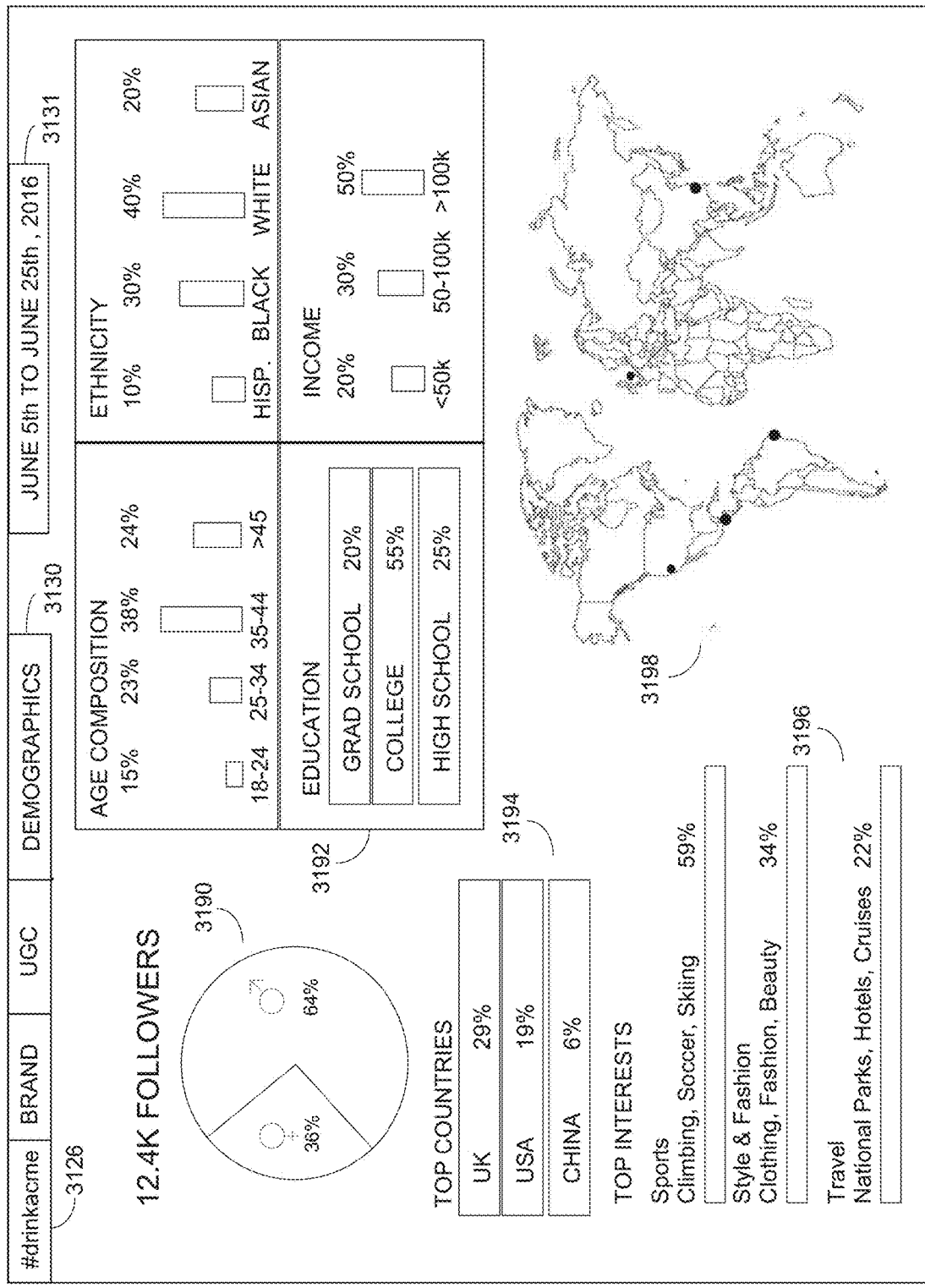
FIG. 32 depicts example demographic analytics generated by the hashtag analytic system.

FIG. 32 shows example user hashtag related demographics generated by the analytic system. In response to selecting the demographics icon in display menu 3130, the analytic system may generate different demographic data associated with hashtag 3126. For example, pie chart 3190 may indicate the percentage of male and female followers for the Acme social media accounts or related to hashtag 3126.

The analytic system also may generate charts 3192 that identify the percentages of Acme account followers by age, ethnicity, education, and income. Charts 3194 may identify the percentage of Acme followers in different countries. The analytic system also may display charts 3196 that identify top interests of the social media account followers. For example, top interests for 59% of the Acme followers may be climbing, soccer, and skiing.

Of course top interests may be identified for any subject, such as national news, national parks, politics, international news, bird watching, geology, etc. The analytic system also may identify top brands and/or top TV shows with the most number of followers, participants, fans, etc. The analytic system also may display a world map 3198 that identifies the geographic locations of the Acme followers for hashtag 3126.

The analytic system generates analytics for any participants and any participant interaction associated with the social media campaign. For example, participants may include anyone posting messages, or liking, sharing, viewing, commenting, mentioning, replying, or retweeting posted messages that include the campaign hashtag.

The analytic system may not have direct access to user profiles for some participants. The user profiles for theses participants may be separately obtained from a social network or other service provider and then linked to the message posted by the participant that includes the specific hashtag. The analytic system also may use other services to analyze different participant segments or may send captured data to third party services for analysis and providing specific insight on the different participants.

The analytic system may organize participants into verified and unverified groups. Verified groups are confirmed as associated celebrity or influential user accounts.

Figure 33:
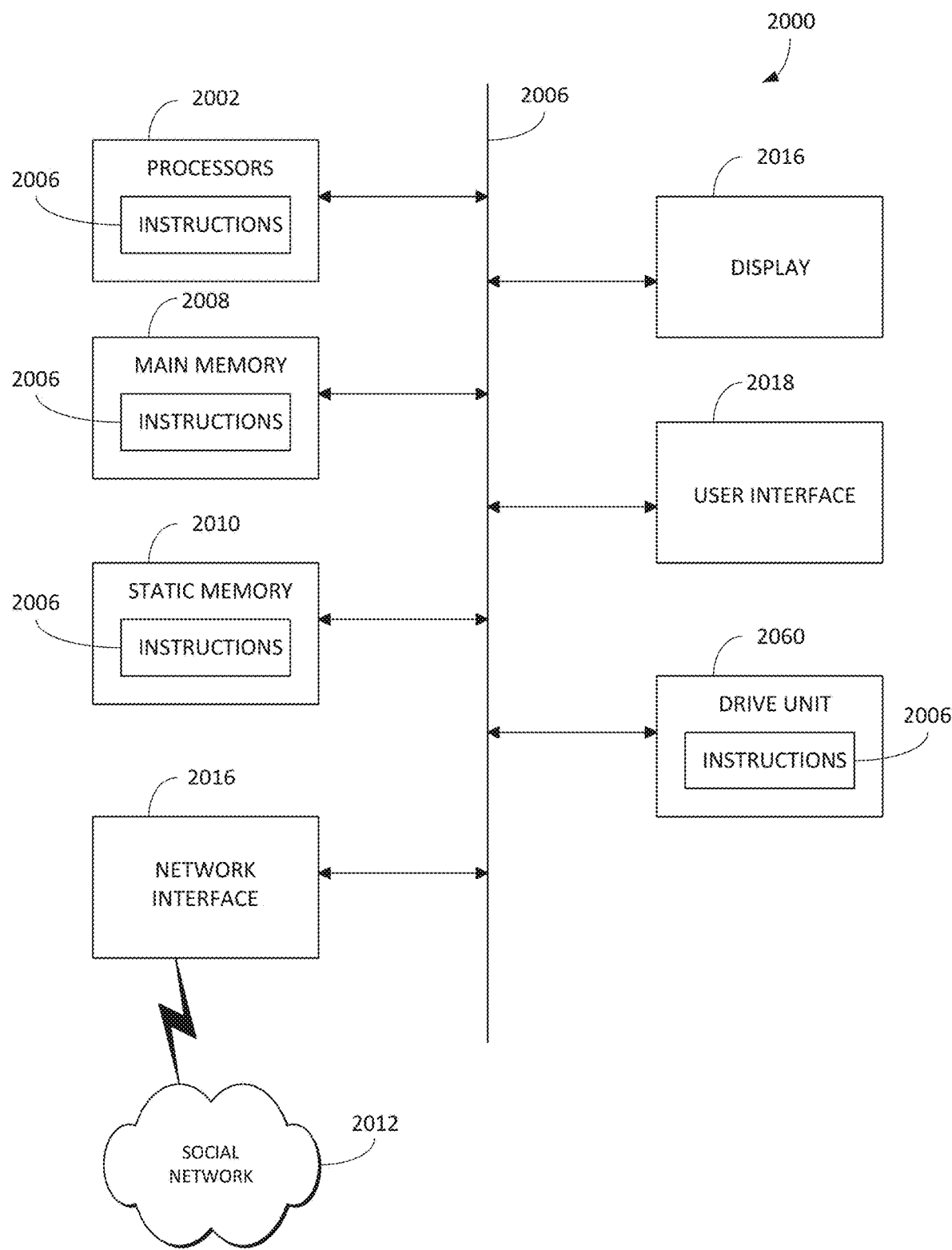
FIG. 33 depicts an example computing device used in the hashtag analytic system.

FIG. 33 shows a computing device 4000 that may be used for operating the analytic system computing devices and performing any combination of processes discussed above. The computing device 4000 may operate in the capacity of a server or a client machine in a server-client network environment, or as a peer machine in a peer-to-peer (or distributed) network environment. In other examples, computing device 4000 may be a personal computer (PC), a tablet, a Personal Digital Assistant (PDA), a cellular telephone, a smart phone, a web appliance, or any other machine or device capable of executing instructions 4006 (sequential or otherwise) that specify actions to be taken by that machine.

While only a single computing device 4000 is shown, the computing device 4000 may include any collection of devices or circuitry that individually or jointly execute a set (or multiple sets) of instructions to perform any one or more of the operations discussed above. Computing device 4000 may be part of an integrated control system or system manager, or may be provided as a portable electronic device configured to interface with a networked system either locally or remotely via wireless transmission.

Processors 4004 may comprise a central processing unit (CPU), a graphics processing unit (GPU), programmable logic devices, dedicated processor systems, micro controllers, or microprocessors that may perform some or all of the operations described above. Processors 4004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 4004 may execute instructions or "code" 4006 stored in any one of memories 4008, 4010, or 4020. The memories may store data as well. Instructions 4006 and data can also be transmitted or received over a network 1014 via a network interface device 4012 utilizing any one of a number of well-known transfer protocols.

Memories 4008, 4010, and 4020 may be integrated together with processing device 4000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 4000 can further include a video display 4016, such as a liquid crystal display (LCD) or a cathode ray tube (CRT) and a user interface 4018, such as a keyboard, mouse, touch screen, etc. All of the components of computing device 1000 may be connected together via a bus 4002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. An apparatus, comprising:
a memory storing instructions that, when executed by at least one hardware processor, implement a software system to continually ingest social media as it is published to one or more social networks during a time period and curate content for one or more digital signs over the time period as the social media is published during the time period;
the software system including a chain of data processors to produce one or more sequences of individual display elements for the one or more digital signs, respectively, each sequence of the one or more sequences for a corresponding digital sign of the one or more digital signs and including individual display elements having content changing for one individual display element of the sequence to another individual display element of the sequence, as trends emerge in the continually ingested social media;
the software system further including a user interface to display, in real-time, metric data characterizing the continually ingested social media to an operator alongside an array of control elements, the array of control elements of the user interface usable by the operator to generate control data inputable into the chain of data processors to manually adjust at least part of the production of any sequence of the sequences, in which the software system is arranged to automatically continue generating at least one sequence of the sequences absent any adjustment specified using the array of control elements;
the chain of data processors including:
at least one initial data processor to perform a layer of processing on the continuously ingested social media, wherein the continually ingested social media contains metrics and unstructured data taken from one or more user messages published to the one or more social media networks and the layer of processing including at least deriving additional metrics from the metrics and the unstructured data, the at least one initial data processor including at least one input to receive the continually ingested social media and at least one output to feed the derived additional metrics to at least one scheduler or other subsequent data processor of the chain of data processors; and
the software system to:
store a set of creative images associated with different subjects;
store rules specifying conditions for displaying the creative images based on the additional metrics;
the at least one scheduler or other subsequent data processor having an input coupled to the at least one output of the at least one initial data processor, the at least one scheduler or other subsequent data processor to perform an additional layer of processing based on the layer of processing by the at least one initial data processor, the additional layer of processing including:
monitoring the additional metrics for the subjects;
selecting one of the subjects based at least in part the additional metrics, wherein the selecting includes comparing the additional metrics to the conditions;
identifying a portion of the unstructured data that corresponds to the selected subject; and
combining at least part of at least one of the creative images that corresponds to the selected subject with the identified portion of the unstructured data, based on any control data input by the array of control elements, to generate the one or more sequences.

2. The apparatus of claim 1, wherein the rules identify:
topics describing the subjects;
sentiment value thresholds for the topics; and
which creative image(s) of the set of creative images to display for the subjects.

3. The apparatus of claim 1, wherein the rules include a time period of the metrics and the unstructured data to use for deriving the additional metrics.

4. The apparatus of claim 1, wherein the rules include filters identifying different demographics of the social media to use for the deriving the additional metrics.

5. The apparatus of claim 4, wherein the rules include time periods for displaying the creative images.

6. The apparatus of claim 1, wherein the rules include universal resource locators (URLs) identifying at least one of the one or more digital signs for displaying the creative images.

7. The apparatus of claim 1, wherein the rules identify promotional data to display along with the creative images.

8. The apparatus of claim 1, wherein:
the creative images include multiple layers showing different characteristics of the subjects;
the rules include topics that refer to the different characteristics of the subjects; and
the software system further to:
detect the characteristics of the subjects with the highest one(s) of the metrics; and
display the creative images based on a result of the detection.

9. The apparatus of claim 1, the software system further to:
identify a subject of the subjects having a highest one of sentiment values for a geographic region;
identify the creative images associated with the identified subject; and
display the creative images on the at least one of the one or more digital signs in the geographic region where the identified subject has the highest sentiment value.

10. The apparatus of claim 1, the software system further to:
identify promotional data associated with the rules; and
display the promotional data on at least one of the one or more digital signs with the creative images.

11. The apparatus of claim 1, the software system further to:
identify posts in the one or more user messages associated with the selected subject; and
display the posts on at least one digital sign of the one or more digital sign with the creative images associated with the selected subject.

12. The apparatus of claim 1, wherein:
the identified creative is layered, and the software system further to identify a layer of the identified creative to include or exclude in at least one sequence of the one or more sequences based at least in part on a comparison of the additional metrics to segmentation data of the rules, or
the software system further to:

initially cycle through the set of creative images on at least one digital sign of the one or more digital signs, wherein the monitoring the additional metrics for the subjects is performed during the cycling;

identify a subset of the creative images that is more popular than a remaining at least one of the creative images; and following the identifying the subset, cycle through creative of the identified subset on the at least one digital sign.

13. A processing system comprising:

a memory storing instructions that, when executed by at least one hardware processor, implement a software system to continually ingest social media as it is published to one or more social networks during a time period and curate content for one or more display devices over the time period as the social media is published during the time period;

the software system to produce one or more sequences of individual display elements for the one or more display devices, respectively, each sequence of the one or more sequences for a corresponding display device of the one or more display devices and including individual display elements having content changing for one individual display element of the sequence to another individual display element of the sequence, as trends emerge in the continually ingested social media;

the software system further including a user interface to display an array of control elements usable by an operator to generate control data to manually adjust at least part of the production of any sequence of the one or more sequences, in which the software system is arranged to automatically continue generating at least one sequence of the one or more sequences absent any adjustment specified using the array of control elements;

the software system further including a first data processor to perform a layer of processing on the continually ingested social media, the layer of processing including generating structured metric data including one or more metrics from unstructured data taken from the continually ingested social media, wherein the unstructured data includes content taken from one or more user messages of the continually ingested social media; and a second different data processor to perform an additional layer of processing based on the layer of processing by the first data processor, the additional layer of data processing including;

identify topics for identifying in the one or more user messages;

rank ones of the one or more user messages associated with the topics based on at least some of the one or more metrics, and select at least one of the one or more user messages based on the ranking;

identify creative images associated with the topics;

combine content associated with the selected at least one user message with at least part of at least one of the identified creative images, based on any control data input by the array of control elements, to generate the one or more sequences.

14. The processing system of claim 13, the software system further to receive rule parameters that identify the keywords, the structured metric data, and the creative images.

15. The processing system of claim 14, the software system further to receive control data identifying a time period and identify the unstructured data based on the received time period.

16. The processing system of claim 13, the software system further to receive a filter, and identify the unstructured data based on the filter.

17. The processing system of claim 16, wherein the filter identifies a demographic or geographic location, and the software system further to identify the unstructured data based on the demographic or geographic location.

18. The processing system of claim 13, software system further to:

receive an operation time period; and display the creative images based on the keywords in the unstructured data during the operation time period.

19. The processing system of claim 13, the software system further to:

receive a universal resource locator (URL); and display the creative images on a display device associated with the URL, wherein the display device comprises a display device of the one or more display devices.

20. The processing system of claim 13, the software system further to:

store promotional data; and include the promotional data with the creative images in the individual display elements.

* * * * *